US012572131B1

(12) United States Patent
Lai et al.

(10) Patent No.: US 12,572,131 B1
(45) Date of Patent: Mar. 10, 2026

(54) FLEXIBILITIES USED IN SLICER TO ENSURE LEVEL PRINTING FOR ADDITIVE SYSTEM

(71) Applicants: UT-Battelle, LLC, Oak Ridge, TN (US); LINCOLN GLOBAL, INC., Cleveland, OH (US)

(72) Inventors: Canhai Lai, Knoxville, TN (US); Andrzej Nycz, Knoxville, TN (US); Christopher J. Masuo, Knoxville, TN (US); Harold A Walters, Powell, TN (US); Luke T. Meyer, Alcoa, TN (US); William G. Carter, Knoxville, TN (US); Jonathan H. Paul, Chardon, OH (US)

(73) Assignees: UT-Battelle, LLC, Oak Ridge, TN (US); Lincoln Global, Inc., Cleveland, OH (US)

( * ) Notice: Subject to any disclaimer, the term of this patent is extended or adjusted under 35 U.S.C. 154(b) by 0 days.

(21) Appl. No.: 19/252,311

(22) Filed: Jun. 27, 2025

(51) Int. Cl.
*G05B 19/4099* (2006.01)

(52) U.S. Cl.
CPC .................... *G05B 19/4099* (2013.01); *G05B 2219/49023* (2013.01)

(58) Field of Classification Search
None
See application file for complete search history.

(56) References Cited

U.S. PATENT DOCUMENTS

| | | | |
|---|---|---|---|
| 10,343,320 B2 | 7/2019 | Gardiner | |
| 10,585,421 B2 * | 3/2020 | Wu | B33Y 50/00 |

| | | | |
|---|---|---|---|
| 11,478,990 B2 | 10/2022 | Jiang et al. | |
| 11,495,202 B2 | 11/2022 | Amano | |
| 12,220,868 B2 | 2/2025 | Strohecker et al. | |
| 2009/0142436 A1 * | 6/2009 | Kuzusako | B33Y 30/00 |
| | | | 264/1.36 |
| 2011/0236713 A1 | 9/2011 | Radwan et al. | |
| 2016/0318130 A1 * | 11/2016 | Stempfer | B23K 9/167 |
| 2016/0327113 A1 * | 11/2016 | Shelley | B32B 27/20 |
| 2017/0320263 A1 * | 11/2017 | Guillemot | B29C 64/112 |
| 2019/0249929 A1 * | 8/2019 | Rush | B64G 1/506 |
| 2019/0381595 A1 * | 12/2019 | Yamasaki | B33Y 50/02 |
| 2020/0180062 A1 * | 6/2020 | Suzuki | B23K 35/0266 |
| 2021/0080931 A1 * | 3/2021 | Yamasaki | B29C 64/106 |

(Continued)

FOREIGN PATENT DOCUMENTS

| | | |
|---|---|---|
| EP | 0763417 A1 | 3/1997 |
| WO | 2021236054 A1 | 11/2021 |
| WO | 2025019614 A2 | 1/2025 |

OTHER PUBLICATIONS

Mbodj et al.: "Modeling and Control of Layer Height in Laser Wire Additive Manufacturing", Materials 2022, 15, 4479.

*Primary Examiner* — Jason Lin

(74) *Attorney, Agent, or Firm* — Fox Rothschild LLP

(57) ABSTRACT

System and methods for additive manufacturing of a three-dimensional part. The methods comprising: obtaining, by the processor, different bead heights that are to be used during the additive manufacturing; determining, by the processor, an order in which beads are to be printed based on (i) a list of ordered Z values, (ii) bead bottom Z values, (iii) bead top Z values, (iv) bead centers of gravity, or any combination of (i)-(iv); and printing the beads in the determined order to additively manufacture the three-dimensional part.

20 Claims, 35 Drawing Sheets

(56) References Cited

U.S. PATENT DOCUMENTS

| | | | |
|---|---|---|---|
| 2021/0154911 A1* | 5/2021 | Saberton | ............... B29C 64/343 |
| 2022/0110725 A1 | 4/2022 | John et al. | |
| 2023/0008341 A1 | 1/2023 | Russell et al. | |
| 2024/0337007 A1 | 10/2024 | Guo et al. | |

\* cited by examiner

200

Start Bead Logic    202

Grab all available beads from current layer    204

Check bead types on current layer    206

Are there global beads?    208

Yes

No

Score global beads on closest start point and largest area from robot    210

Score local beads on closest start point and largest area from robot    212

Index beads based on highest score    214

Return to 202    216

700

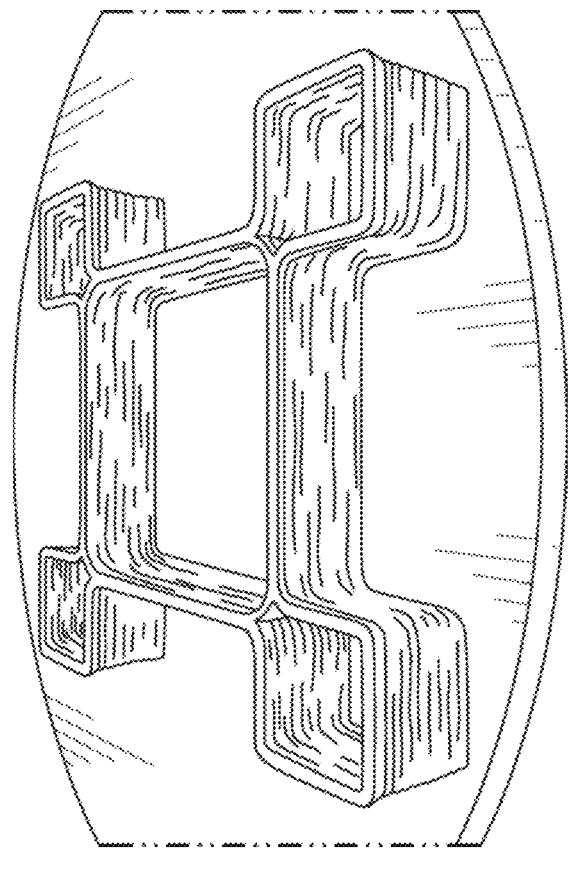
FIG.9
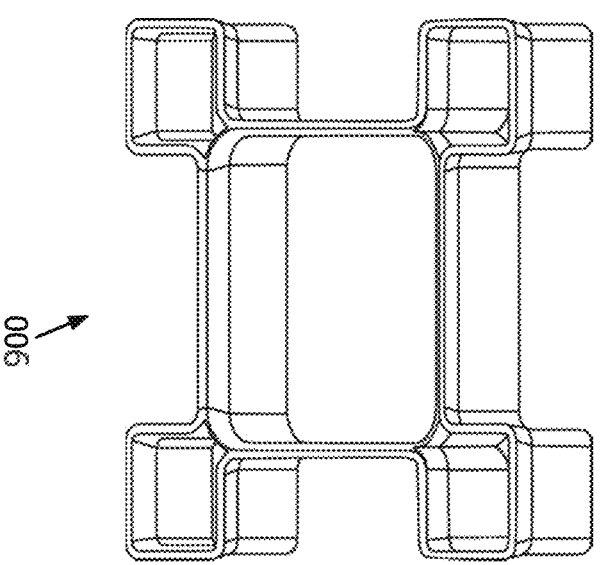
900

1100

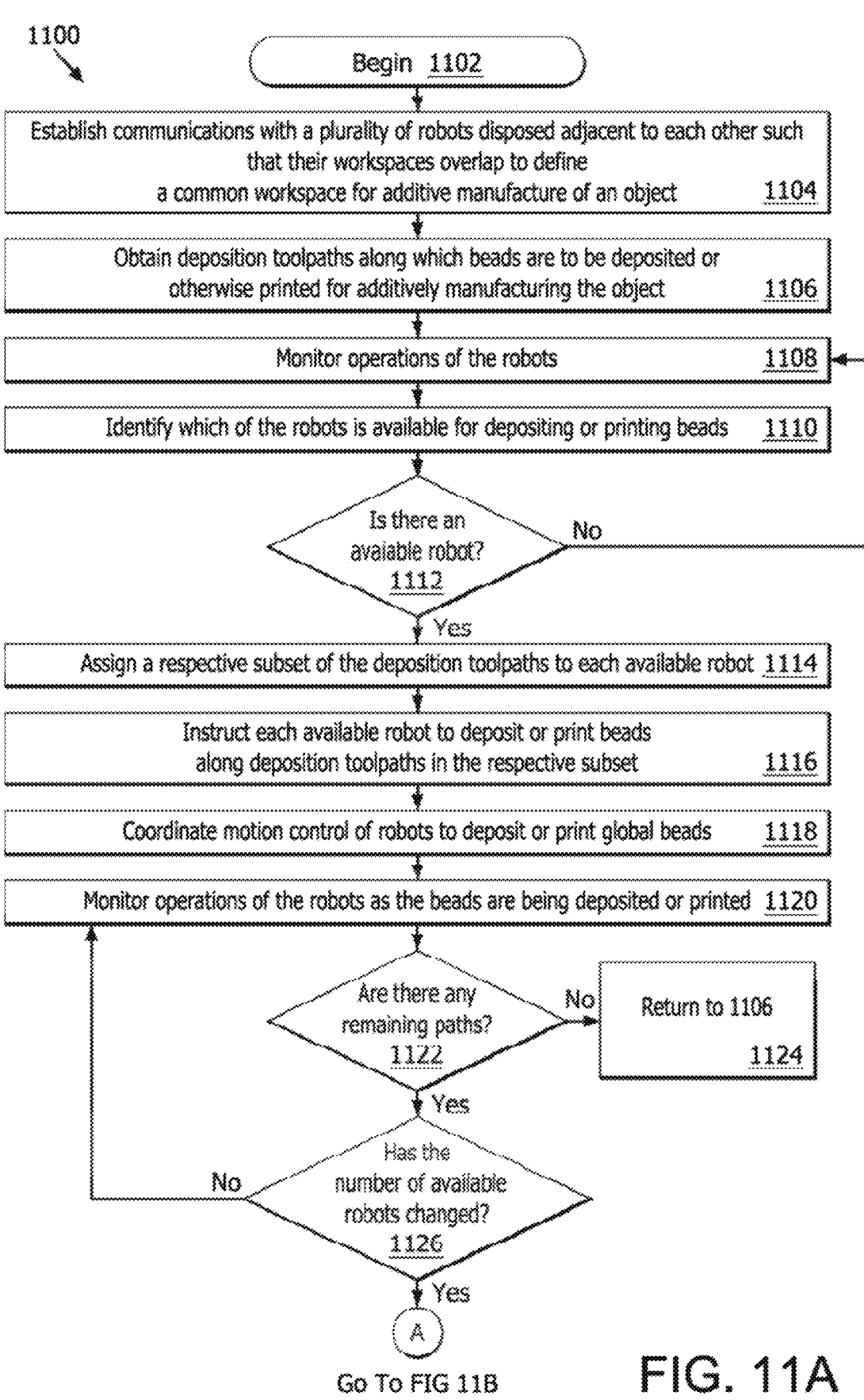

Begin  1102

Establish communications with a plurality of robots disposed adjacent to each other such that their workspaces overlap to define a common workspace for additive manufacture of an object     1104

Obtain deposition toolpaths along which beads are to be deposited or otherwise printed for additively manufacturing the object     1106

Monitor operations of the robots     1108

Identify which of the robots is available for depositing or printing beads     1110

Is there an available robot?  1112
No
Yes

Assign a respective subset of the deposition toolpaths to each available robot  1114

Instruct each available robot to deposit or print beads along deposition toolpaths in the respective subset     1116

Coordinate motion control of robots to deposit or print global beads     1118

Monitor operations of the robots as the beads are being deposited or printed  1120

Are there any remaining paths?  1122
No
Return to 1106     1124
Yes

Has the number of available robots changed?  1126
No
Yes

From FIG. 11A

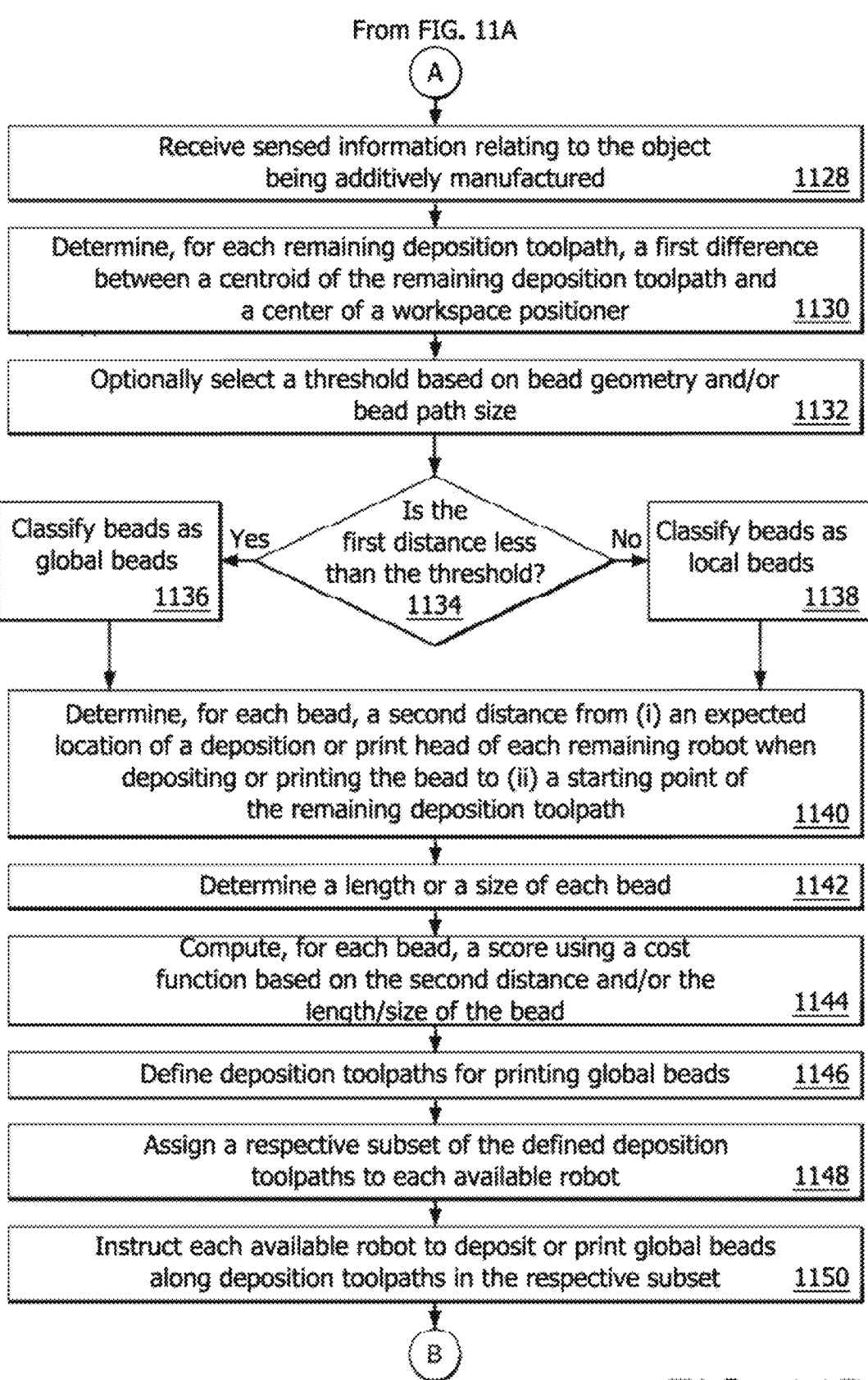

Receive sensed information relating to the object being additively manufactured    1128

Determine, for each remaining deposition toolpath, a first difference between a centroid of the remaining deposition toolpath and a center of a workspace positioner    1130

Optionally select a threshold based on bead geometry and/or bead path size    1132

Is the first distance less than the threshold?    1134

Yes   Classify beads as global beads   1136

No   Classify beads as local beads   1138

Determine, for each bead, a second distance from (i) an expected location of a deposition or print head of each remaining robot when depositing or printing the bead to (ii) a starting point of the remaining deposition toolpath    1140

Determine a length or a size of each bead    1142

Compute, for each bead, a score using a cost function based on the second distance and/or the length/size of the bead    1144

Define deposition toolpaths for printing global beads    1146

Assign a respective subset of the defined deposition toolpaths to each available robot    1148

Instruct each available robot to deposit or print global beads along deposition toolpaths in the respective subset    1150

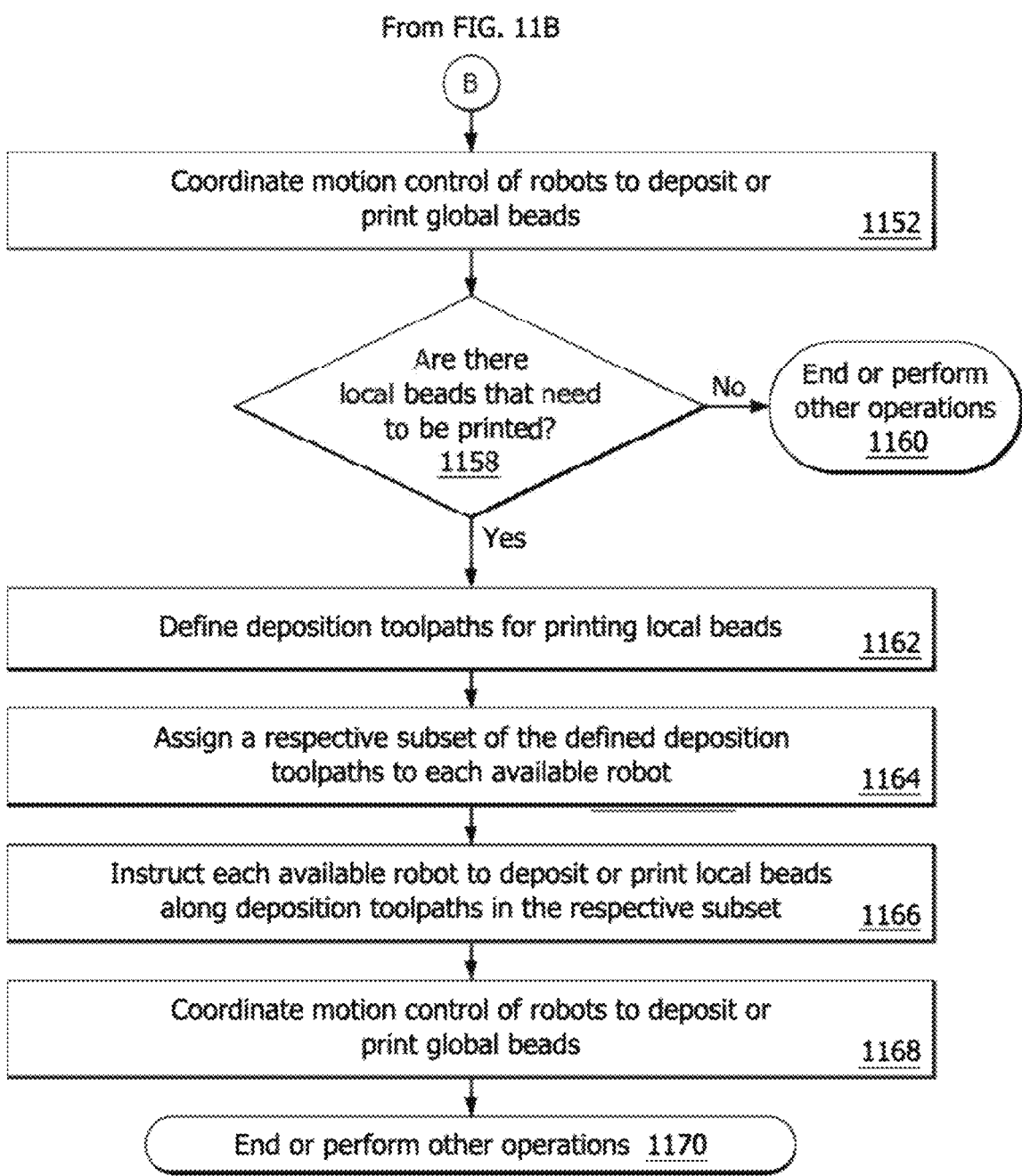

From FIG. 11B

B

Coordinate motion control of robots to deposit or
print global beads                                    1152

Are there
local beads that need          No        End or perform
to be printed?                           other operations
1158                                     1160

Yes

Define deposition toolpaths for printing local beads    1162

Assign a respective subset of the defined deposition
toolpaths to each available robot                       1164

Instruct each available robot to deposit or print local beads
along deposition toolpaths in the respective subset     1166

Coordinate motion control of robots to deposit or
print global beads                                    1168

End or perform other operations  1170

FIG. 11C

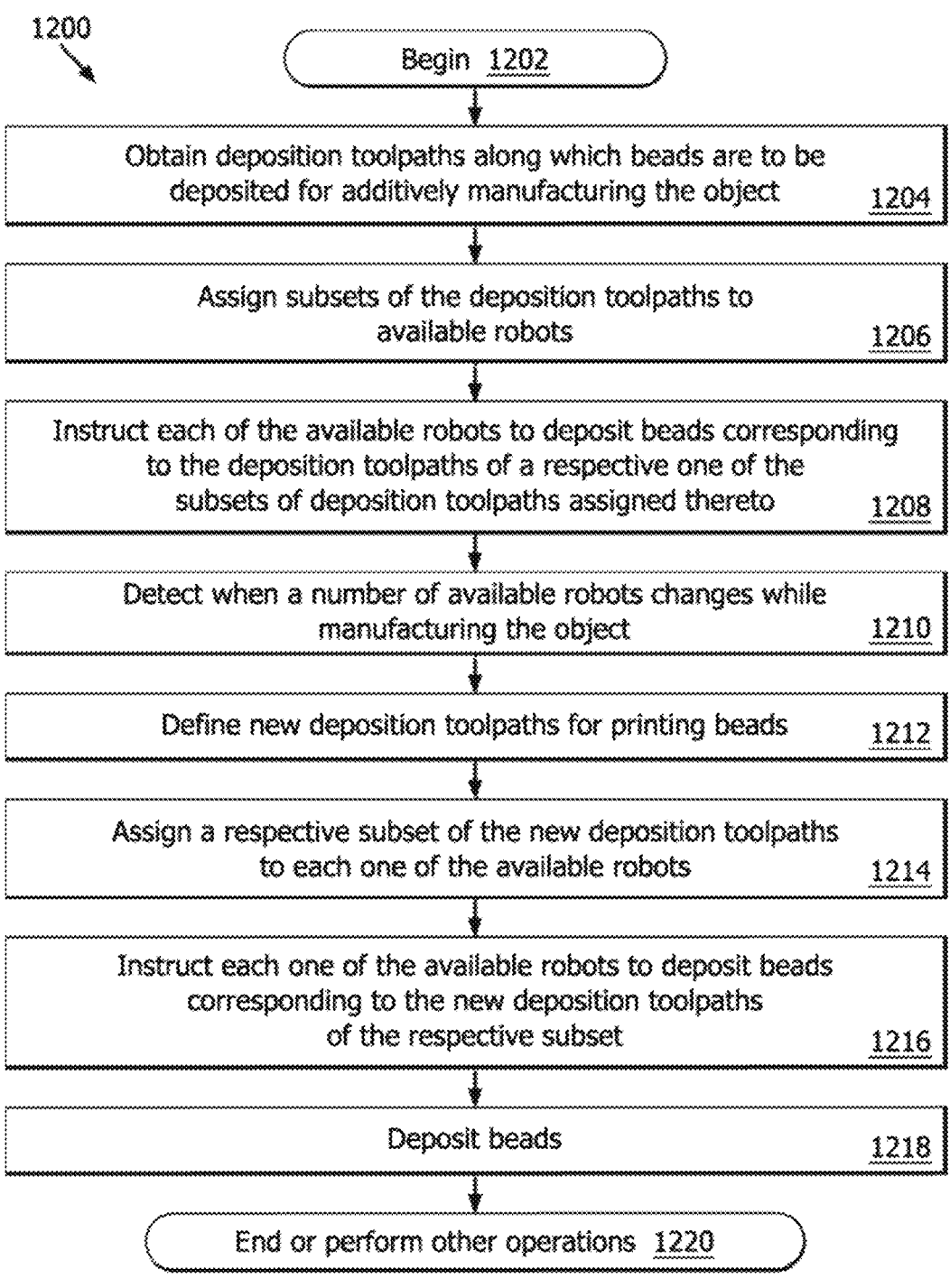

1200

Begin  1202

Obtain deposition toolpaths along which beads are to be
deposited for additively manufacturing the object    1204

Assign subsets of the deposition toolpaths to
available robots    1206

Instruct each of the available robots to deposit beads corresponding
to the deposition toolpaths of a respective one of the
subsets of deposition toolpaths assigned thereto    1208

Detect when a number of available robots changes while
manufacturing the object    1210

Define new deposition toolpaths for printing beads    1212

Assign a respective subset of the new deposition toolpaths
to each one of the available robots    1214

Instruct each one of the available robots to deposit beads
corresponding to the new deposition toolpaths
of the respective subset    1216

Deposit beads    1218

End or perform other operations  1220

FIG. 12

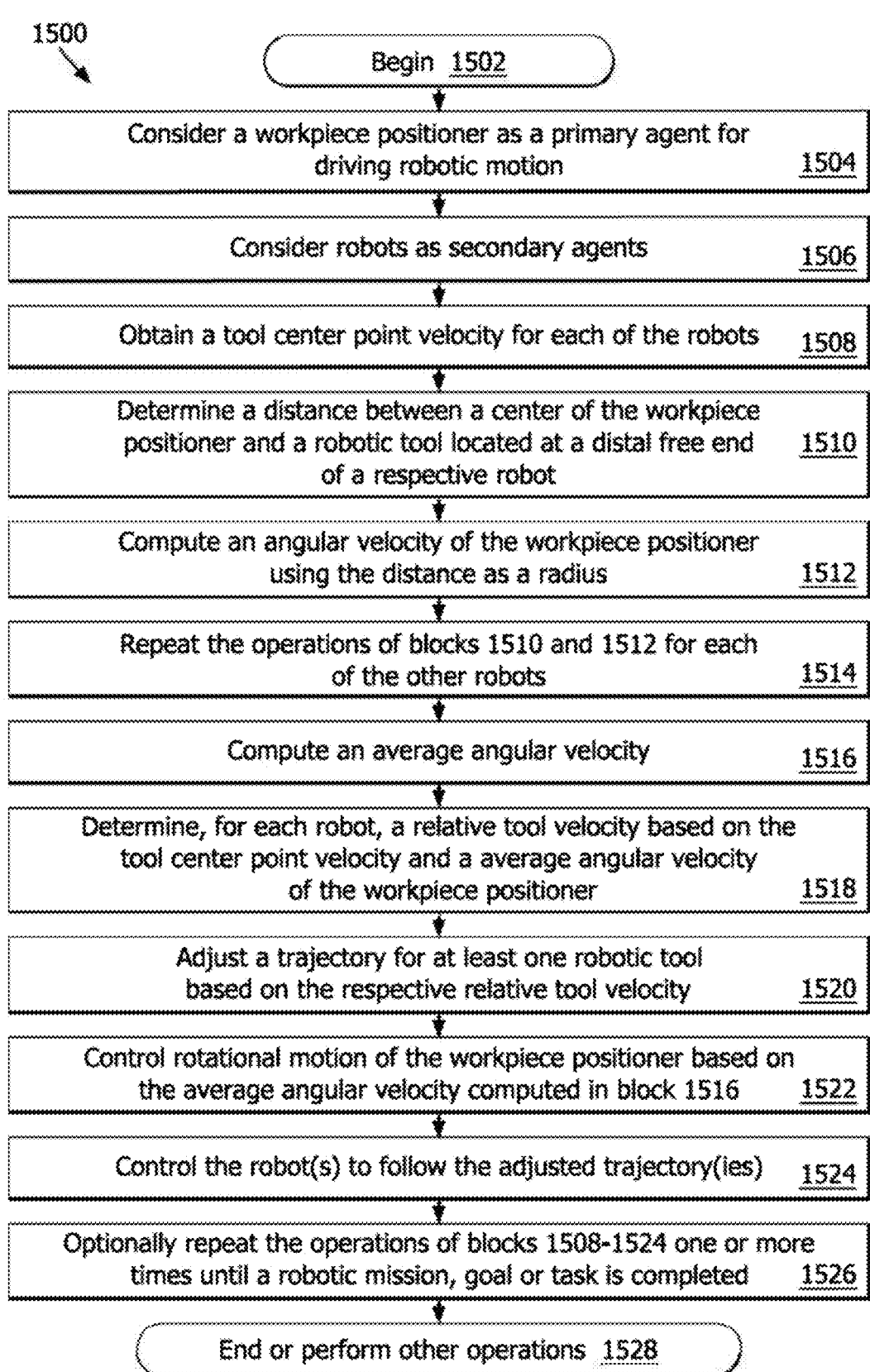

1500

Begin 1502

Consider a workpiece positioner as a primary agent for driving robotic motion	1504

Consider robots as secondary agents	1506

Obtain a tool center point velocity for each of the robots	1508

Determine a distance between a center of the workpiece positioner and a robotic tool located at a distal free end of a respective robot	1510

Compute an angular velocity of the workpiece positioner using the distance as a radius	1512

Repeat the operations of blocks 1510 and 1512 for each of the other robots	1514

Compute an average angular velocity	1516

Determine, for each robot, a relative tool velocity based on the tool center point velocity and a average angular velocity of the workpiece positioner	1518

Adjust a trajectory for at least one robotic tool based on the respective relative tool velocity	1520

Control rotational motion of the workpiece positioner based on the average angular velocity computed in block 1516	1522

Control the robot(s) to follow the adjusted trajectory(ies)	1524

Optionally repeat the operations of blocks 1508-1524 one or more times until a robotic mission, goal or task is completed	1526

End or perform other operations 1528

FIG. 15

*Insets and Skeletons, when printed with different materials, may result in unevenness.*

Layers
of
Infill
1702

Space
for
Infill

Layers
of
Inset
1700

Inner
Perimeter

Outer
Perimeter

Different layer heights specifications for insets and infills and thus different numbers of inset layers
and infill layers, help to print the part in level 3D Object
Model
1900

(Side View of Sliced Part)

Go To FIG. 22B

From FIG. 22A ( A )    # FIG. 22C

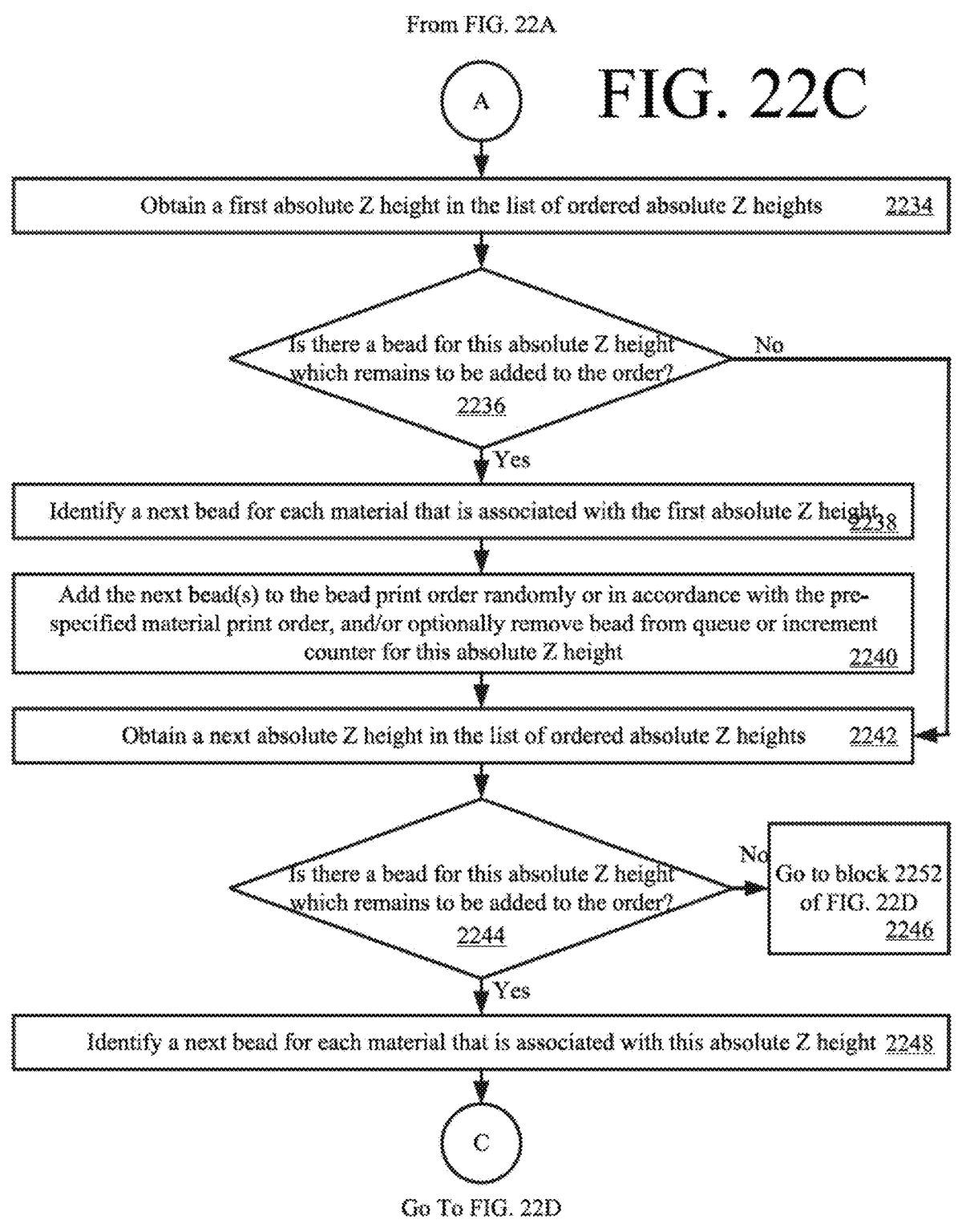

Obtain a first absolute Z height in the list of ordered absolute Z heights    2234

Is there a bead for this absolute Z height which remains to be added to the order? 2236 — No Yes Identify a next bead for each material that is associated with the first absolute Z height 2238

Add the next bead(s) to the bead print order randomly or in accordance with the pre-specified material print order, and/or optionally remove bead from queue or increment counter for this absolute Z height    2240

Obtain a next absolute Z height in the list of ordered absolute Z heights    2242

Is there a bead for this absolute Z height which remains to be added to the order? 2244 — No → Go to block 2252 of FIG. 22D    2246

Yes

Identify a next bead for each material that is associated with this absolute Z height 2248

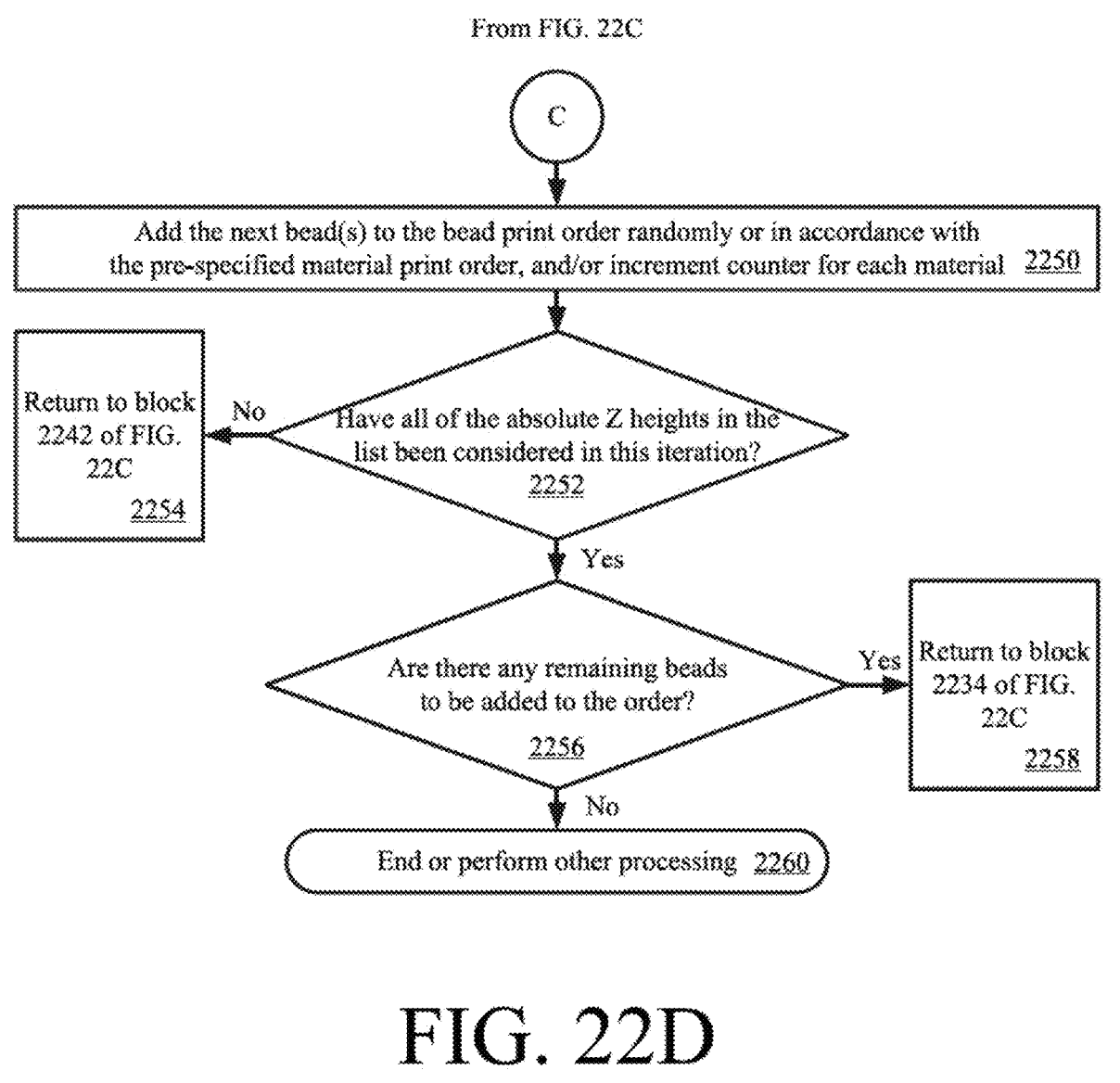

From FIG. 22C

C

Add the next bead(s) to the bead print order randomly or in accordance with the pre-specified material print order, and/or increment counter for each material  2250

Return to block 2242 of FIG. 22C  2254

No ← Have all of the absolute Z heights in the list been considered in this iteration? 2252

Yes

Are there any remaining beads to be added to the order? 2256

Yes → Return to block 2234 of FIG. 22C  2258

No

End or perform other processing  2260

FIG. 22D

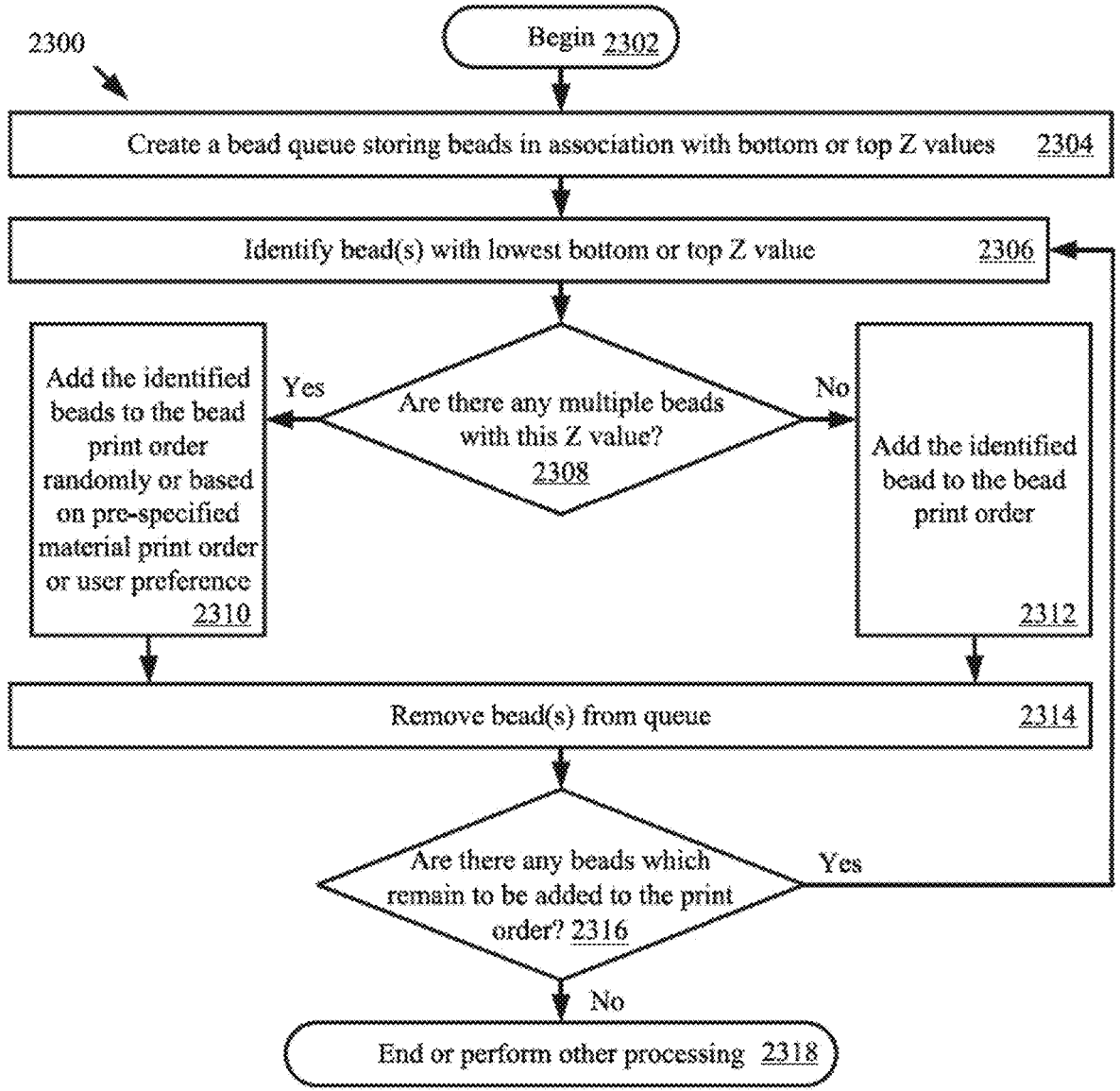

2300

Begin 2302

Create a bead queue storing beads in association with bottom or top Z values     2304

Identify bead(s) with lowest bottom or top Z value     2306

Are there any multiple beads with this Z value? 2308

Yes

Add the identified beads to the bead print order randomly or based on pre-specified material print order or user preference     2310

No

Add the identified bead to the bead print order     2312

Remove bead(s) from queue     2314

Are there any beads which remain to be added to the print order? 2316

Yes

No

End or perform other processing  2318

FIG. 23

(Bottom Z Values: No pre-specified material print order or user preference)

(Bottom Z Values: Pre-specified material print order or user preference)

FLEXIBILITIES USED IN SLICER TO ENSURE LEVEL PRINTING FOR ADDITIVE SYSTEM

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

BACKGROUND

Description of the Related Art

Robotic wire arc additive manufacturing (WAAM) is a directed energy deposition (DED) technology that has shown significant growth in recent years. This method is capable of manufacturing at high deposition rates, large-scale metal parts on the order of multiple meters in weights of many hundreds of kilograms. This process can print parts with complex geometries, including those with significant overhangs, without the use of support material. This manufacturing technology also allows for in-process control of the material properties through online monitoring and control of thermal conditions and other process attributes. Larger build volumes can be achieved by increasing the size of the robotic arm or gantry system or by moving the part itself. However, this approach expands the print volume without increasing the deposition rate of the system, leading to much longer production times. In addition, any single-robot deposition system contains a single point of failure.

Summary

The present disclosure concerns an additive manufacturing system comprising: a wire-arc welding system configured to deposit at least a first weld bead comprising a first process parameter and a second weld bead comprising a second process parameter; and a controller. The controller comprises logic to: receive input data to print a three-dimensional part comprising at least the first weld bead and the second weld bead, wherein the input data comprises the first process parameter and the second process parameter, and determine a sequence defining an order of depositing the first weld bead and the second weld bead based on the first process parameter and the second process parameter.

The present disclosure also concerns implementing systems and methods for additive manufacturing of a three-dimensional part. The methods comprising: obtaining, by the processor, different bead heights that are to be used during the additive manufacturing; determining, by the processor, an order in which beads are to be printed based on (i) a list of ordered absolute Z heights, (ii) bead bottom Z values, (iii) bead top Z values, (iv) bead centers of gravity, or any combination of (i)-(iv); and printing the beads in the determined order to additively manufacture the three-dimensional part.

The present disclosure also concerns a system, comprising: a processor; and a non-transitory computer readable medium comprising one or more programming instructions that when executed by the processor, cause the processor to: obtain different bead heights that are to be used during the additive manufacturing; determine an order in which beads are to be printed based on (i) a list of ordered absolute Z heights, (ii) bead bottom Z values, (iii) bead top Z values, (iv) bead centers of gravity, or any combination of (i)-(iv); and print the beads in the determined order to additively manufacture the three-dimensional part.

BRIEF DESCRIPTION OF THE DRAWINGS

The present solution will be described with reference to the following drawing figures, in which like numerals represent like items throughout the figures.

FIG. 9 provides an example illustration showing a build that was prepared to test the asynchronous coordinated motion capabilities and machine intelligence of the system.

FIGS. 11A-11C (collectively referred to as "FIG. 11") provides a flow diagram of an illustrative method for controlling robots to perform additive manufacturing to produce an object.

FIG. 12 provides a flow diagram of an illustrative method for controlling robots to perform additive manufacturing to produce an object.

FIG. 15 provides a flow diagram of an illustrative method for controlling motion of robots in a coordinated manner during an additive manufacturing process.

FIGS. 22A-22D (collectively referred to as "FIG. 22") provide a flow diagram of an illustrative method for ordering beads.

FIG. 23 provides a flow diagram of another illustrative method for ordering beads.

DETAILED DESCRIPTION

Additive manufacturing involves building up multiple layers of material to build a three-dimensional (3D) object or part. This technique has also been referred to as wire arc additive manufacturing or WAAM, 3D printing with metal, and metal 3D printing. Additive manufacturing uses a heat source (e.g., a laser, a welding power source) to melt a feedstock material (e.g., a welding wire or a powder) to form a layer on a substrate. When cooled, another layer can be formed on top of the previous layer, and the process may repeat as needed to build up a final shape in a controlled manner.

Performing additive manufacturing on complex parts may require depositing different materials at different locations in the same or different layer. Deposition rate depends primarily on feed rate and print velocity. Deposition rate for one type of material may be different than that of another. If the same program is used to deposit different materials, unevenness can result in the final object or part (e.g., because one material will grow faster than another). For instance, if a part specification requires that the internal section of each layer requires aluminum, while the remaining section requires steel, the deposition of aluminum and steel will result in a different layer height, increasing the possibility of a reject or quality issue. This is because different material types have different properties (e.g., different conductivities, heat indexes, and/or other properties of the material.

The present solution is directed to a computer-implemented system that automatically determines a sequence of depositing weld beads comprising different material types, such that each layer uniformly grows vertically (e.g., in the z-direction). The following steps describe an implementation of the present solution in relation to a slicer module of a robotic system. The slicer module can include, but is not limited to, a controller comprising a processor and a storage device for storing programming instructions. A first step involves determining a bead or layer height for each material used in wire-arc additive manufacturing. The parameters that determine the layer height include, but are not limited to, extrusion feed rate (i.e., the amount of material extruded per unit time) and print speed (i.e., (the speed at which the print head moves). Next, a bead type is created in the slicer module for each material to be deposited for the 3D printing. In the slicer, a processor selects the correct bead type for each tool path type, e.g., inset and infill, along with the schema choice on how to slice the model into layers. When all settings are selected, the process continues with slicing a loaded part in the slicer module.

Figure 1:
FIG. 1 provides an illustration of an example toolpath that is configured to run line-by-line in accordance with a generated g-code.

Conventional methods of assigning toolpaths for a CNC machine or 3D printer requires the use of computer-aided manufacturing (CAM) or the slicer module to create predefined toolpaths and then execute each path line-by-line, as shown in FIG. 1. This does not consider any boundary conditions that the machine or printer and manufactured part encounters during a manufacturing process, thus potentially reducing quality and lowering productivity. Preplanning the toolpaths is a conventional method for resolving these issues. However, this may require high confidence in a model simulation to predict the exact state of the machine or printer and the part during offline execution of the manufacturing process to ensure no defects occur. Additionally, there is no effective method for assigning toolpaths for a multi-agent system, in which the multi-agents collaborate to manufacture the same part.

The present example systems and methods of the present disclosure are configured to adaptively and dynamically assign toolpaths for a multi-agent system composed of agents with dynamic behaviors with offline strategies. The agents can include, but are not limited to, articulated robots or robots with articulated arms. The example system implements machine intelligence to dynamically handle toolpath assignments to each agent during a manufacturing process. This utilizes full feedback from each individual agent and the produced part by incorporating sensors (e.g., thermal cameras, 3D scanners, force sensors, etc.) into the CAM system. Furthermore, preprocessed toolpath generation can still be incorporated to assist in the toolpath assignment. The disclosed dynamic toolpath assignment can use a cost function to rank each individual toolpath.

Figure 2:
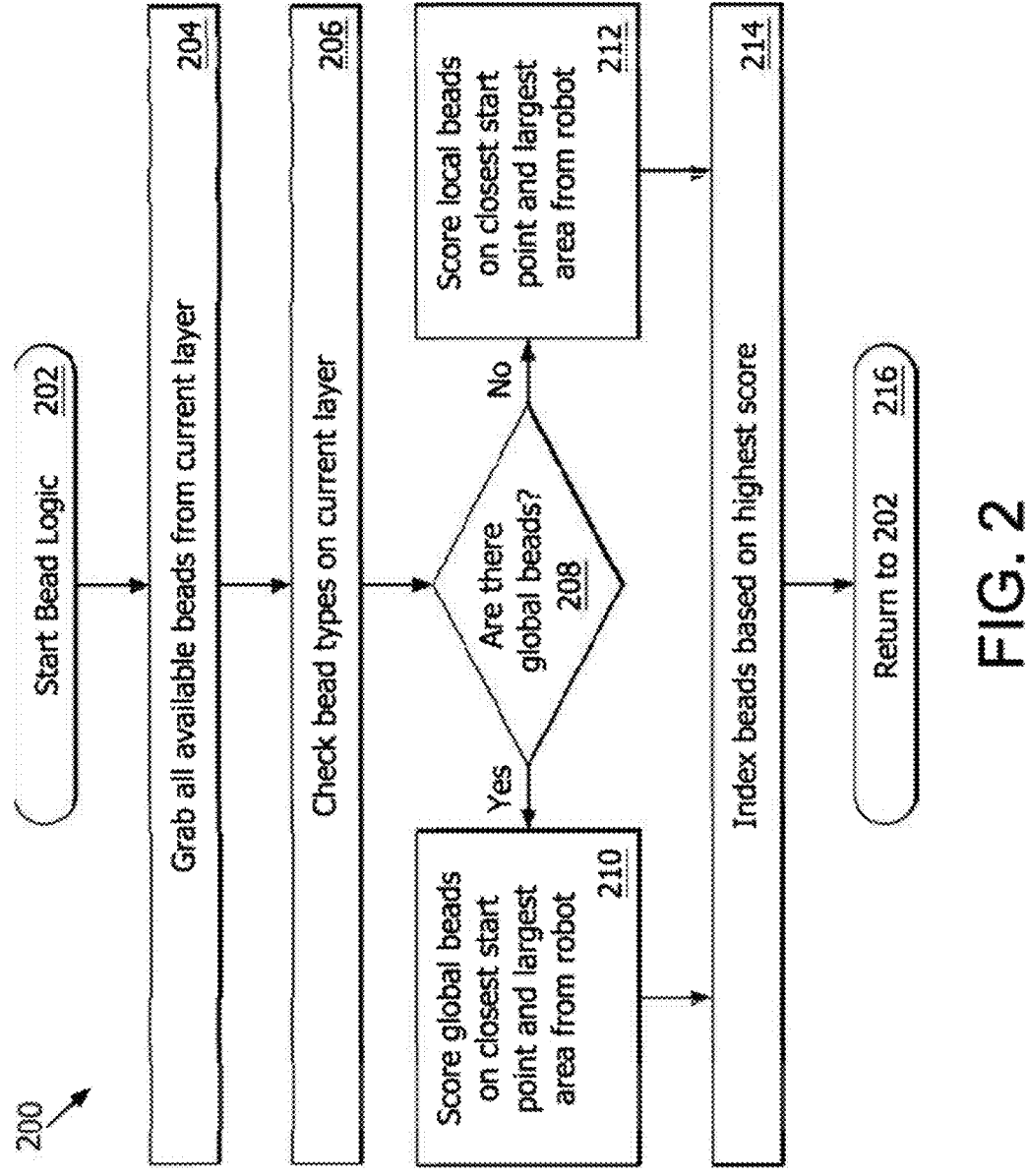
FIG. 2 provides an example flowchart that is useful for understanding a first portion of a toolpath assignment strategy for a multi-robot coordinated-motion deposition system.

FIG. 2 provides a flow diagram of a method 200 illustrating the first portion of the disclosed toolpath assignment strategy for a multi-robot coordinated-motion deposition system. Method 200 involves the operations of blocks 202-216. These operations generally involve: starting bead logic for producing an object via a multi-layer build using CAM; grabbing or identifying all beads in a current layer of the multi-layer build; checking bead types in the current layer; determining whether there are global beads (e.g., beads that can be performed by multiple available robots) in the current layer; scoring the global beads based on a closest start point and a largest area from a robot and/or scoring local beads (e.g., beads that can be performed only by one robot) in the current layer based on a closest start point and a largest area from the robot; indexing the beads in the current layer based on a highest score; and returning to the first operation to repeat the assignment process on subsequent layers.

Figure 3:
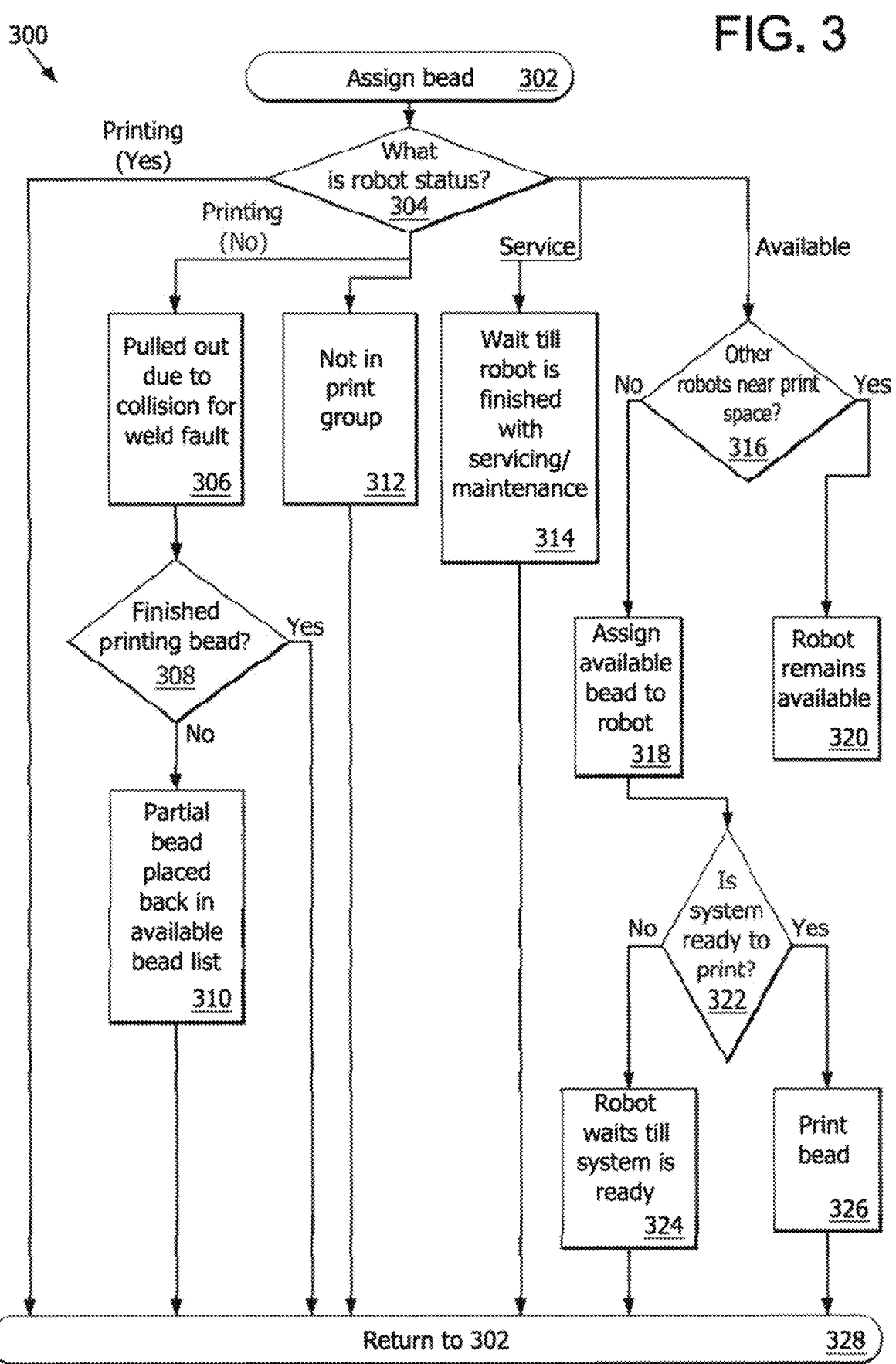
FIG. 3 provides an example flow diagram that is useful for understanding a high-level framework of the dynamic toolpath assignment to be used in a multi-robot coordinated motion deposition system.

Afterwards, the assigned toolpaths are sent to the available and best matched agents or robots. FIG. 3 provides a flow diagram of method 300 illustrating a second portion of the disclosed toolpath assignment to be used in a multi-robot coordinated-motion deposition system, for instance. Method 300 involves operations of blocks 302-328. These operations involve: assigning a bead to a robot; determining a robot's status; and performing operations based on the robot's status. For example, if the robot is currently printing a bead, then the process returns to block 302 where the bead is (re) assigned to another robot. If the robot has nearly collided with another robot while printing the bead as shown by block 306, then the system determines whether the bead has been fully or partially printed in block 308. If the bead has been fully printed [308: YES], then the system returns to block 302 so that the next bead can be assigned to a robot. In contrast, if the bead has been partially printed [308: NO], then the system places the bead back in the available bead list so that it can be reassigned in the next iteration of the process. If the robot is not in the print group of robots as shown by block 312, then the system returns to 302 so that the bead can be assigned to another robot in the print group. If the robot is being serviced, then the system waits until the robot is finished being serviced and/or maintenance of the robot is completed as shown by block 314. In some embodiments, the system may assign the bead to another robot if the robot is being serviced and/or maintained. If the robot is available to print, then the system determines whether other robots are near this robot's workspace or print space. If so [316: YES], then the robot remains available but method 300 returns to 302 so that assignment of the bead to a robot can start over or otherwise be re-performed. If not [316: NO], then the bead is assigned to the robot. The robot either prints the bead or waits to print the bead until the system is ready for printing, as shown by blocks 324 and 326. Thereafter, method 300 is repeated for the assignment of the next bead.

The present solution simplifies the task allocation process for each agent compared to a preprocessed solution, as the disclosed techniques adapt to the main system's environment in real-time. This also reduces the time wasted in running rigorous simulations to ensure each agent does not interfere with other agents during the manufacturing process. The present solution enables increased productivity, increased system deposition rate (i.e., the total amount of weld metal deposited by the system over a period of time), increased reliability, and system scaling. The present solution can be used generally in fields such as manufacturing. More specifically, the present solution can be used for large scale manufacturing and/or additive manufacturing.

The present solution is configured to improve (i) the printing process' efficiency and reliability, and (ii) build volume of single-robot large-scale metal additive systems through the development of the disclosed multi-robot and machine intelligence technologies. Expanding the build volume while reducing production time necessitates higher system deposition rates which can be achieved by increasing the number of deposition agents. This also avoids single point of failure inherent in single-robot systems, making it more reliable. Using two or more agents leads to additional uncertainties due to individual agents potentially encountering faults or being preoccupied with other tasks. Synchronizing these agents requires full availability, which results in an extended production time. Moreover, an increased number of agents raises the likelihood of collisions. Pre-processed motion planning becomes impractical as it would need to account for collisions and indeterministic faults of an agent. This necessitates the capability of dynamically creating and assigning atomic asynchronous deposition sub-tasks to each deposition agent. To ensure that the task assignment is efficient, and build quality is maintained, these tasks should be executed by any of the deposition heads in an order that optimizes the productivity, reliability, thermal management, or other specified functions. The present system can be configured such that each build could be executed by any combination of agents, and deposition tasks should be able to be reassigned on the fly. These criteria require motion control techniques that can manage the collaborative build process for a multi-robot system.

Figure 4A:
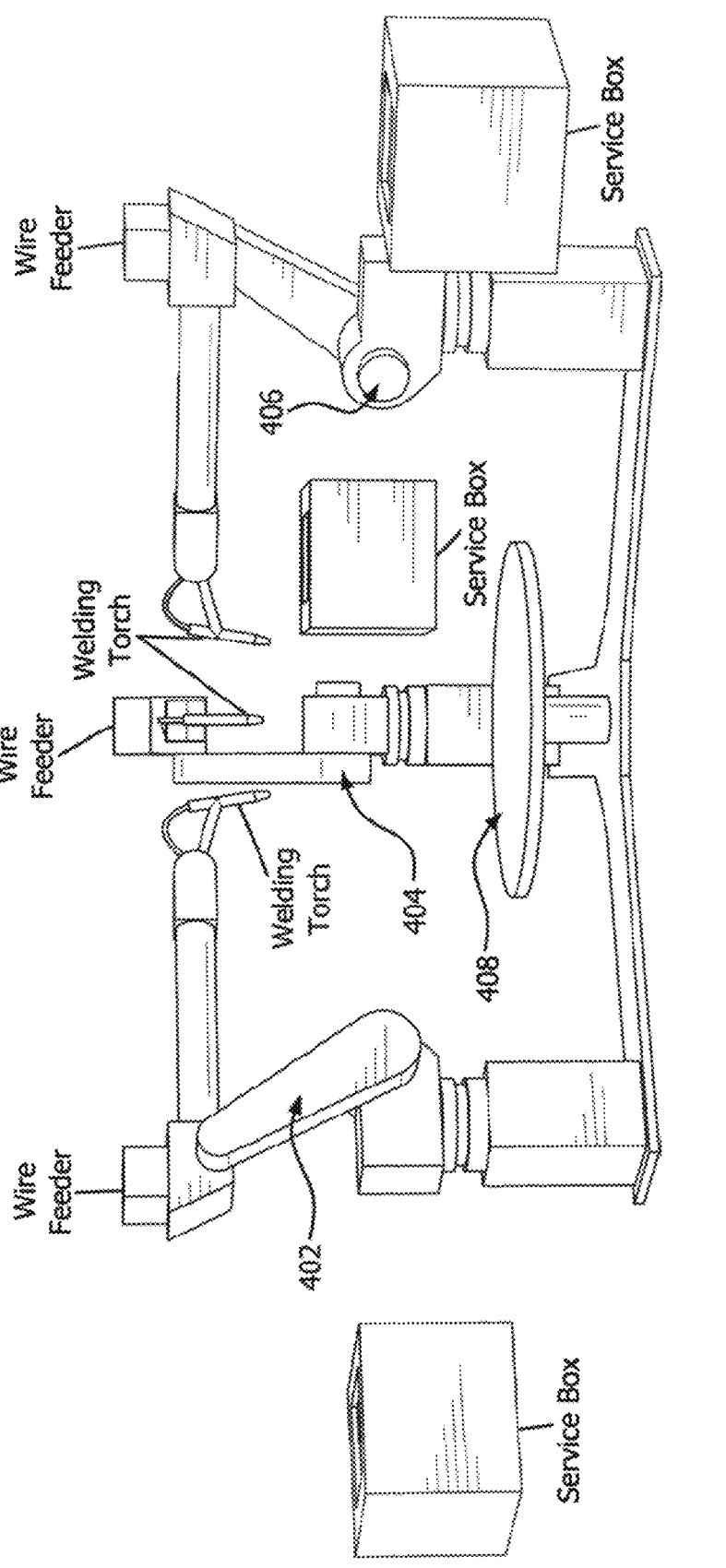
FIGS. 4A-4B (collectively referred to herein as "FIG. 4) provide illustrations showing an example robotic system implementing the present solution.
Figure 4B:
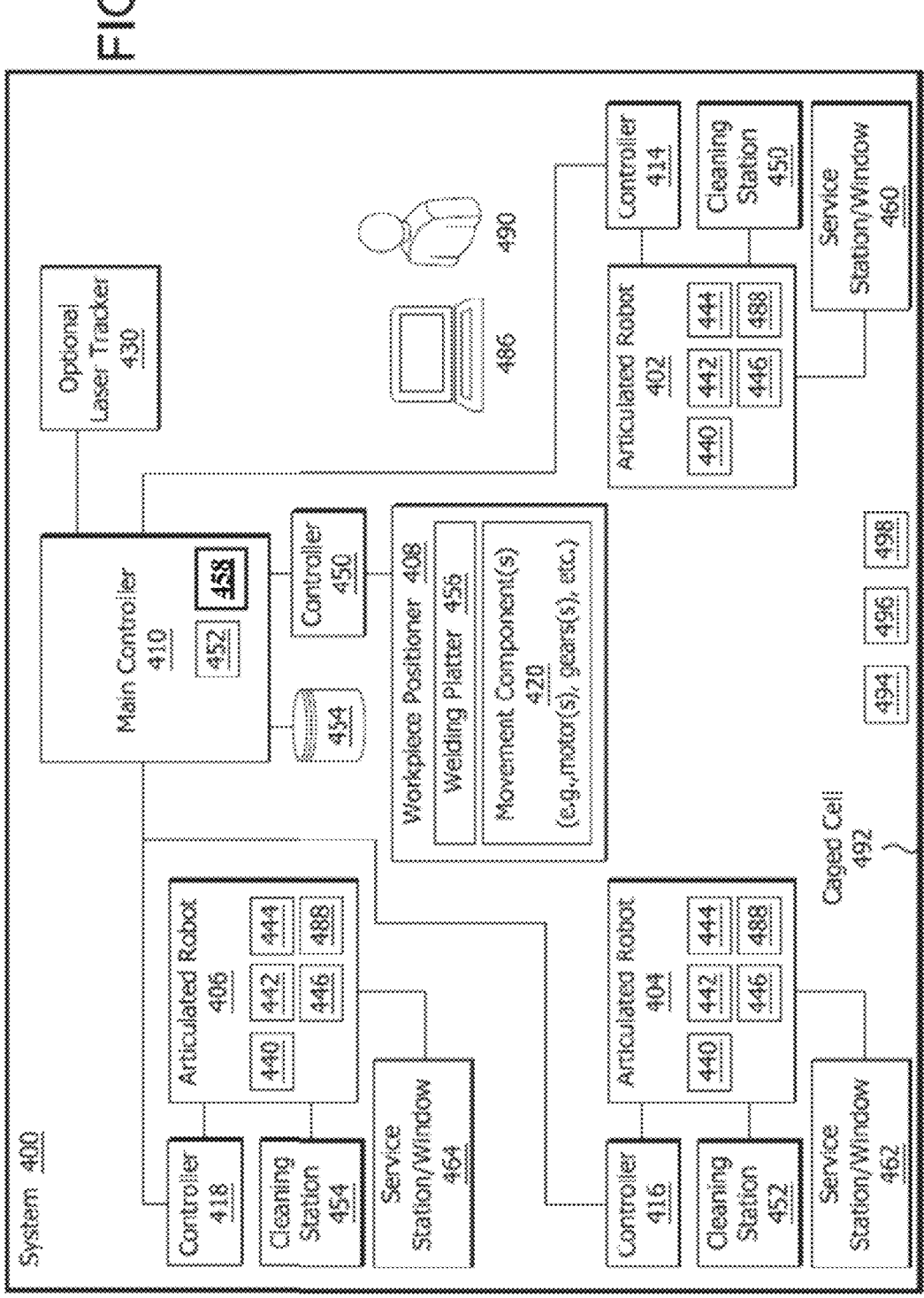

FIGS. 4A-4B provides illustrations showing a non-limiting example of a system 400 implementing the present solution. System 400 is generally configured to perform bead deposition additive manufacturing processes to make products by depositing material from machine heads onto substrates. The deposited material may be in the form of beads. The deposited material can include, but is not limited to, metal materials.

System 400 comprises a multi-robot coordinated-motion deposition system. Three articulated robots 402, 404, 406 are shown in FIG. 4A. The present solution is not limited in this regard. Any number of robots can be provided in accordance with a given application. Each of the articulated robots 402, 404, 406 can include, but is not limited to, an ABB IRB 4600 robot comprising an articulated arm. The number of robots and their kinematic arrangement may be chosen, for example, with technologies including machine intelligence required for dynamic print-path assignment and control. The disclosed architecture is modular and extensible to any number of robots in any kinematic arrangement by utilizing a decentralized controller 414, 416 or 418 for each robot and a main controller 410 to manage task assignment and motion planning of the articulated robots.

Figure 5:
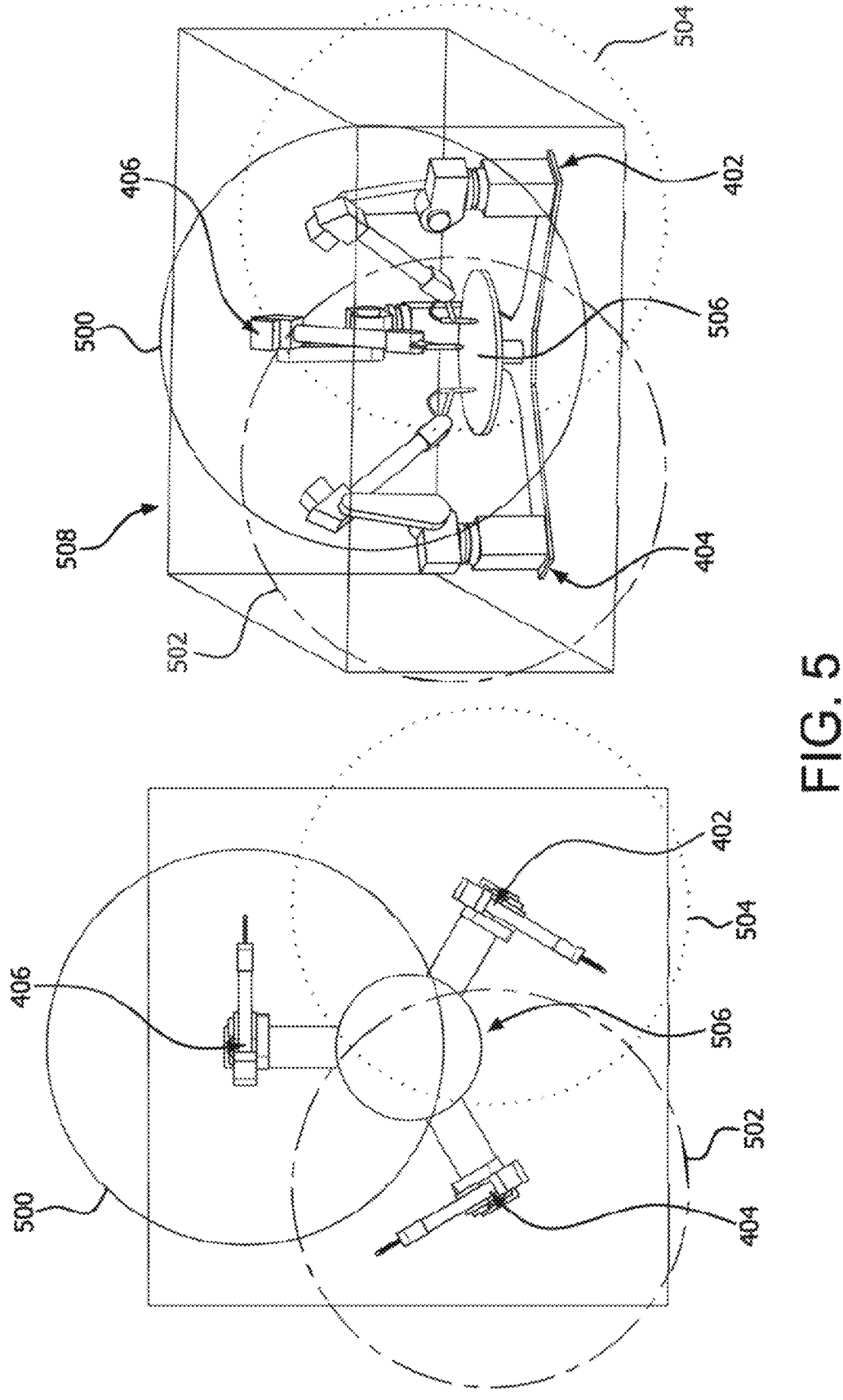
FIG. 5 provides illustrations showing a workspace of a three-robot coordinated-motion deposition system where the shapes represent the workspace of the robots, and the bounding box represents a caged cell. The illustration on the left of FIG. 5 provides a top view of the workspace, while the illustration on the right of FIG. 5 provides a perspective view of the workspace.

Each articulated robot 402, 404, 406 has multiple degrees of freedom, for example, six-degrees of freedom. In the embodiment shown, the articulated robots 402, 404, 406 are spaced around a workpiece positioner 408. It should be appreciated that the various inventions disclosed herein may apply to other arrangements, e.g., robots placed adjacent to each other along an assembly line, robots positioned on opposing sides of an assembly line, etc. In this example, as shown in FIG. 5, each robot has a workspace 500, 502, 504 associated therewith which defines a 3D area in which it can print beads in a layer-by-layer manner during an additive manufacturing process. The articulated robots are arranged such that their workspaces 500, 502, 504 at least partially overlap to define a common workspace 506. The robots 402-408 are controlled by controller(s) 414, 416, 418. The robot controller(s) 414, 416, 418 can include, but is(are) not limited to, an industrial robot controller having a product number of ABB IRC5.

The workpiece positioner robot 408 may include a circular welding platen 456 with its motion driven by movement component(s) 420 such as motor(s) and/or gear(s). The motor(s) can include, for example, a motor unit or gear unit package (e.g., ABB MID 1000). The circular welding platen 456 may, for example, measure 2.25 meters in diameter. The cylindrical build envelope of the system may total to 7.95 m³. However, a larger volume shown in FIG. 5 is attainable should a build extend past the cylindrical envelope of the workpiece positioner 408.

A laser tracker 430 may be provided to record robot paths and capture the geometry of the workpiece positioner 408. The laser tracker 430 may include, but is not limited to, a Leica AT960 absolute laser tracker with Verisurf metrology software. The laser tracker 430 may also be used to calibrate the coordinate frame locations of each articulated robot 402-406. In some scenarios, the final positional error between each articulated robot's end effector may be less than 0.07 mm for points in system's global coordinate frame.

Each articulated robot 402, 404, 406 may be equipped with bead printing elements at its distal end. The bead printing elements can include, but are not limited to, heating element(s) 440 and/or wire feeder(s) 442. The heating elements 440 can include, but are not limited to, welding torch(es). The welding torch(es) may include, but is(are) not limited to, metal inert gas (MIG) welding torch(es). The welding torch(es) may be powered by a power source 444. Each power source 444 can include, but is not limited to, CV or CC/CV power sources (e.g., Lincoln Electric Power Wave R450s with Power Wave STT modules). The wire feeder(s) 442 may include, but are not limited to, four roll wire feeders (e.g., a Lincoln Electric AutoDrive 4R220 wire feeder).

Shielding gas is supplied to each welding torch via a gas manifold 446 designed to control gas mixtures and regulate pressure and flow rate. To minimize system downtime due to spatter buildup on the nozzles and contact tips of the gas manifold 446, a cleaning station 450, 452, 454 is provided to periodically trim the welding wire and clean the nozzle of the welding torch(es). Each cleaning station 450, 452, 454 can include, but is not limited to, any suitable known torch cleaning station for MIG welding torches.

Each articulated robot 402, 404, 406 is also equipped with a service window 460, 462, 464 that enables an operator 490 to perform periodic maintenance procedures from outside of the workspace without affecting the build process for the other articulated robots.

The system may be enclosed with a caged cell 492. The caged cell 492 may be covered with welding curtains and may feature a retractable ceiling to allow crane access for removing large parts. The caged cell 492 may be equipped with a filtration system 494 to expel weld fumes, and entrances to the caged cell 492 may be protected with safety sensors 496. The filtration system 494 can include, but is not limited to, a welding fume extraction unit with a fixed mechanical filter. The safety sensors 496 can include, but are not limited to, non-contact safety sensors.

A computing device 486 may be provided to allow the operator 490 to monitor the robotic process, view analytics, view sensor data, and/or perform user-software interactions for controlling one or more components of system 400. The sensor data can include, but is not limited to, images captured by cameras. Cameras 498 may be mounted on the ceiling of the caged cell 492. The cameras 498 can include, but are not limited to, three pan-tilt zoom network cameras (e.g., Axis M5525-E PTZ network cameras). Cameras 488 may also be mounted on each deposition arm to monitor the process during operation. These cameras 488 can include, but are not limited to, Gigabit Ethernet cameras (e.g., Basler acA800-200gc cameras).

In some scenarios, the controller(s) 410, 414, 416, and 418 may comprise centralized or distributed controller circuitry. The controller(s) may comprise a slicer module 458 configured to obtain a model of a three-dimensional object or part to be additively manufactured and analyze the model to slice the three-dimensional object or into a plurality of layers for deposition by robots 402, 404, 406. The controller circuitry may be configured to communicate with robots. The robots may be positioned adjacent to one another such that their workspaces overlap to define a common workspace. The robots may be configured to additively manufacture, within the common workspace, an object on a-layerby-layer basis by depositing, for each layer of the object, beads along paths associated with the layer. The controller circuitry may also be configured to: obtain paths along which beads are to be deposited for additively manufacturing the object; monitor which of the robots are available for depositing the beads; assign respective subsets of the paths to the available robots to optimize collaboration among the available robots as they additively manufacture the object within the common workspace; instruct each available robot to deposit beads corresponding to paths of its assigned subset; detect that a different number of robots is currently available for depositing the beads while there are remaining paths along which to deposit beads for completing the additive manufacture of the object; assign respective new subsets of the remaining paths to the currently available robots to optimize collaboration among the currently available robots as they continue to additively manufacture the object within the common workspace; and instruct each available robot to deposit beads corresponding to paths of its assigned new subset.

The controller circuitry may also be configured to: receive, from the robots, respective state information indicative of a robot being one of idle, active, in service, or off; monitor each robots availability; detect changes in each robots availability based at least in part on the robot's state information; communicate with one or more sensors arranged to collect process information relating to the object being additively manufactured within the common workspace; produce respective aggregate scores of the paths based at least in part on the process information; and assign to each available robot a subset of paths based on their corresponding aggregate scores.

The controller circuitry may be further configured to: determine whether a path is global or local; and produce an aggregate score for the path further based on the path being global or local. The aggregate score of the path may be computed as described in relation to FIG. 2.

The controller circuitry may also be configured to: instruct each available robot to deposit beads corresponding to paths of its assigned subset by transmitting an associated task queue to the available robot; assign to each available robot a subset of paths as described in relation to FIG. 3; communicate with a data store that stores the paths along which beads are to be deposited for additively manufacturing the object; and obtain the paths by accessing the data store.

Figure 6:
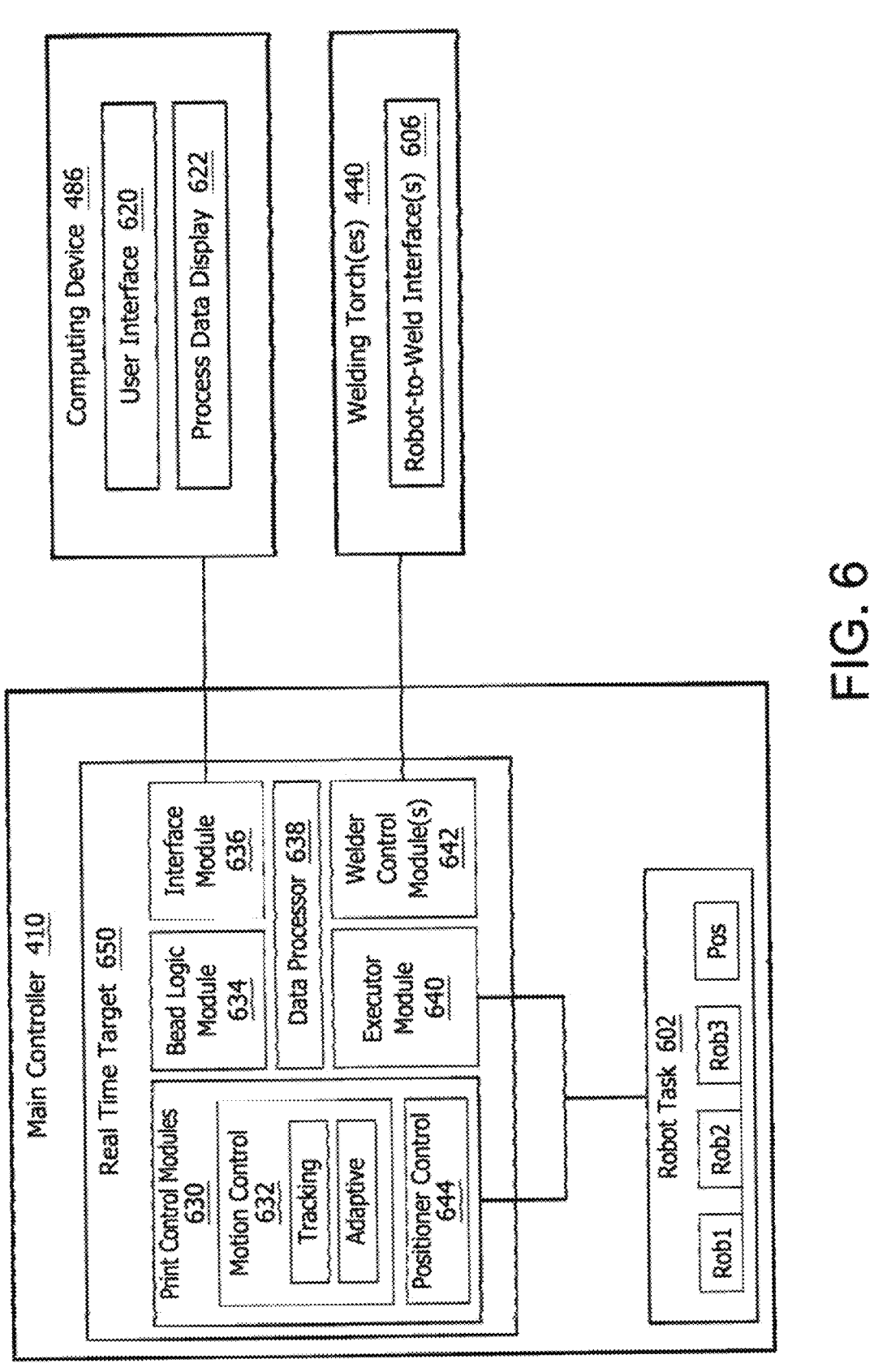
FIG. 6 provides an illustration of an example hardware and software architecture for the system shown in FIG. 4.

FIG. 6 provides an illustration of a hardware and software architecture for system 400. The main controller 410 is configured to schedule robot tasks 602 and communicate control signals to a real time target 650 for controlling the robots to perform their respective tasks, communicate control signal to the welding torch(es) 440 for controlling operations thereof, and/or receiving information from the welding torch(es) 440. The welding torch(es) 440 may include robot-to-weld interface(s) 606 to facilitate communications with the real-time target 650. The real-time target 650 may be configured with print control module(s) 630, a bead logic module 634, an interface module 636, a data processor 638, an executor module 640, and a welder control module 642. Print control module(s) 630 comprise(s) motion control 632 (tracking and/or adaptive) and positioner control 644. The real-time target 650 may comprise controller 414, 416 418 and/or 450 of FIG. 4.

External motion control begins when an articulated robot 402, 404, 406 is assigned a deposition task. The external motion control modules 632 continue to control the asynchronous coordinated motion of each robot until a deposition task is complete. Through arc seam tracking (TAST) and adaptive height control modules process the motion and welder feedback data and alter the original toolpaths to adjust for process disturbances. The bead logic and print control modules 634 continue to assign and control deposition tasks in parallel for each robot until the build is complete.

System 400 requires coordinated motion for each articulated robot 402, 404, 406 to follow deposition toolpath coordinates specified in the workpiece positioner's moving reference frame. The coordinated motion must also be asynchronous to allow each articulated robot 402, 404, 406 to enter and exit coordination with the workpiece positioner 408 at any given time. An externally guided motion (EGM) interface (e.g., ABB RobotWare option) may be used to provide an interface by which the real-time target 650 of the main controller 410 can bypass the motion planning of the robot controller(s) 414, 416, 418 and perform the necessary controls to achieve asynchronous coordinated motion. The external motion control and communication for each articulated robot 402, 404, 406 and the workpiece positioner 408 is performed in the print control module 630 of the real-time target 650. EGM uses protocol buffers to serialize motion control messages. Communication is performed via a plurality of user datagram protocol (UDP) streams between the real-time target 650 and the robot controller(s) 414, 416, 418. The robot motion control module(s) 632 use(s) the workpiece positioner's angle to transform toolpath coordinates and adjust the robot's cartesian velocity to follow the deposition trajectory in the workpiece positioner's moving reference frame. The cartesian velocity may be defined by the following mathematical equation (1).

$$\vec{V}_R = -\vec{V}_P + \vec{V}_D + \vec{V}_E \tag{1}$$

where $\vec{V}_R$ is the commanded Cartesian velocity vector for the tool of a robot, $\vec{V}_P$ is the tangential velocity vector of the robot tool caused by the rotation of the workpiece positioner, $\vec{V}_D$ is the tool traversal velocity required for deposition, and $\vec{V}_E$ is the error correction velocity vector. Each vector is expressed in a stationary reference frame in which Cartesian velocities can be commanded via EGM. The workpiece positioner's tangential velocity $\vec{V}_P$ is negative to correct for the relative velocity in the positioner frame. The deposition velocity $\vec{V}_D$ is the nominal deposition velocity with correction from the adaptive height control. The error correction velocity $\vec{V}_E$ uses proportional control to maintain the trajectory by using the error between distance of the planned trajectory and the current position of the robot. The gain is tuned by running multiple toolpaths for each robot.

The positioner motion control module 644 utilizes current robot positions and deposition velocity vectors to adjust the angular velocity of the workpiece positioner 408. The angular velocity may be defined by the following mathematical equation (2).

$$\dot{\theta} = \frac{\vec{r} \times \vec{V}_D}{r^2} \tag{2}$$

where $\dot{\theta}$ is the angular velocity, $\vec{r}$ is the radius vector, and r is the scalar radius. The radius is the Euclidean distance of the distal end of the robot with respect to the center of the workpiece positioner 408. When multiple robots are coordinating with the workpiece positioner 408, the average angular velocity may be used.

In some implementations, the control software may be written in, for example, a graphical programming environment (e.g., LabVIEW programming language). The control software may be deployed on a real-time target running, for example, a National Instruments Linux-based real-time operating system (RTOS). The current development target may include, but is not limited to, an HP EliteDesk 800 G1 SFF desktop with a quad-core Hyper-Threaded Intel Core i7 vPro. The real-time system may communicate with the controller via four 250 Hz user datagram protocol (UDP) communication streams and a single 10 Hz transmission control protocol (TCP) stream. A user interface (UI) may run on a desktop host computer that communicates to the real-time target via a 10 Hz TCP stream. Each welder may communicate with the real-time target at 100 Hz through a digital communication system (e.g., the ArcLink XT protocol) and to the controller via a network protocol (e.g., DeviceNet). The present solution is not limited to the particulars of these implementations.

To fabricate a metal additive part, a CAD model of that part may be exported as an STL file. The CAD model may be sliced into a plurality of layers and processed into a G-Code file with offline toolpath-generation software. The G-Code file may be loaded into a robot programming software (e.g., ABB RobotStudio add-in) that parses the toolpath coordinates into a database file (e.g., JavaScript Object Notation (JSON)) and assigns properties to each layer, bead, and bead segment. The database file format avoids syntactic dissimilarities between different supported G-Code flavors and provides a neutral language by which a computing device or processor can understand instructions from any toolpath generation software.

From the user interface 620 of the computing device 486, the operator 490 may choose build parameters and transfer a database file to the real-time target 650. Parallel modules running on the real-time target 650 establish the necessary communications with their designated hardware. The interface module 636 connects with computing device 486. The executor module 640 connects to the main controller 410. Each welder control module 642 begins communicating with a respective welding torch 440. When all necessary communication streams have been established, the bead logic module 634 loads layers from the database file in memory and distributes atomic deposition tasks among the available articulated robots 402, 404, 406.

The print control module 630 manages the states of a respective articulated robot 402, 404 or 406 via the executor module 640. The executor module 640 communicates with the main controller 410 to send the articulated robots 402, 404, 406 to the service station and/or windows 460, 462, 464 when necessary and opens the external motion control interfaces between the real-time target 650 and the robot controllers 414, 416, 418. The bead logic module 634 and print control modules 630 continue to assign and control deposition tasks in parallel for each articulated robot 402, 404, 406 until the build is complete.

Figure 7:
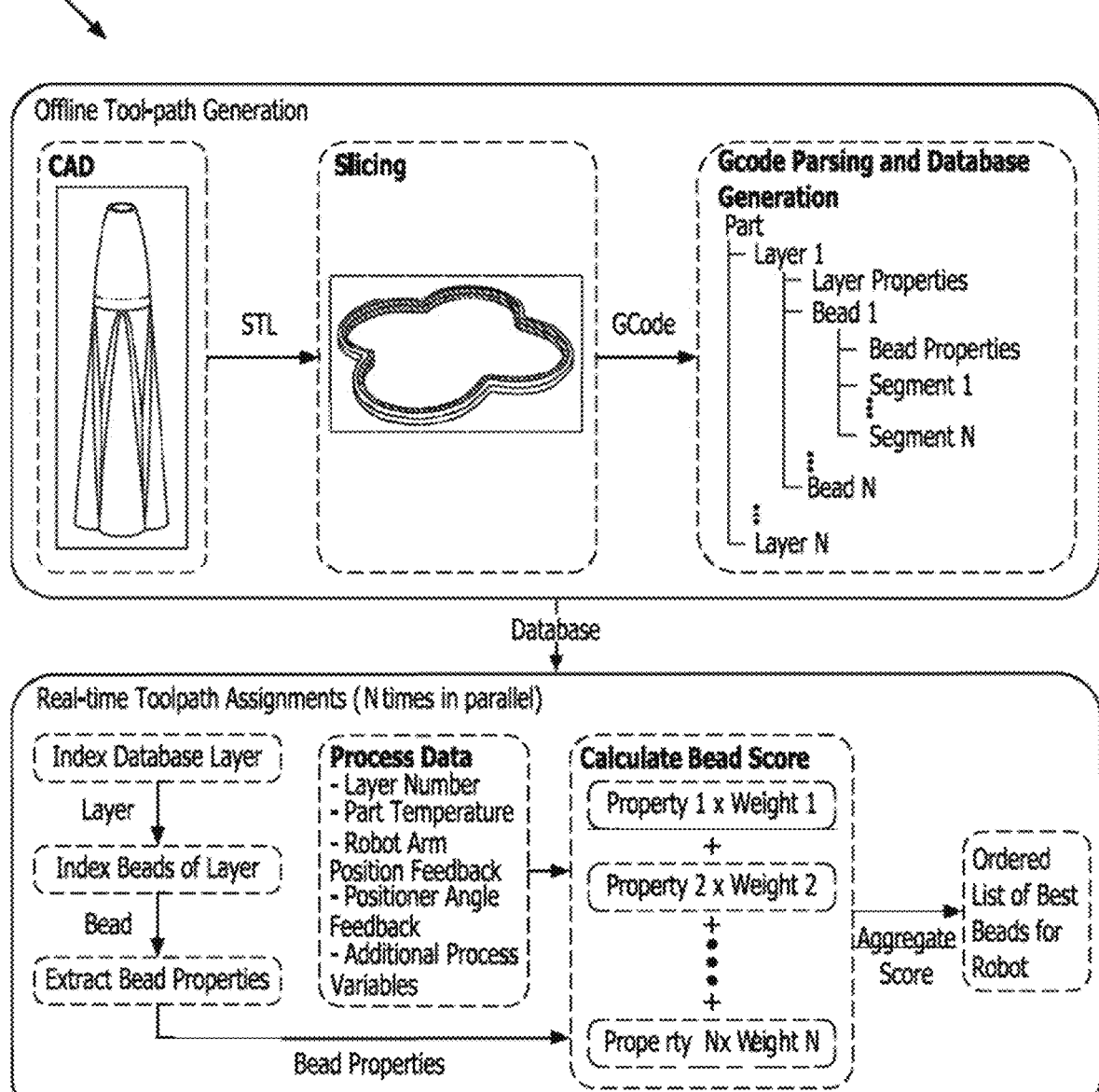
FIG. 7 provides an illustration showing an example machine intelligence algorithm configured to assign deposition toolpaths.

System 400 may employ a machine intelligence algorithm 700 to assign deposition toolpaths. One illustrative machine intelligence algorithm is shown in FIG. 7. The machine intelligence algorithm 700 uses a scoring system to intelligently rank each deposition toolpath in a layer. The properties assigned to layers, beads, and bead segments when creating the database file (e.g., a JSON database file) are used by the bead logic module 634 to determine the remaining deposition toolpaths and provide attributes to the scoring system by which the beads can be scored and/or ranked. The scoring system uses the database properties, real-time system feedback, and the current system states to fill a queue for each printing robot 402, 404, 406 with atomic deposition toolpaths that best satisfy a series of weighted qualifications. The modularity of the bead scoring system allows for a limitless combination of parameters and weights that can be adjusted to reflect the relative criticality of the production criteria for the system or specific build. In some embodiments, the disclosed bead scoring system relies on the distance between the deposition toolpath (e.g., a centroid) and a reference point, for example, the center of the workspace positioner 804 and/or the distance between the deposition or print head (e.g., a torch) to the deposition toolpath (e.g., a starting point or ending point thereof). Shorter distances between the deposition or print head of an articulated robot and the toolpath start point are scored higher. This prevents overextending the articulated arm of a robot across regions of the build volume that could increase the chance of collisions between the articulated robots. The chosen parameters are suitable for geometries with a small cross-section aspect ratio. These geometries generate contour toolpaths that are centered to the positioner, allowing the workpiece positioner 408 to rotate at a consistent velocity. This outcome prioritizes positioner movement and demonstrates the coordinated motion between the articulated robots 402, 404, 406 and the workpiece positioner 408. Although it should be understood that the bead scoring system may be take on other forms. For instance, in one embodiment, a score may be determined based on a position or distance between print heads (e.g., welding torches) of respective robots and a deposition toolpath.

Figure 8:
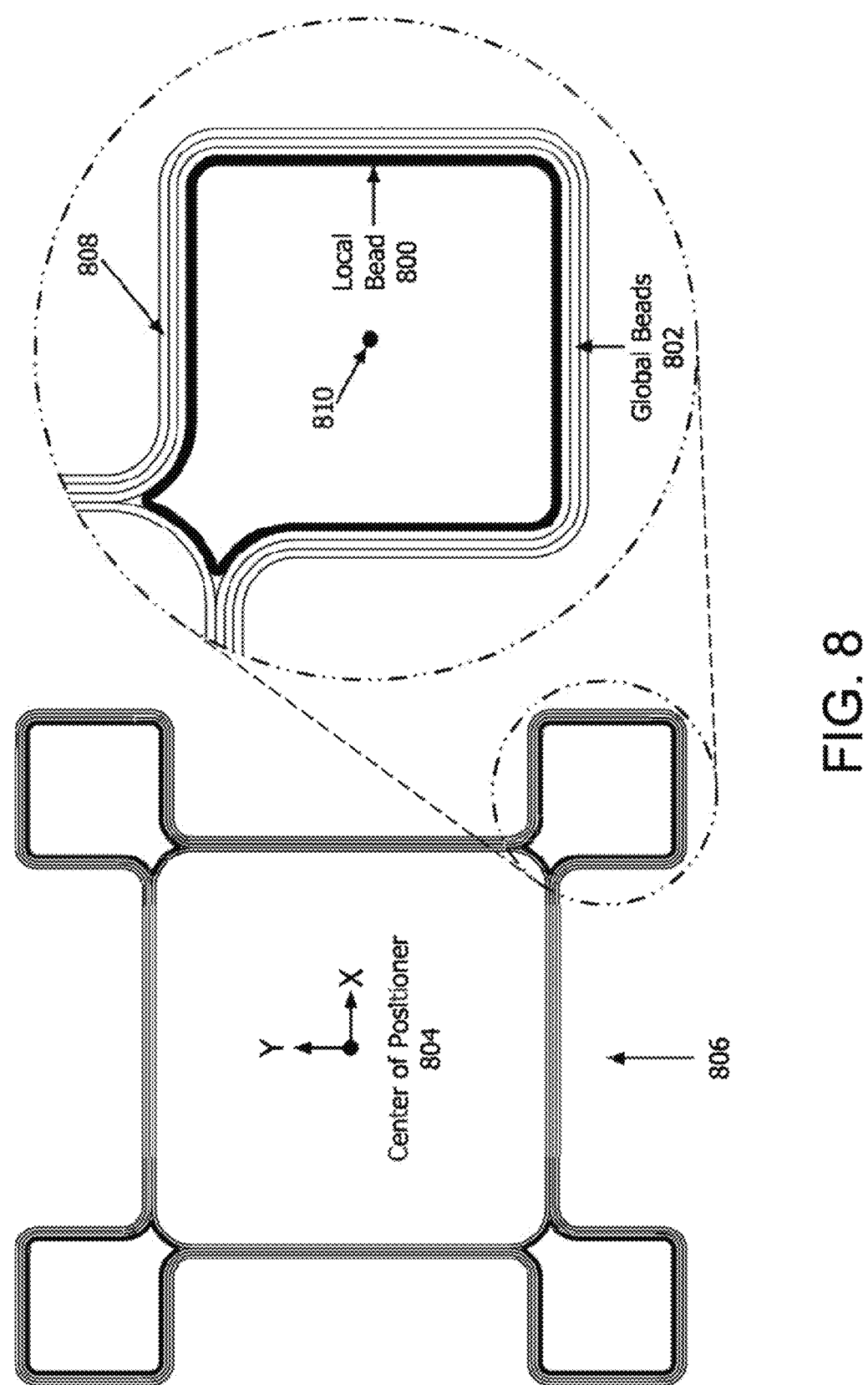
FIG. 8 provides an example illustration showing a visual distinction between global and local toolpath geometries.

Based on the disclosed bead scoring system, each deposition toolpath may be assigned a property that defines whether the bead(s) is(are) global or local. In some example, if the distance between the deposition toolpath's centroid and the center of the workspace positioner 804 falls under a certain threshold, the bead(s) is(are) defined or classified as global bead(s). Otherwise, the bead(s) is(are) defined or classified as local bead(s). The threshold may be dependent on or selected based on the geometry of the bead and the size of the bead path. Bead path size is dependent on the size of the deposition head to prevent robot-to-robot collisions. A visual distinction between global and local toolpath geometries is shown in FIG. 8. In some embodiments, a global bead may be defined based on other attributes, for example, a threshold distance between a deposition tool path (e.g., a starting point or ending point thereof), and another reference point (e.g., a robot arm, or distal end of a torch thereof).

In some embodiments, global beads span across the workspaces 500, 502, 504 of the articulated robots 402, 404, 406 and require full rotations from the workpiece positioner 408 for the robots 402-406 to access every segment of the path. In the example of FIG. 8, local beads 800 are in the workspace (e.g., workspace 504 of FIG. 5) of a single articulated robot (e.g., articulated robot 402 of FIG. 4) and necessitate restricted positioner rotation, within a half rotation, to enable the articulated robot to traverse the entire path. The print state alternates between printing global beads 802 and printing local beads 800. Every available articulated robot can be assigned either all local type beads or all global type beads during these respective states. This ensures that every articulated robot that is printing will require either large or small positioner rotations at the same time. This strategy decreases the downtime of any articulated robot waiting on a valid task and reduces the chances of collisions between articulated robots while printing beads.

Demonstration Builds

Two builds were prepared to test the asynchronous coordinated motion capabilities and machine intelligence of the system. The first build, shown in FIG. 9, was manufactured with Lincoln L59 (AWS ER70S6) mild steel wire using previously developed process parameters.

The shielding gas used was 95% Ar. 5% $CO_2$. The final part measured 184 mm in height (Z) and 978.66 mm in X and Y. Since this was the first use of asynchronous coordinated motion to collaboratively manufacture a component, the part was specifically designed to extend across a significant portion of the positioner to test the general functionality of the system and the motion control module.

The number of print-paths per layer was chosen to be an uneven multiple of the number of deposition heads to demonstrate the basic functionality of the bead scoring system. The build had 80 layers and featured eight beads (four global beads and four local beads) per layer. The bead logic module successfully distributed the groups of global and local deposition paths shown in FIG. 8.

During the build, the welding torch jammed in the automated torch-cleaning station several times. During those times, the bead logic system successfully reassigned beads to the other two robots until an operator could enter the caged cell and remedy the torch-cleaning station failure.

Simulation using ABB RobotStudio was performed on the first build to analyze the print allocation and efficiency of the multi-robot system. A comparison was made between a single robot and the multi-robot configuration. The deposition velocity for an individual robot remained constant to avoid variations in the production time. In the following TABLE 1, the print allocation percentage is the ratio of the assigned print-path length to the entire print-path length. TABLE 1 shows the simulated results of the first build using a multi-robot configuration. In this example, the ideal allocation percentage is 33.3%.

TABLE 1

|  | Print allocation percentage | Total print-path length (mm) |
| --- | --- | --- |
| Robot-1 | 28.6 | 5956 |
| Robot-2 | 39.1 | 8144 |
| Robot-3 | 32.3 | 6739 |

In the following TABLE 2, the print uptime percentage is the ratio of the time during which deposition occurs to the total production time. TABLE 2 shows a simulated comparison between a single robot and multi-robot configuration. Bold indicates better outcome.

| Configuration | Production time (s) | Print uptime percentage |
| --- | --- | --- |
| One robot | 1433 | 85.2 |
| Three robots | 599 | 90.2 |

TABLE 1 shows that a similar distribution of print tasks was assigned to the robots. The difference of the print allocations was caused by the uneven multiple number of print-paths. Robot-2 and Robot-3 were assigned an additional print-path and differed from each other due to their assigned print-path length. The multi-robot configuration had a 6% increase in print uptime percentage compared to using one robot, and the production time was cut by 58%, as shown in TABLE 2.

The second test was designed to analyze the system's productivity, e.g., deposition rate, and investigate the reliability of the hardware and software while running for extended periods of time. The second build, shown in FIG. 10, was designed to approach the maximum height of build envelope.

The desired final dimensions of the part were 1800 mm in height, 510 mm diameter at the base, and 152.4 mm diameter at the top. The sliced part contained 945 layers with three beads per layer and had a wall thickness of 12.9 mm. The small diameter near the top of the part was used to observe the effects of heat input by multiple deposition heads on shorter toolpaths and to test the asynchronous coordinated motion capabilities when the deposition heads are close together. The part was built with Lincoln Electric MIG 410 stainless steel wire (AWS ER410) using established parameters, and tri-mix (90% He, 7.5% Ar, 2.5% $CO_2$) was used as the shielding gas.

Figure 10:
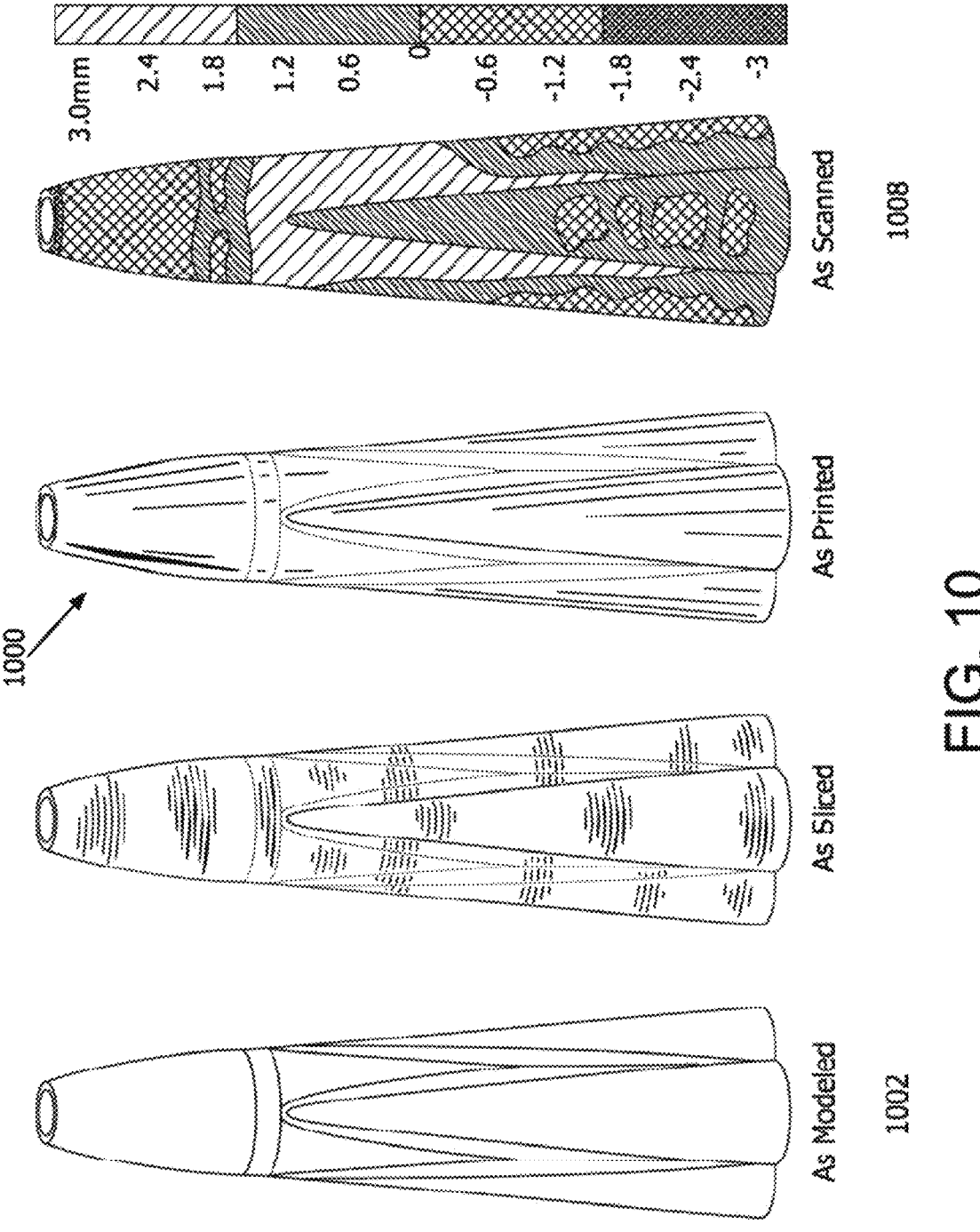
FIG. 10 provides an example illustration showing a build that was prepared to analyze the system's productivity, e.g., deposition rate, and investigate the reliability of the hardware and software while running for extended periods of time. This build was designed to approach the maximum height of build envelope. The system's geometric accuracy was tested as seen in FIG. 10.

The final part weighed 255 kg, and the nominal production rate was 14.7 kg/h. The limiting factor for the production rate of this build was the instability of the weld beads as temperatures approached 1000° C. near the top of the part. As the diameter of the part neared 300 mm at a build height of 1500 mm tall, one of the robots was unassigned print tasks to decrease the total power input. An additional robot was removed for assignment when the diameter reached 205 mm at a build height of 1705 mm tall, allocating all print tasks to a single robot for the remainder of the build. During this process, an available robot was switched with the original printing robot when it executed a service task. This decreased the overall service time required because of the ability to switch robots when the build was limited to less than three arms. Illustration 1008 of FIG. 10 shows the error between the CAD model and a 3D scan of the manufactured component. The average error was 0.46 mm with a standard deviation of 1.38 mm, which matches the 1 mm resolution seen in WAAM.

Simulation tests were also conducted for the second build with the addition of alternating robots to evaluate the performance of switching the active print robot while it is undergoing a service task. Since the second build only consisted of three print-paths per layer, an even distribution of print tasks was assigned for each robot with a slight variance due to the print-path lengths and is seen in the following TABLE 3. TABLE 3 shows simulated results of the second build using a multi-robot configuration. In this example, the ideal allocation percentage is 33.3%.

TABLE 3

| | Print allocation percentage | Total print-path length (mm) |
|---|---|---|
| Robot-1 | 33.3 | 919 |
| Robot-2 | 32.4 | 893 |
| Robot-3 | 34.4 | 946 |

The following TABLE 4 shows that alternating the robots was more effective than operating a single robot system, as it had a 19% and 17% improvement in production time and uptime percentage, respectively. Table 4 shows a simulated comparison between a single-, multi-, and single-alternating-robot configuration. Bold indicates better outcome.

TABLE 4

| | Production time (s) | Print uptime percentage |
|---|---|---|
| One robot | 251 | 67.8 |
| Three robots | 81 | 80.7 |
| Single-alternating robots | 204 | 79.6 |

TABLE 4 also shows that running all three robots resulted in the best performance when ignoring thermal conditions.

As evident from the above discussion, the present solution concerns a multi-robot intelligent deposition system configured to address the productivity and reliability limitations of conventional single-robot large-scale additive manufacturing systems. An extensible real-time print-path assignment strategy was developed whereby a toolpath database is loaded into a bead logic module and atomic deposition tasks are distributed using a bead scoring system. If a robot is temporarily out of service, then the bead logic redistributes the assigned print-paths to the remaining robots. Dynamic assignments lead to uninterrupted deposition and increased productivity. Asynchronous coordinated motion was successfully demonstrated for three robot arms and a one degree of freedom workpiece positioner.

FIGS. 11A-11C provides a flow diagram of an example method 1100 for controlling robots (e.g., articulated robot(s) 402, 404, 406 of FIG. 4) to perform additive manufacturing to produce an object (e.g., object 806 of FIG. 8, 900 of FIG. 9, and/or 1000 of FIG. 10). The operations of blocks 1104-1168 may be performed in the same or different order than that shown. At least some of the operations of method 1110 may be performed by controller(s) 410, 414, 416, 418, 450 of FIG. 4, articulated robot(s) 402, 404, 406 of FIG. 4, and/or sensor(s) 496, 498 of FIG. 4.

Method 1100 begins with 1102 and continues to 1104 where a controller (e.g., controller(s) 410, 414, 416, 418, 450 of FIG. 4) establishes communications with the robots (e.g., articulated robot(s) 402, 404, 406 of FIG. 4). The robots are positioned adjacent to each other such that their workspaces (e.g., workspaces 500, 502, 504 of FIG. 5) at least partially overlap to define a common workspace (e.g., common workspace 506 of FIG. 5) for additive manufacturing of the object. Next in 1106, the controller obtains deposition toolpaths from a datastore (e.g., datastore(s) 452, 454 of FIG. 4). Any technique for accessing a datastore and retrieving information therefrom may be used here. The deposition toolpaths define paths along which beads are to be deposited or otherwise printed for additively manufacturing the object in a layer-by-layer basis or manner. The layer-by-layer basis or manner involves depositing, for each layer of the object, beads along paths associated with the layer. Operations of the robots are monitored by the controller in block 1108. This monitoring may be achieved using sensor data received from sensors of the system (e.g., sensor(s) 430, 488, 496, 498 of FIG. 4).

In block 1110, the controller identifies which of the robots is available for depositing or printing beads. This identification may be based on, for example, whether communication has been established with a robot, whether a robot is experiencing a fault or malfunction, whether a robot is currently performing a task, and/or operational state information for the robots. For example, the processor may: receive, from the robots, respective state information indicative of a robot being one of idle, active, in service, or off; monitor each robot's availability; and detect changes in each robot's availability based at least in part on the robot's state information. If there are no available robots for depositing or printing beads [1112: NO], then method 1200 returns to 1108 where the controller continues to monitor operations of the robots.

If one or more of the robots are available for depositing or printing beads [1112: YES], then the controller assigns a respective subset of the deposition toolpaths to each available robot in block 1114. The operations of block 1114 may include those of the blocks in FIGS. 11B and 11C. This initial deposition toolpath assignment may be made using a cost function and/or based on certain criteria. The criteria can include, but is not limited to, thermal properties T of the object to be manufactured, simulation results s of object deformations, sensor data S indicating temperatures and other thermal-related states of the object and/or portions of the object being manufactured, user defined toolpaths p that need to printed in a given sequence for multi-material layers, expected toolpath completion time(s) the, and/or geometric features g of object to be manufactured. The cost function may be defined as shown by the following mathematical equation (3).

$$F=(w_1 \cdot T)+(w_2 \cdot s)+(w_3 \cdot S)+(w_4 \cdot p)+(w_5 \cdot t_c)+(w_6 \cdot g) \qquad (3)$$

where F represents a cost function result, $w_1$ represents a weight assigned to thermal properties of the object to be manufactured, $w_2$ represents a weight assigned to simulation results of object deformations, $w_3$ represents a weight assigned to sensor data indicating temperatures and other thermal-related states of the object and/or portions of the object being manufactured, $w_4$ represents a weight assigned to user defined toolpaths that need to printed in a given sequence for multi-material layers, and $w_5$ represents a weight assigned to expected toolpath completion time(s), and we represents a weight assigned to geometric features g of object to be manufactured. Each of the weights $w_1$-$w_6$ may be any decimal or integer number selected in accordance with a given application.

In block 1116, the controller instructs each available robot to deposit or print beads along deposition toolpaths in the respective subset of deposition toolpaths. Any known or to be known technique for instructing robots to perform tasks can be used here. Motion control of the robots is coordinated in block 1118 as they deposit or print beads along the deposition toolpaths. The manner in which this coordinated motion control is achieved will become evident as the discussion progresses. Still, it should be understood that the controller is configured to cause the robots to optimally collaborate as they additively manufacture the object within the common workspace. An optimal collaboration may be a function of bead deposition speed, bead deposition placement accuracy, and/or a total number of predicted robot collisions. The robots may be considered as optimally collaborating when the bead deposition speed exceeds a threshold value, a bead deposition placement accuracy exceeds a threshold, and/or there are none or a relatively low number (e.g., <2, 5, 10, etc.) of predicted robot collisions.

In block 1120, the controller monitors operations of the robots as the beads are being deposited or printed. This monitoring may be achieved in the same or similar manner as the monitoring performed in block 1108.

In decision block 1122, the controller determines whether there are any remaining deposition toolpaths remaining or have not been completed. If not [1122: NO], then method 1100 returns to 1106 as shown by block 1124. Otherwise [1122: YES], method 1100 continues to decision block 1126 to determine whether the number of available robots has changed. This determination may be made based on one or more factors. The factors can include, but are not limited to, robot fault, robot malfunction, non-compliance of pre-defined rules specifying possible robot collision due to particular toolpaths being followed by robot(s), robot completion of respective toolpath(s), occurrence of a user-defined anomaly of robot performance, a welding torch malfunction, and/or a welding torch fault. Robot faults and malfunctions are well known. Welding torch malfunctions and faults are well known. The pre-defined rules can include, for example, a rule stating that if a first robot follows a first deposition toolpath and a second robot follows a second deposition toolpath conclude that a possible robot collision will occur. A user-defined anomaly of robot performance can include, but is not limited to, an inability of the robot to articulate or otherwise move its free end to a given area in a workspace due to system configuration and/or implementation. If the number of available robots has not changed [1126: NO], the controller returns to block 1120 and continues to monitor the robots as the beads are being deposited or printed. Otherwise [1126: YES], method 1100 continues to block 1128 of FIG. 11B.

As shown in FIG. 11B, block 1128 involves receiving, by the controller, sensed information relating to the object being additively manufactured at least partially within the common workspace. The sensed information may be received from one or more sensors of the system (e.g., sensor(s) 430, 488, 496, 498 of FIG. 4). In some example, the controller then determines, for each remaining deposition toolpath, a first difference between a centroid (e.g., centroid 810 of FIG. 8) of the remaining deposition toolpath (e.g., deposition toolpath 808 of FIG. 8) and a center (e.g., center 804 of FIG. 8) of the workspace positioner (e.g., workspace positioner 408 of FIG. 4). The controller may optionally select a threshold in block 1132 based on, for example, bead geometry and/or bead path size. If the first distance is less than the threshold [1134: YES], then method 1100 continues to block 1136 where the controller classifies the bead(s) as global bead(s). A global bead comprises a bead which may be deposited by two or more of the robots. The threshold may be selected, for example, to comprise a distance from one side of the common workspace to an opposing side of the common workspace. The common workspace may have a center that is set to center of the workspace positioner. If the first distance is equal to or greater than the threshold [1134: NO], then the controller classifies the bead(s) as local bead(s) in block 1138. A local global bead comprises a bead which may be deposited by only one of the robots. In some embodiments, the controller may determine that a bead is a global bead if the distance between the workpiece (e.g., between a start point or end point of a bead path) and each of two or more robots is below a threshold value such that the two or more robots may deposit the bead. For instance, the controller may utilize a measurement between a distal end of a torch or robot arm and the bead.

Once the beads have been classified as global or local beads, method 1100 continues to block 1140 where the controller determines, for each bead, a second distance from (i) an expected location of a deposition or print head of each remaining robot when depositing or printing the bead to (ii) a starting point of the remaining deposition toolpath. The controller also determines a length or a size of each bead, as shown by block 1142.

For each bead, the controller computes a score in block 1144 using a cost function based on the second distance D and/or the length/size of the bead Bs. The cost function may be that defined by the above-provided mathematical equation (3).

Next in block 1146, the controller defines deposition toolpaths for printing the global beads. The deposition toolpaths may be defined based on the score computed in block 1144. For example, scores may be used to prioritize the beads relative to each other. For example, a bead with a higher score is considered as having a higher priority than a bead with a lower score, and vice versa. Deposition toolpath(s) is(are) then defined for depositing the beads in each given layer in accordance with an order defined by their relative scores and/or priorities.

The control performs operations in block 1148 to assign a respective subset of the defined deposition toolpaths to each available robot. The controller instructs each available robot to deposit or print global beads along the deposition toolpaths in the respective subset, as shown by block 1150. Thereafter, method 1100 continues to block 1152 of FIG. 11C.

As shown in FIG. 11C, block 1152 involves coordinating motion control of robots to deposit or print global beads. The manner in which this coordinated motion control is achieved will become evident as the discussion progresses.

Next in block 1154, the controller determines whether there are local beads that need to be printed. If not [1158: NO], method 1100 continues to block 1160 where it ends or other operations are performed (e.g., return to block 1102).

If there are local beads that need to be printed [1158: YES], method 1100 continues with the operations of blocks 1162-1168. These operations involve: defining deposition toolpaths for printing local beads; assigning a respective subset of the defined deposition toolpaths to each available robot; instructing each available robot to deposit or print local beads along deposition toolpaths in the respective subset; and/or coordinating motion control of robots to deposit or print global beads. Subsequently, method 1100 continues to block 1170 where it ends or other operations are performed (e.g., return to 1102).

FIG. 12 provides a flow diagram of another example method 1200 for controlling a plurality of robots (e.g., articulated robot(s) 402, 404, 406 of FIG. 4). The robots may be disposed adjacent to one another such that workspaces thereof overlap to define a common workspace. Each robot may be configured to additively manufacture an object within the common workspace, and/or configured to additively manufacture an object in a-layer-by-layer manner by following deposition toolpaths in an order defined by a plurality of layers of the object.

Method 1200 begins with 1202 and continues with 1204 where a processor (e.g., controller(s) 410, 414, 416, 418, 450 of FIG. 4) obtains deposition toolpaths along which beads are to be deposited for additively manufacturing the object. The processor then assigns subsets of the deposition toolpaths to available robots, as shown by block 1206. In 1208, the processor instructs each of the available robots to deposit beads corresponding to the deposition toolpaths of a respective one of the subsets of deposition toolpaths assigned thereto.

When a number of available robots changes while manufacturing of the object, the processor performs the operations of following block 1210. These operations involve: (1212) defining new deposition toolpaths for printing beads; (1214) assigning a respective subset of the new deposition toolpaths to each one of the available robots; and (1216) instructing each one of the available robots to deposit beads corresponding to the new deposition toolpaths of the respective subset.

Block 1212 may involve: determining, for each remaining deposition toolpath, a first difference or distance between a centroid of the remaining deposition toolpath and a center of a workspace positioner; classifying beads based on a comparison of the first distance to a threshold; determining, for each bead, a second distance from (i) an expected location of a deposition or print head of each remaining one of the available robots when depositing the bead to (ii) a starting point of the remaining deposition toolpath; and computing, for each bead, a score using the second distance and a bead size. At least one of the beads may be classified as a global bead when the first difference is less than the threshold. The global bead may comprise a bead which may be deposited by two or more of the plurality of robots. At least one of the beads may be classified as a local bead when the first difference is greater than the threshold. The local bead may comprise a bead which may be deposited by only one of the plurality of robots. The score may comprise a weighted combination of the second distance and bead size. First, new deposition toolpaths for depositing global beads may be defined in block 1212 based on the scores associated with the beads classified as global beads. Second, new deposition toolpaths for depositing local beads may be defined in block 1212 based on the scores associated with the beads classified as local beads.

In next block 1218, the robots perform operations to deposit the global and local beads. The global beads may be deposited prior to any of the local beads being deposited. Subsequently, method 1200 continues to block 1220 where it ends, or other operations are performed.

Figure 13:
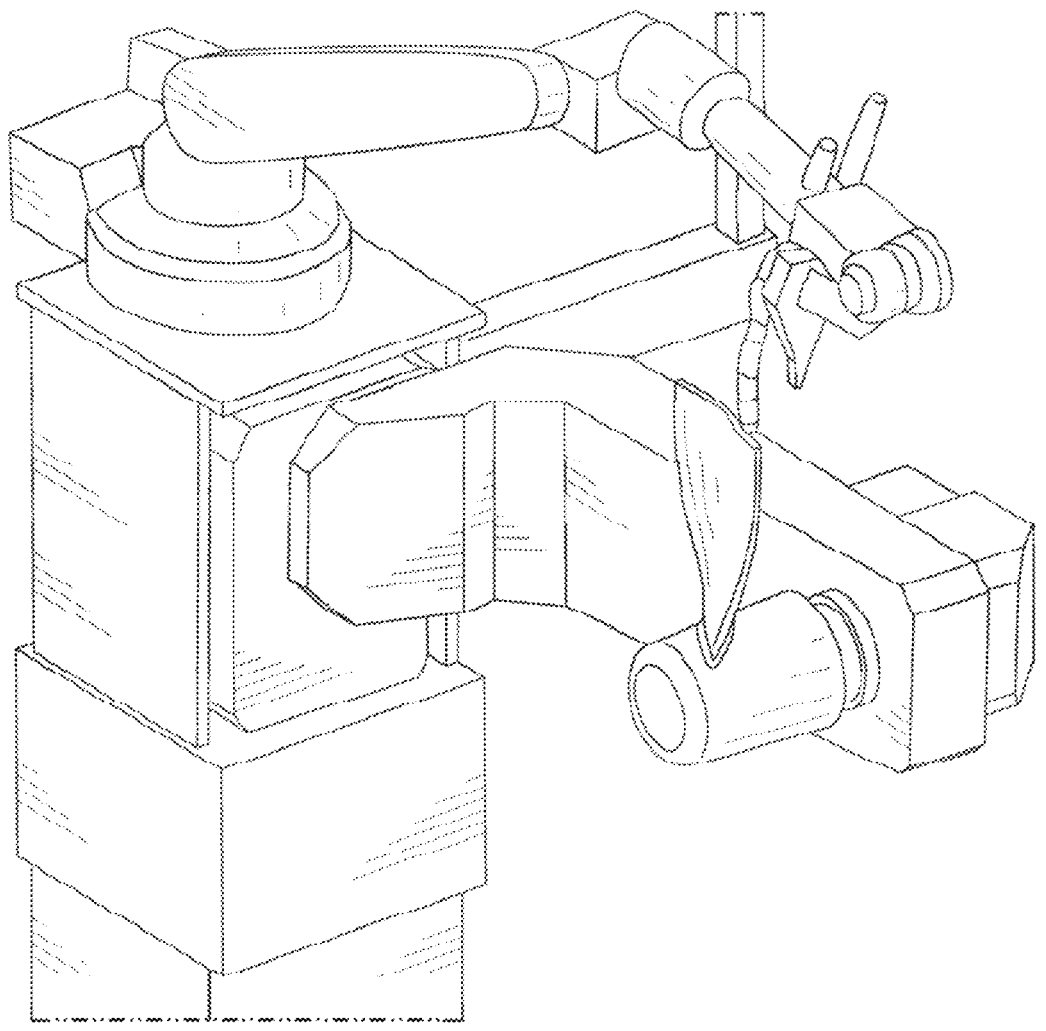
FIG. 13 provides an illustration showing an example of two agents using coordinated motion that was preplanned using computer aided manufacturing.

As noted above, the present solution implements coordinated motion control for the articulated robots (e.g., articulated robot(s) 402, 404, 406 of FIG. 4). Existing methods of coordinated motion control require pre-processed toolpaths to control each individual agent. This method is acceptable for coupled systems such as a 5-axis computer numerical control (CNC) milling machine or a six degree of freedom (6-DOF) robotic arm paired with a one to two degree of freedom (1-2 DOF) robot positioner. FIG. 13 shows an example of two agents (6-DOF robotic arm and a 2 DOF positioner) using coordinated motion that was preplanned using computer aided manufacturing (CAM). Difficulties arise when introducing more agents to the system. The CAM software would need to consider potential collisions with each agent and must pre-plan the full coordination for all agents in the system. This would increase overall labor time as the user must meticulously check for each planned path with each agent to ensure they are in the correct position at the desired time.

Figure 14:
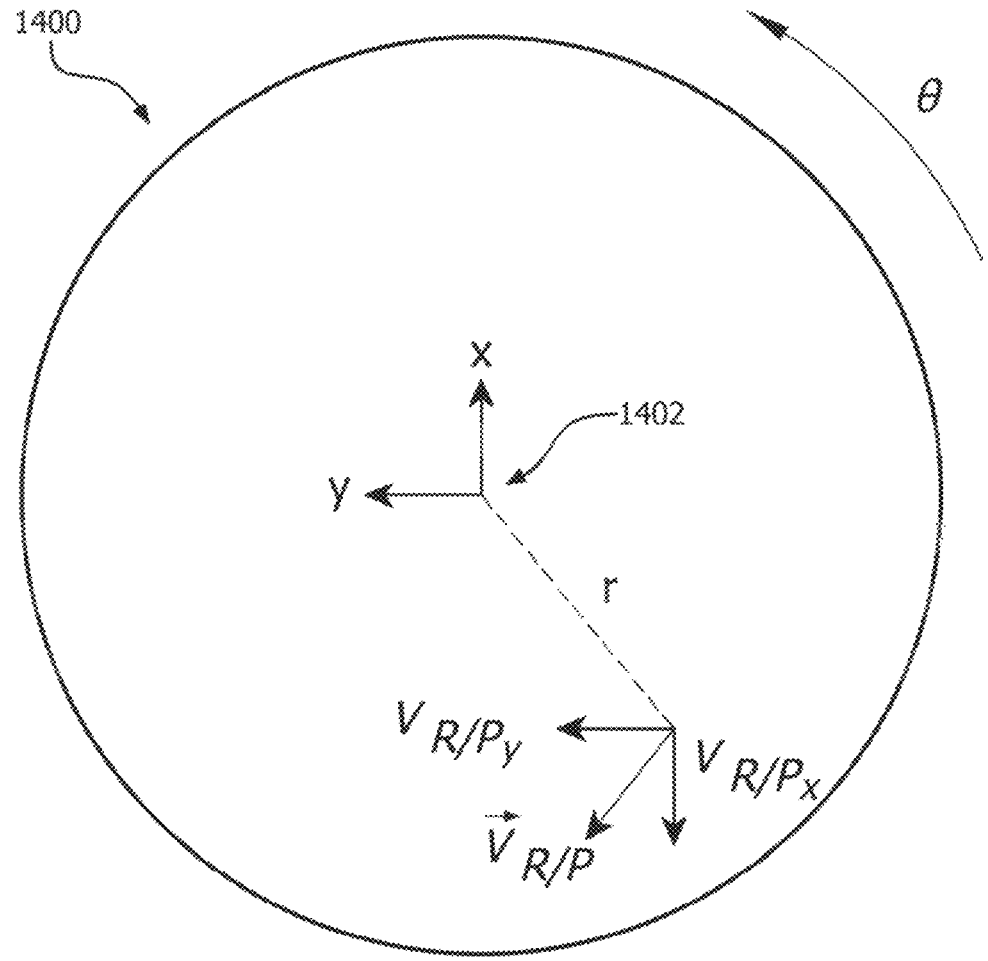
FIG. 14 provides an illustration that is useful for understanding how an average angular velocity is computed for multiple robots.
Figure 16:
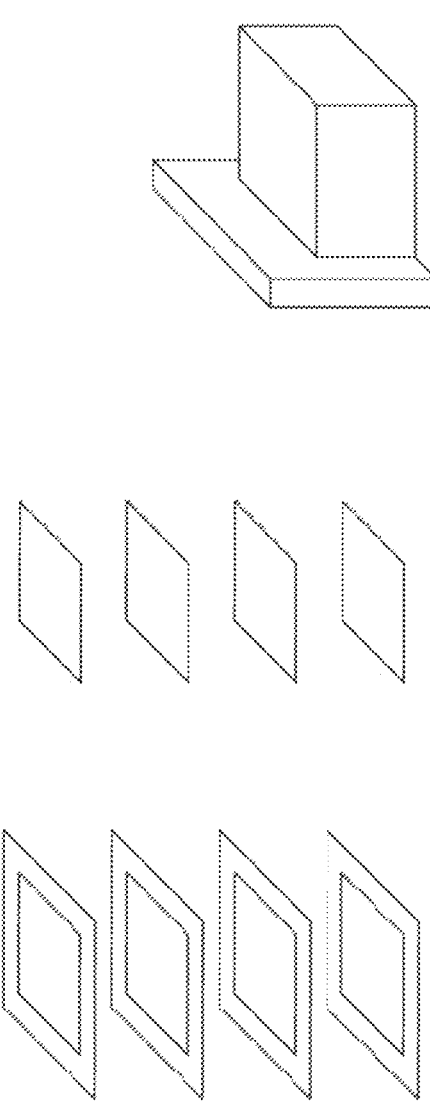
FIG. 16 provides an illustration showing part sections printed with different materials or weld parameters that may result in non-uniform part growth given the same number of layers. On the left side of FIG. 16, layers of both insets and infills are shown. On the right side of FIG. 14, only ¼ section of the insets are printed plus the entire infills.

The proposed solution involves kinematically chaining the agents based on prioritizing a main agent that drives the main motion while the other agents respond to the main agent and adaptively change their trajectory. Velocity based motion control is used to coordinate the motion with the desired toolpaths. This removes the need to rely on the generated deposition toolpaths to have commands for specific joints to coordinate the motion thus simplifying the deposition toolpath generation. The proposed solution uses a one degree of freedom (1-DOF) workpiece positioner table to drive the main motion of the articulated robots (e.g., 6-DOF robotic arms) equipped with tools to enable an additive manufacturing process. The rotational motion of the workpiece positioner is driven using the above-provided mathematical equation (2) for angular velocity. This computation is depicted in FIG. 14. In FIG. 14, $\dot{\theta}$ is the angular velocity. r is a scalar radius of the circle 1400. $\vec{V}_{R/P}$ is the velocity vector of the robot tool relative to the workpiece positioner 408. The robot tool can include, but is not limited to, the heating elements (e.g., welding torches) 440 of FIG. 4 that are disposed at a distal free end of an articulating robotic arm.

$\vec{V}_{R/P}$ is a provided input. The scalar radius r is determined by the distance between an origin point 1402 and the robot tool. When multiple robots are coordinating with the workpiece positioner 408, each angular velocity is determined. An average angular velocity for the multiple robots is then computed. The average angular velocity is used for controlling motion of the workpiece positioner 408.

A robot tool's velocity can be obtained using the following mathematical equation (5).

$$\vec{V}_R = -\vec{V}_P + \vec{V}_L + \vec{V}_E \qquad (5)$$

where $\vec{V}_R$ is a velocity vector of the robot, $\vec{V}_P$ is the tangential velocity vector of the workpiece positioner, $\vec{V}_L$ is a vector for a tool center point velocity which may be referred to as a linear movement velocity vector of a robotic tool, and $\vec{V}_E$ is an error correction velocity vector. $\vec{V}_P$ is negative to correct the relative velocity in relation to the positioner. $\vec{V}_L$ uses the velocity input of $\vec{V}_{R/P}$. Lastly, $\vec{V}_E$ is used to ensure that the robot does not deviate from the deposition toolpath and uses closed loop control to maintain the trajectory. This is addressed above. The error correction velocity $\vec{V}_E$ uses proportional control to maintain the trajectory by using the error between distance of the planned trajectory and the current position of the robot. The gain is tuned by running multiple toolpaths for each robot. An example equation is Ve=Kp*e(t), where Kp is the proportional gain and E(t) is the error between the distance of the planned trajectory and current position of the robot. It should be noted that other forms of the closed-loop controller can be used for obtaining the correction velocity.

The motion control technique described herein enables sharing a workspace by multiple robots, optimizes robot allocation, improves system productivity, and increases quality of the printed part. The motion control technique can be used generally in fields such as manufacturing. More specifically, the disclosed technologies can be used for multi-robot coordination on-the-fly, on-demand, and/or in real time.

FIG. 15 provides a flow diagram of an illustrative method 1500 for controlling motion of robots (e.g., articulated robot(s) 402, 404, 406 of FIG. 4) in a coordinated manner during an additive manufacturing process. The robots may be positioned adjacent to one another such that workspaces thereof overlap to define a common workspace. Each robot may be configured to facilitate additively manufacturing an object within the common workspace, and/or configured to facilitate additively manufacturing an object in a-layer-by-layer manner by following deposition toolpaths in an order defined by a plurality of layers of the object.

The operations of method 1500 may be performed in the same or different order than that shown. Method 1500 may also be combined with the above-described methods. For example, method 1500 may be performed in blocks 1118, 1152, 1168 of FIG. 11, and/or blocks 1208, 1216, 1218 of FIG. 12.

Method 1500 begins with 1502 and continues with 1504 where a workpiece positioner is considered by a processor (e.g., controller(s) 410, 414, 416, 418, 450 of FIG. 4) as a primary agent for driving robotic motion of a system (e.g., system 400 of FIG. 4). A tool center point velocity is obtained in block 1508 for each robot. The tool center point velocity may be pre-defined, pre-specified, previously provided, and/or stored in a local or remote datastore (e.g., datastore 454 of FIG. 4).

Next in block 1510, the processor determines a distance between a center of the workpiece positioner and a robotic tool located at a distal free end of a respective robot. This distance is used as a radius in block 1512 to compute an angular velocity of the workpiece positioner. These operations of blocks 1510, 1512 are repeated for each of the other robots. An average angular velocity is computed in block 1516 by averaging the angular velocities computed for the robots in blocks 1510-1514.

In block 1518, the processor determines, for each robot, a relative tool velocity based on the tool center point velocity and the average angular velocity of the workpiece positioner. The relative tool velocity may be determined using above-provided mathematical equation (5).

A trajectory for at least one robot is adjusted in block 1520 based on the respective relative tool velocity. The trajectory may define a deposition toolpath along which beads are to be deposited for additively manufacturing the object. For example, the tool velocity specified for the trajectory may be replaced with the respective relative tool velocity. The present solution is not limited in this regard. Other adjustments to the trajectory may be made in view of the respective relative tool velocity. The change of the trajectory occurs when the positioner moves since the original path has been relocated by the rotation of the positioner. Limits in the angular velocity can be controlled by the user and movement of positioner can be disabled if needed (e.g., a geometry not suitable with using the positioner).

In block 1522, the rotational motion of the workpiece positioner is controlled based on the average angular velocity computed in block 1516. Any known or to be known technique for controlling rotation motion of a workpiece positioner may be used here. For example, the processor may control actuation of gear(s) and/or motor(s) to increase or decrease the rotational velocity of the workpiece position in accordance the average angular velocity.

The robot(s) is(are) controlled in block 1524 to follow the adjusted trajectory (ies). Any known or to be known technique for controlling robots to follow a trajectory can be used here. For example, the processor may control actuation of joints of an articulating arm so that the tool at the distal free end thereof moves along a path in accordance with the trajectory.

The operations of blocks 1508-1524 may optionally be repeated one or more times until a robotic mission, goal or task is completed. A robotic mission may include, but is not limited to, additively manufacturing one or more objects. A robotic goal may include, but is not limited to, additively manufacturing one or more objects with no or a minimal number of robot collisions. A robotic task may include, but is not limited to, disposing beads in one or more layers. Subsequently, method 1500 continues to block 1528 where it ends or other operations are performed.

Slicer Flexibilities

As noted above, additive manufacturing involves building up multiple layers of material to build a 3D object or part. This technique has also been referred to as WAAM, 3D printing with metal, and metal 3D printing. Additive manufacturing uses a heat source (e.g., a laser, a welding power source) to melt a feedstock material (e.g., a welding wire or a powder) to form a layer on a substrate. When cooled, another layer can be formed on top of the previous layer, and the process may repeat as needed to build up a final shape in a controlled manner.

Figure 17:
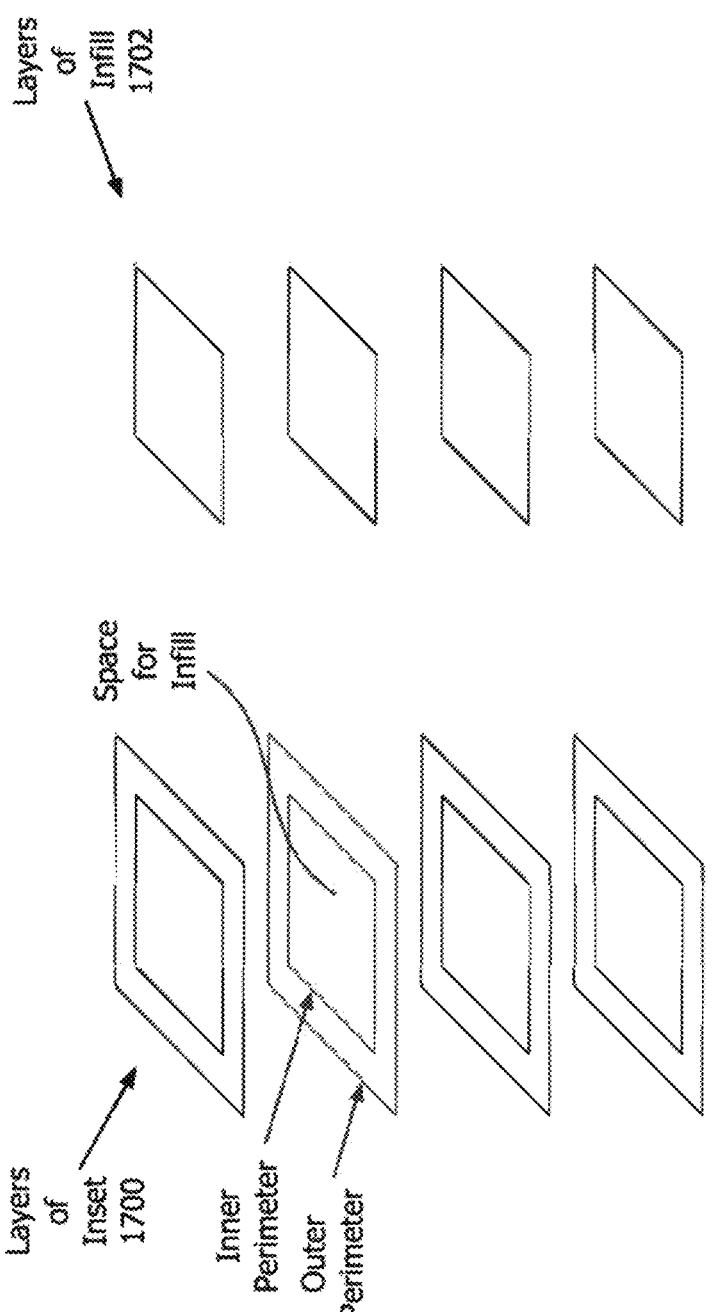
FIG. 17 provides an illustration showing the use of different materials or weld parameters results in different bead heights. To achieve uniform growth of the part, additional layers must be added in regions printed with shorter bead heights.

The present solution is directed to a computer-implemented system that automatically determines a sequence for depositing weld beads comprising different material types, such that each layer uniformly grows vertically (e.g., in the z-direction). The following steps describe an implementation of the present solution in relation to a slicer module. A first step involves calculating a bead or layer height for each material used in wire-arc additive manufacturing. This calculation is based on experimental results. The parameters that determine the layer height include, but are not limited to, extrusion feed rate (i.e., the amount of material extruded per unit time) and print speed (i.e., (the speed at which the print head moves). Next, a bead type is created in the slicer module for each material to be deposited for the 3D printing. In the slicer, a processor selects the correct bead type for each tool path type, e.g., inset and infill, along with the schema choice on how to slice the model into layers. When all settings are selected, the process continues with slicing a loaded part in the slicer module. A different number of layers may be generated for insets and infills. An example is shown in FIG. 17 where there are four layers of inset 1700 and six layers of infill 1702. The order of material deposition, or how different layers of insets and infills are printed, are arranged in slicer module so that all material deposition will be on a solid foundation. If necessary, more variations and flexibilities can be added when different profiles are generated to be applied to different layer ranges.

The present solution allows the generation of various profiles that specify bead spacing, feed rate, print speed, and thus layer height for all materials used for the wire arc additive manufacturing 3D printing. When different profiles are applied for different types of toolpaths in different regions of the part, different numbers of layers may be generated to account for the difference in layer thickness. This ensures level printing, which is critical in structural integrity of an additively manufactured part.

Figure 18:
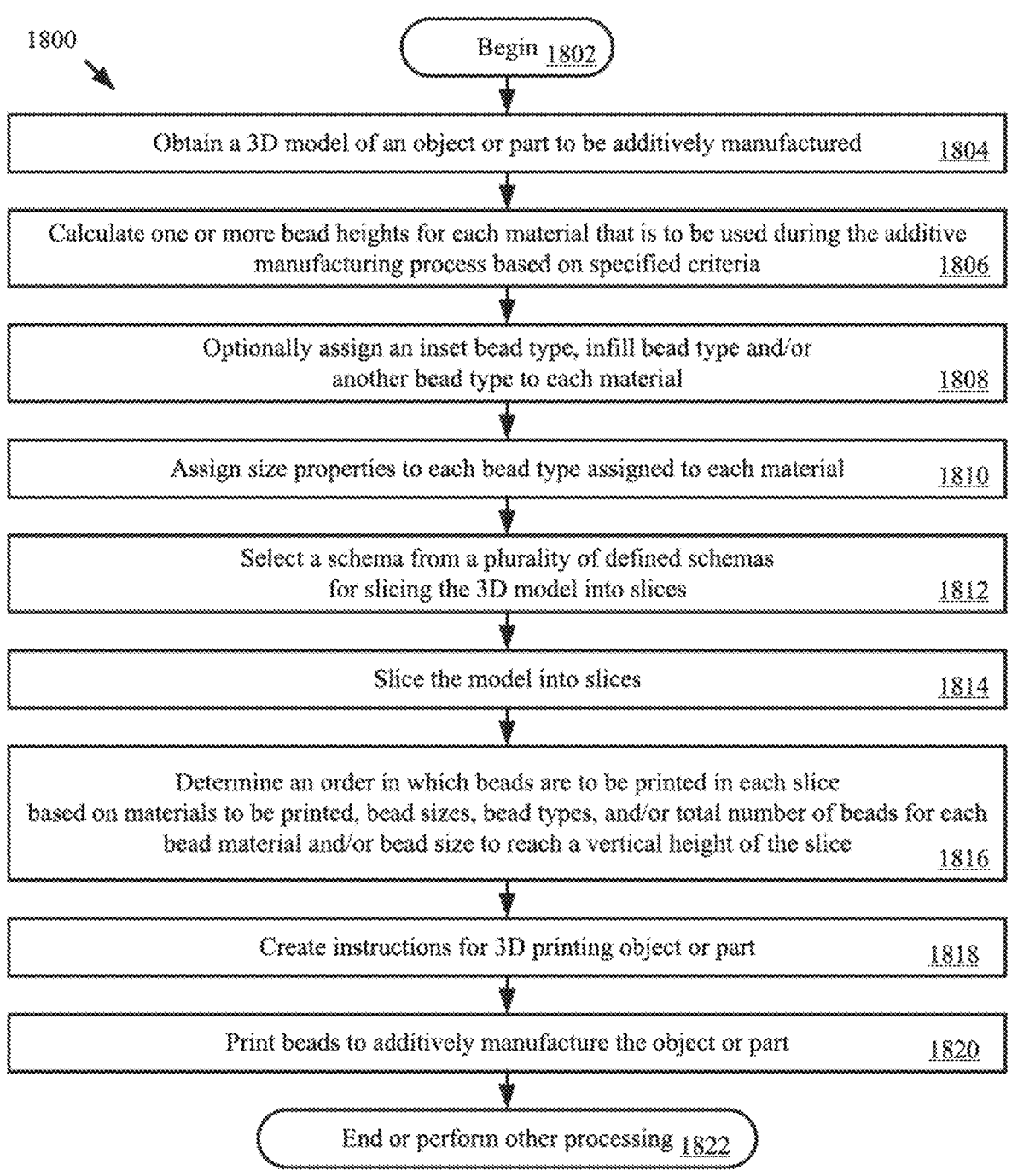
FIG. 18 provides a flow diagram of an illustrative method for additive manufacturing of an object or three-dimensional part.

FIG. 18 provides a flow diagram of an illustrative method 1800 for additive manufacturing of an object or three-dimensional part in accordance with the present solution. Method 1800 may include more or less operations than that shown in FIG. 18. The operations of method 1800 may be performed in the same or different order than that shown. The operations of method 1800 may be performed by robotic system 400 of FIG. 4 or other robotic system.

Figure 19:
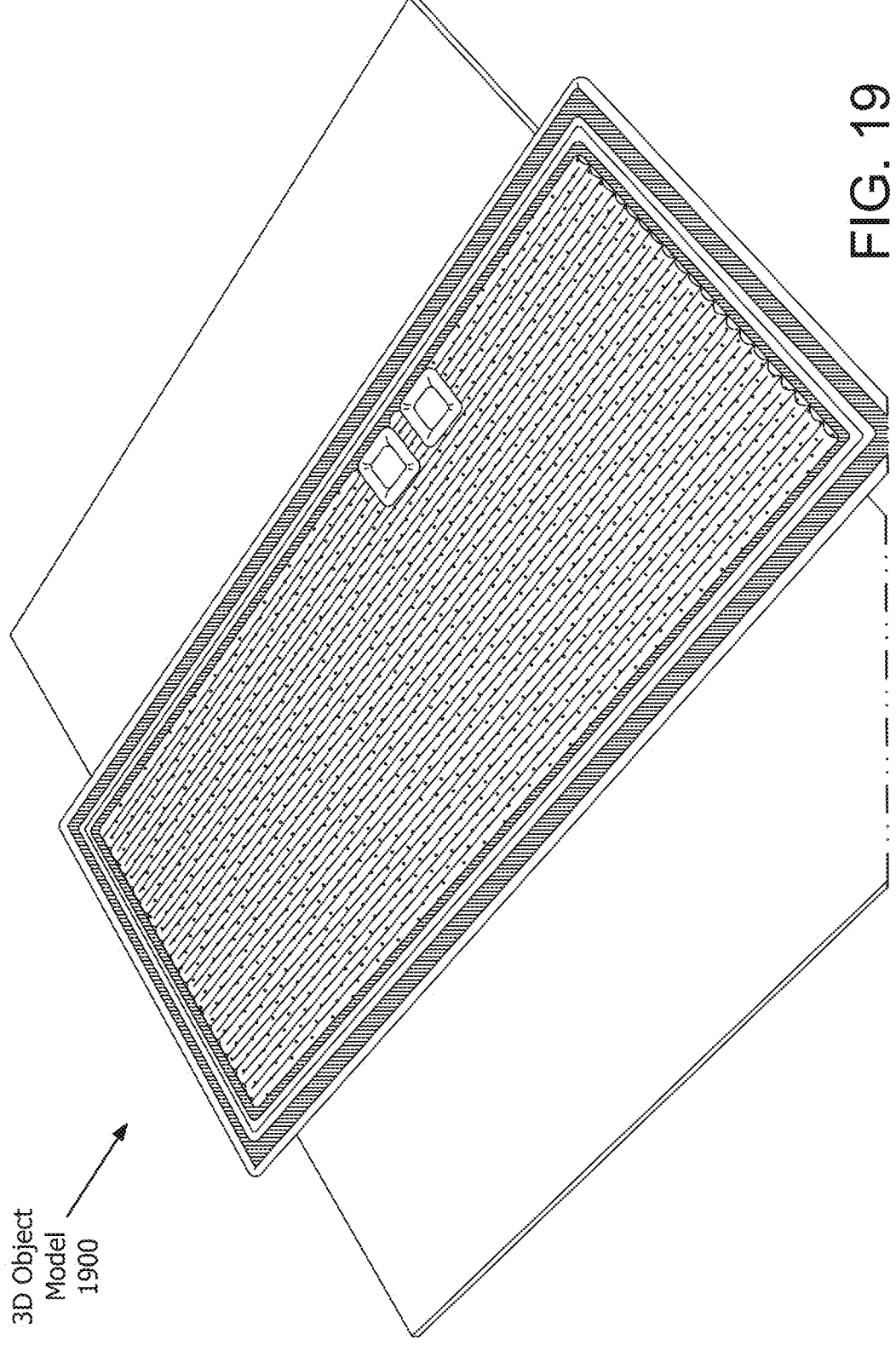
FIG. 19 provides an illustration of a 3D object model.

Method 1800 begins at block 1802 and continues to block 1804 where a processor (e.g., main controller 410 of FIG. 4) obtains a 3D model of an object or part that is to be additively manufactured. The 3D model may be obtained from a local or remote datastore (e.g., datastore 454 of FIG. 4). Any known or to be known 3D model type can be used here. An illustration of a 3D model 1900 is shown in FIG. 19.

Figures 20A, 20B:
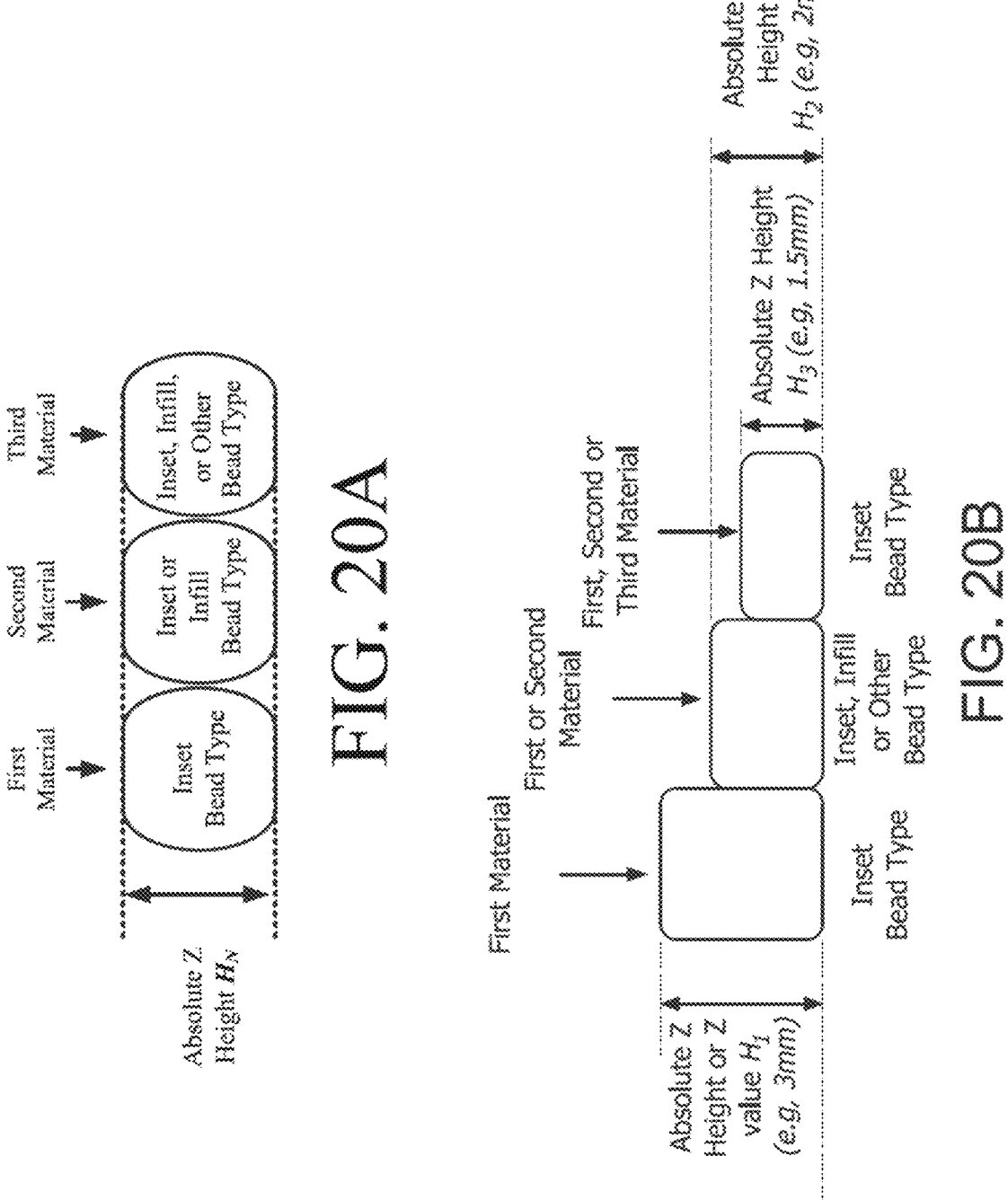
FIGS. 20A-20B (collectively referred to as "FIG. 20") provide illustrations showing absolute Z height scenarios.

Next in block 1806, the processor determines or assigns one or more absolute Z heights for each material that is to be used during the additive manufacturing process based on specified criteria. The specified criteria can include, but is not limited to, an extrusion feed rate and/or a print speed. The absolute Z heights can include, but are not limited to, 1.5 mm, 2.0 mm, and/or 3 mm. FIGS. 20A and 20B provides example illustrations showing different possible scenarios for absolute Z heights. In the scenario of FIG. 20A, beads of three materials are to be printed with a single absolute Z height HN. In the scenario of FIG. 20B, beads of one or more materials are to be printed within a given slice with different absolute Z heights $H_1$, $H_2$, $H_3$. Absolute Z height $H_1$ may be 3 mm. Absolute Z height $H_2$ may be 2 mm. Absolute Z height $H_3$ may be 1.5 mm. The present solution is not limited to the particulars of FIGS. 20A and 20B.

An inset bead type and/or an infill bead type (see example insets and infills in FIG. 17) may optionally be assigned to each material, as shown by block 1808. In some embodiments, the insets may be referred to as outer beads and the infills may be referred to as inner beads, wherein the outer and inner beads are disposed in the same layer. The same material may be used for inset, infill or other bead types. Alternatively, different materials may be used for the inset and/or infill bead types. Thus, each material may be assigned an inset bead type, an infill bead type, other bead type, both an inset bead type and an infill bead type, or combination to two or more types. Although it should be appreciated that other bead type are contemplated. For instance, a layer may include a plurality of bead types, wherein some or all of the plurality of bead types differ in material. For example, a first bead type may comprise a first material, a second bead type may comprise a second material, and a third bead type may comprise a third material.

In block 1810, the processor assigns size properties to each bead type for each material. The size properties can include, but are not limited to, bead height and bead width. The processor selects in block 1812 a schema from a plurality of defined schemas for slicing a 3D model into slices. Any known or to be known schema(s) can be used here. Each schema is defined by slicer module parameters for each layer. The slice parameters which may differ for the schemas can include, but are not limited to, a number of different types of beads per slice, a pattern of beads per slice, a number of starts per slice, and/or a number of stops per slice. The processor then performs operations in block 1814 to slice the 3D model into a plurality of slices. Any known or to be known technique for slicing a 3D model can be used here.

Figure 21A:
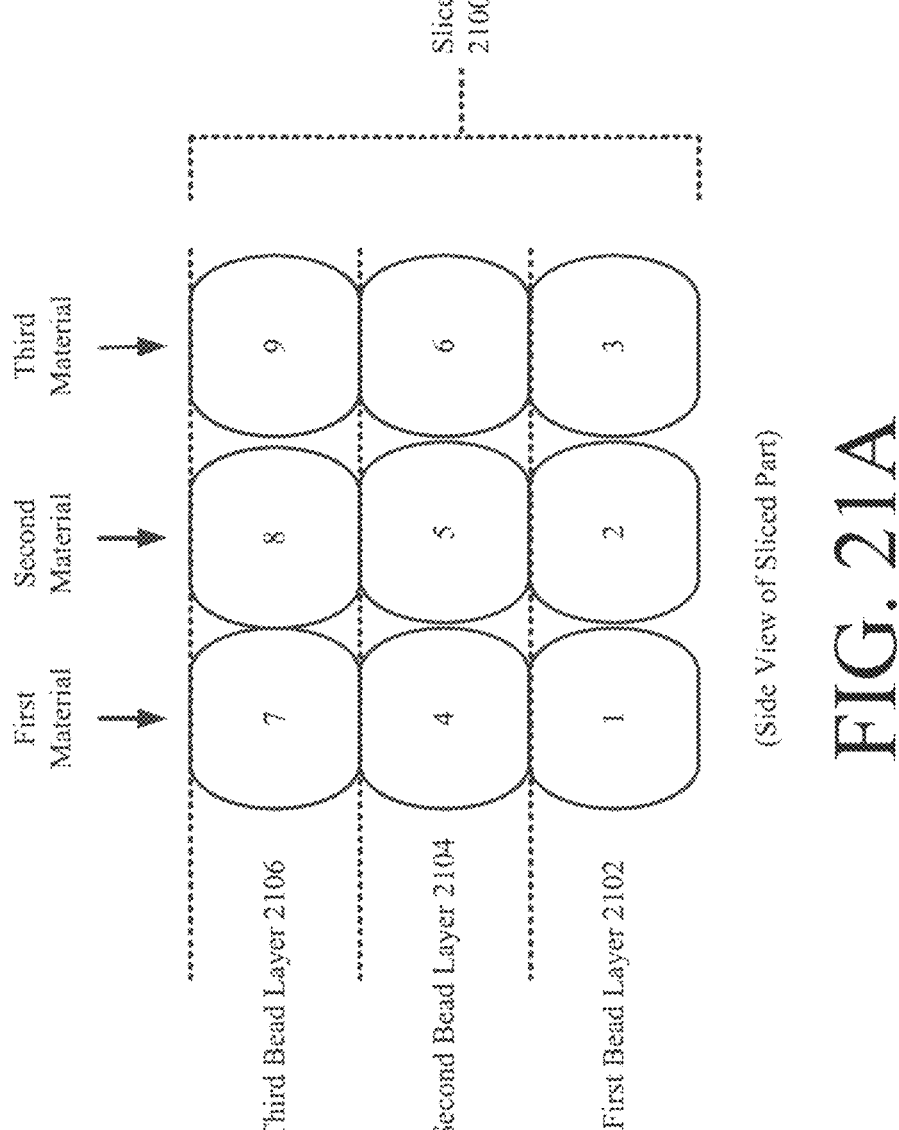
FIGS. 21A-21B (collectively referred to as "FIG. 21") provide illustrations showing illustrative bead orderings for printing beads.
Figure 21B:
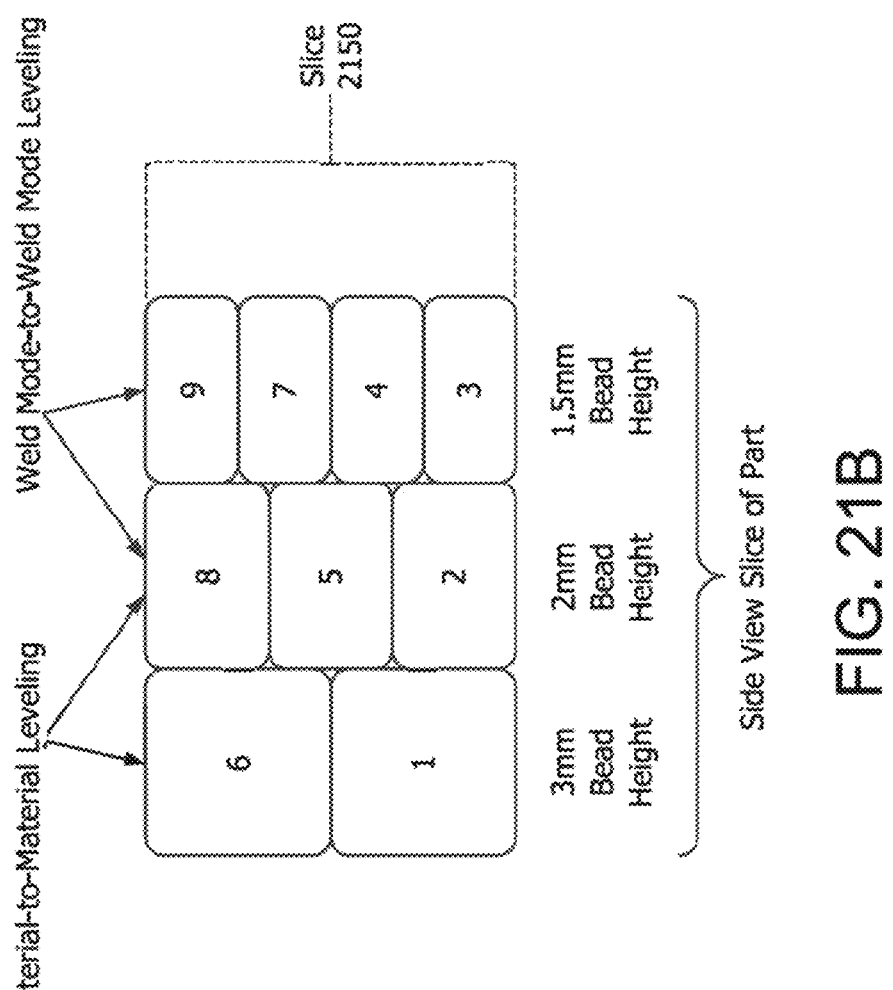
Figure 22A:
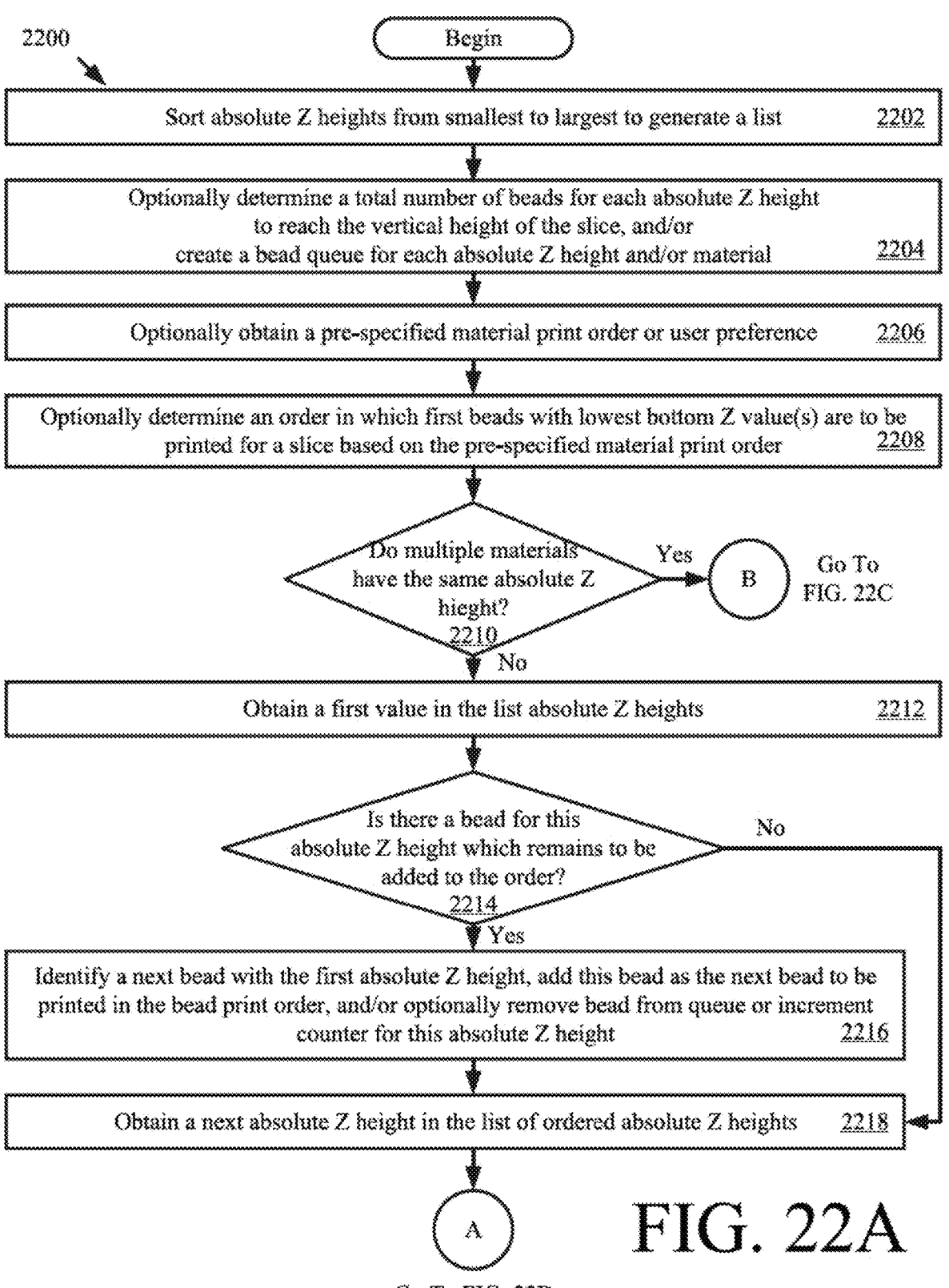
Figure 22B:
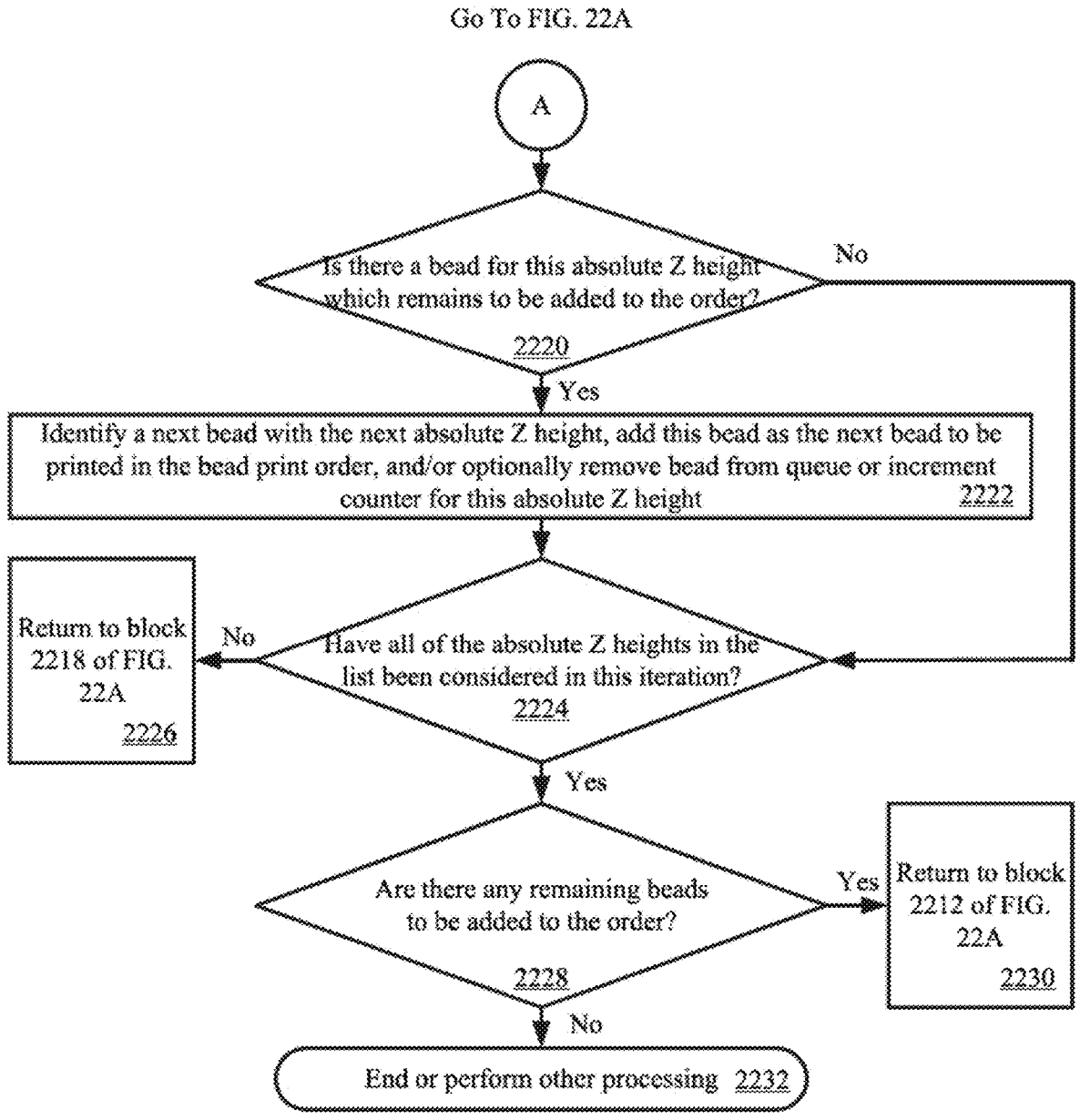

In block 1816, the processor determines an order in which beads are to be printed in each slice based on the process parameters, for example, materials to be printed, bead sizes, bead types (e.g., insert or infill), minimum distance between a bead and a contact tip configured to deposit the bead (i.e., CTWD), a height dimension, weld settings, and/or the total number of beads for each bead material and/or bead size to reach a vertical height of each slice. For example, with reference to FIG. 21A, nine beads are to be printed or otherwise deposited in three bead layers 2102, 2104, 2106 in a left-to-right manner. Numbers 1-9 specify the sequential order in which the nine beads are to be printed or otherwise deposited by the robotic system for slice 2100. The order of the beads in FIG. 21A may be changed in the scenario in which they are to be printed in a right-to-left manner rather than a left-to-right manner. With reference to FIG. 21B, nine beads are to be printed. Numbers 1-9 specify the sequential order in which the nine beads are to be printed or otherwise deposited by the robotic system for slice 2150. The present solution is not limited to the particulars of these scenarios. The manner in which the bead order is determined will be discussed in detail below in relation to FIGS. 22-27.

Next in block 1818, the processor creates instructions for 3D printing the object or part. Printing operations are performed in block 1820 to print beads for additively manufacturing the object or part. Subsequently, method 1800 continues to block 1822 where it ends or other operations are performed. The other operations can include, but are not limited to, returning to block 1802.

FIGS. 22A-22D provides an illustrative flow diagram of an illustrative method 2200 for ordering beads. The operation(s) of method 2200 may be performed in block 1816 of FIG. 18. These operations involve sorting the absolute Z heights from smallest to largest to generate a list of ordered absolute Z heights, as shown by block 2202. For example, there are three possible absolute Z heights for the beads—a first absolute Z height of $H_1$, a second absolute Z height of $H_2$, and a third absolute Z height of $H_3$. The absolute Z heights are listed in the following order: 1.5 mm, 2 mm, 3 mm. The present solution is not limited to the particulars of this example.

Method 2200 continues with optional blocks 2204-2208. Block 2204 involves determining a total number of beads for each absolute Z height associated with a respective bead to reach the vertical height of the slice, and/or creating a bead queue for each absolute Z height and/or material. For example, with reference to FIG. 21B, there are four beads with an absolute Z height of 1.5 mm, three beads with an absolute Z height of 2 mm, and two beads with an absolute Z height of 3 mm for reaching the vertical height of the slice. In embodiments wherein there is a bead queue, each queue may store beads in association with their bottom Z values. A bottom Z value refers to the Z value associated with the lowest point of a bead (e.g., the vertical dimension of the bottom or lowest point of the bead). For example, bead 4 in FIG. 21B would have a bottom Z value or dimension that is lower than the bottom Z value for bead number 5. In this manner, the beads may be stored in an order from lowest to highest bottom Z values. Block 2206 involves obtaining a pre-specified material print order or user preference. For example, three materials are to be used to manufacture the object or part—a first material M #1, a second material M #2, and a third material M #3. The print order of the materials may be pre-specified by a user of the system. The pre-specified material print order specifies the order that beads should be printed based on material, e.g., M #1/M #2/M #3, M #1/M #3/M #2, M #2/M #3/M #1, M #2/M #1/M #3, M #3/M #1/M #2, or M #3/M #2/M #1. The present solution is not limited to the particulars of this example. Block 2208 involves determining an order in which first beads with the lowest bottom Z value(s) are to be printed for the slice based on the pre-specified material print order. For example, the pre-specified material print order is M #1/M #2/M #3. With reference to FIG. 21A, beads 1, 2 and 3 have the same lowest bottom Z value and are printed from left-to-right. Alternatively as shown in FIG. 21B, beads 1, 2 and 3 have the same lowest bottom Z values and are printed from left-to-right in the order shown in FIG. 21B (i.e., starting with bead 1, followed by bead 2, and ending with bead 3). In such embodiments, each of the first beads will have the same bottom Z value (e.g., beads 1-3 in FIGS. 21A and 21B) such that another criteria may determine the order of the beads. For example, the first bead to be printed may be an exterior bead (e.g., along an outer perimeter) and the second bead to be printed may be a bead adjacent to the exterior bead (e.g., an inner bead). In some embodiments, the welding process parameters utilized for the additive manufacturing process may stipulate the initial order of the first beads to be printed.

In next block 2210, the processor determines whether multiple materials have the same absolute Z height. If so [2210: YES], then method 2200 continues to FIG. 22C. FIG. 22C will be discussed below. If not [2210: NO], then method 2200 continues to block 2212 where the processor obtains a first in the list. For example, the processor obtains the first absolute Z height of 1.5 mm. The processor then determines if there is a bead with the first absolute Z height which remains to be added to the order. This determination may be made, for example, by accessing the queue of remaining beads or performing a comparison of counter to total number of beads for this absolute Z height. If not [2214: NO], then method 2200 goes to block 2218 which will be discussed below. Otherwise [2214: YES], then method 2200 continues to block 2216 where the processor identifies a next bead with the first absolute Z height, adds the identified bead as the next bead to be printed in the bead print order, and/or optionally removes the bead from the queue or increments a counter for this absolute Z height. It should be noted here that this branch of operations (i.e., [2210: NO]) concerns the scenario in which multiple materials do not have the same absolute Z height. In the event that multiple materials have the same absolute Z height (see [2210: YES]), the method 2200 would follow the operation of FIG. 22C.

In block 2218, the processor obtains a next absolute Z height in the list of ordered bead heights, for example, the next highest bead height. For instance, the processor may obtain the second absolute Z height of 2.0 mm. Method 2200 continues to block 2220 of FIG. 22B. In block 2200, the processor determines whether there is a bead for this absolute Z height which remains to be added to the order. This determination may be made, for example, by accessing the queue of remaining beads or comparing a counter to total number of beads for this absolute Z height. If not [2220: NO], then method 2200 continues to block 2224 which will be discussed below. Otherwise [2220: YES], method 2200 continues to block 2222 which involves identifying a next bead with the next absolute Z height, adds the bead as the next bead to be printed in the bead print order, and/or optionally removes the bead from the queue or increments a counter for this absolute Z height.

In block 2224, the processor determines whether all beads of the absolute Z heights in the list have been considered in this iteration of the process. If not [2224: NO], then method 2200 returns to block 2218 of FIG. 22A as shown by block 2226. For example, method 2200 returns to block 2218 of FIG. 22A so that a next absolute Z height of 3.0 mm is considered.

Otherwise [2224: YES], then method 2200 continues to block 2228 where the processor determines if there are any remaining beads to be added to the order. If so [2228: YES], then method 2200 returns to block 2212 of FIG. 22A as shown by block 2230. Otherwise, method 2200 continues to block 2232 where it ends or other operations are performed. The other operations can include, but are not limited to, returning to block 2202 of FIG. 22A.

Referring to FIG. 22C, method 2200 may continue to block 2234 [wherein 2210: NO] where the processor obtains a first absolute Z height in the list of ordered absolute Z heights. For example, processor obtains 1.5 mm. The processor then determines if there is a bead for this absolute Z height which remains to be added to the order. This determination may be made, for example, by accessing the queue of remaining beads or comparing a counter to total number of beads for this absolute Z height. If not [2236: NO], then method 2200 continues to block 2242 which will be discussed below. Otherwise [2236: YES], method 2200 continues to block 2238. Block 2238 involves identifying a next bead for each material that is associated with the first absolute Z height. The processor then performs operations in block 2240 to add the next bead(s) to the bead print order), and/or optionally remove bead from queue or increment counter for this absolute Z height. The next bead(s) may be added to print order in any manner. For example, the next bead(s) may be added to the print order in a manner such that the materials are printed in a random manner, or the next bead(s) are added to the print order in accordance with the pre-specified material print order. For example, in some embodiments, there may be two or more materials each having the first absolute Z height. The order for printing these materials may be defined based on other criteria, for example, the conductivity of the material (or another material property thereof), or based on weld parameter settings for each material.

In block 2242, processor obtains a next absolute Z height in the list of ordered absolute Z heights. For example, processor obtains 2 mm. The processor determines if there is bead for this absolute Z height which remains to be added to the order, as shown by block 2244. This determination may be made, for example, by accessing the queue of remaining beads or comparing a counter to total number of beads for this absolute Z height. If not [2244: NO], then method 2200 goes to block 2252 of FIG. 22D as shown by block 2246. Otherwise [2244: YES], the processor identifies in block 2248 a next bead for each material that is associated with this absolute Z height. Method 2200 continues to block 2250 of FIG. 22D. Block 2250 involves performing operations by the processor to add the next bead(s) to the bead print order randomly, based on other criteria (e.g. conductivity, weld parameter settings), in accordance with the pre-specified material print order, or an increment counter for each material. The processor then determines in block 2252 if all of the absolute Z heights in the list have been considered in this iteration of the process. If not [2252: NO], then method 2200 return to block 2242 of FIG. 22C as shown by block 2254. If so [2252: YES], then method 2200 continues to block 2256 where the processor determines if there are any remaining beads to be added to the order. If so [2256: YES], method 2200 returns to block 2234 of FIG. 22C as shown by block 2258. Otherwise [2256: NO], method 2200 continues to block 2260 where it ends or other operations are performed. The other operations can include, but are not limited to, returning to block 2202.

FIGS. 21A and 21B each shows an illustration of a bead ordering in the scenario in which there is no pre-specified material print order and there is only one height for each material. The ordering shown in FIGS. 21A and 21B may result from performing the operations of blocks 2212-2232 of FIGS. 22A-22B.

FIG. 23 provides a flow diagram of an illustrative flow diagram of an illustrative method 2300 for ordering beads based on bottom or top Z values thereof, wherein the bottom or top Z values, wherein the top Z values represent an uppermost or top vertical dimension of the corresponding bead. The operation(s) of method 2300 may be performed in block 1816 of FIG. 18.

Method 2300 begins at block 2302 and continues to block 2304 where the processor creates a bead queue storing beads in association with their bottom or top Z values. In next block 2306, the processor identifies bead(s) with the lowest bottom or top Z values. If there are multiple beads with the identified lowest bottom or top Z value [2308: YES], then method 2300 continues to block 2310 where the processor performs operations to add the identified beads to the bead print order randomly or based on pre-specified material print order or user preference. If there is a single bead with this Z value [2308: NO], then method 2300 continues to block 2312 where the processor performs operations to add the identified bead to the bead print order. Upon completing the operations of block 2310 or 2312, method 2300 continues to block 2314 where the bead(s) (that were added to the print order) is(are) removed from the queue. If there are any remaining beads to be added to the list [2316: YES], method 2300 returns to block 2306 to perform another iteration of the process. Otherwise [2316: NO], method 2300 ends or the processor performs other operations as shown by block 2318. The other operations can include, but are not limited to, returning to block 2302.

Figure 24A:
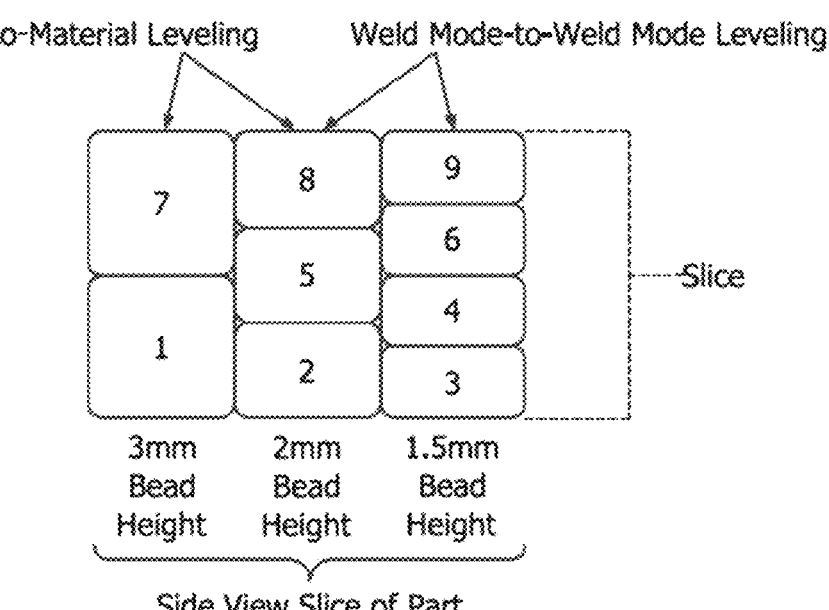
FIGS. 24A-24B (collectively referred to as "FIG. 24") provide illustrations showing illustrative bead orderings for printing beads in accordance with the method of FIG. 23 when considering bottom Z values.

FIG. 24A shows an illustration of a bead ordering in the scenario in which (i) the beads are ordered based on their bottom Z values, (ii) there is no pre-specified material printer order or user preference, and (iii) there is only one height for each material. The ordering shown in FIG. 24A may result from performing method 2300 of FIG. 23. It should be noted that beads 1, 2 and 3 have the same bottom Z values. In the scenario of FIG. 24A, these beads 1, 2 and 3 are ordered from left to right. The present solution is not limited in this regard.

Figure 24B:
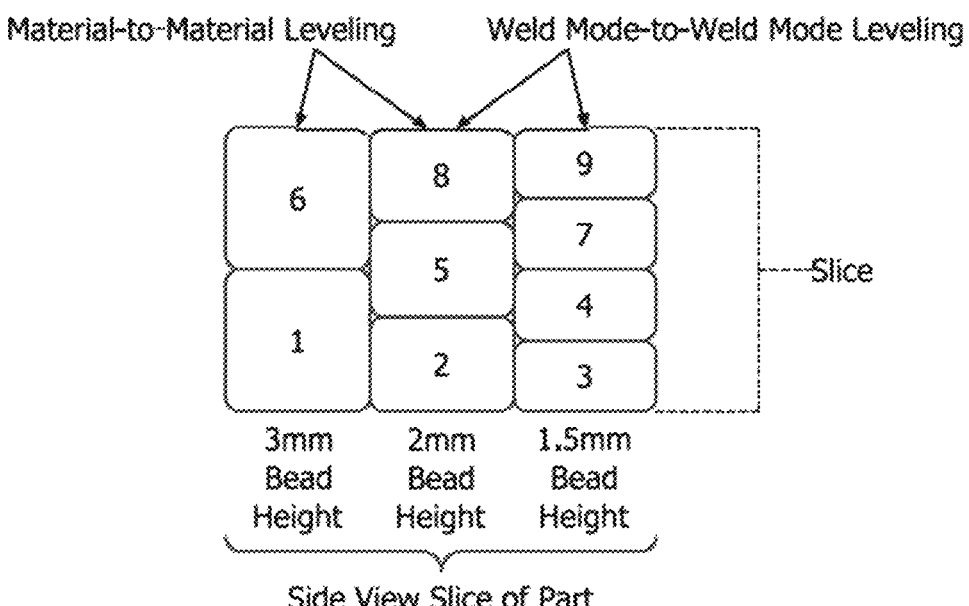

FIG. 24B shows an illustration of a bead ordering in the scenario in which (i) the beads are ordered based on their bottom Z values, (ii) there is a pre-specified material printer order or user preference, and (iii) there is only one height for each material. The ordering shown in FIG. 24B may result from performing method 2300 of FIG. 23.

Figure 25:
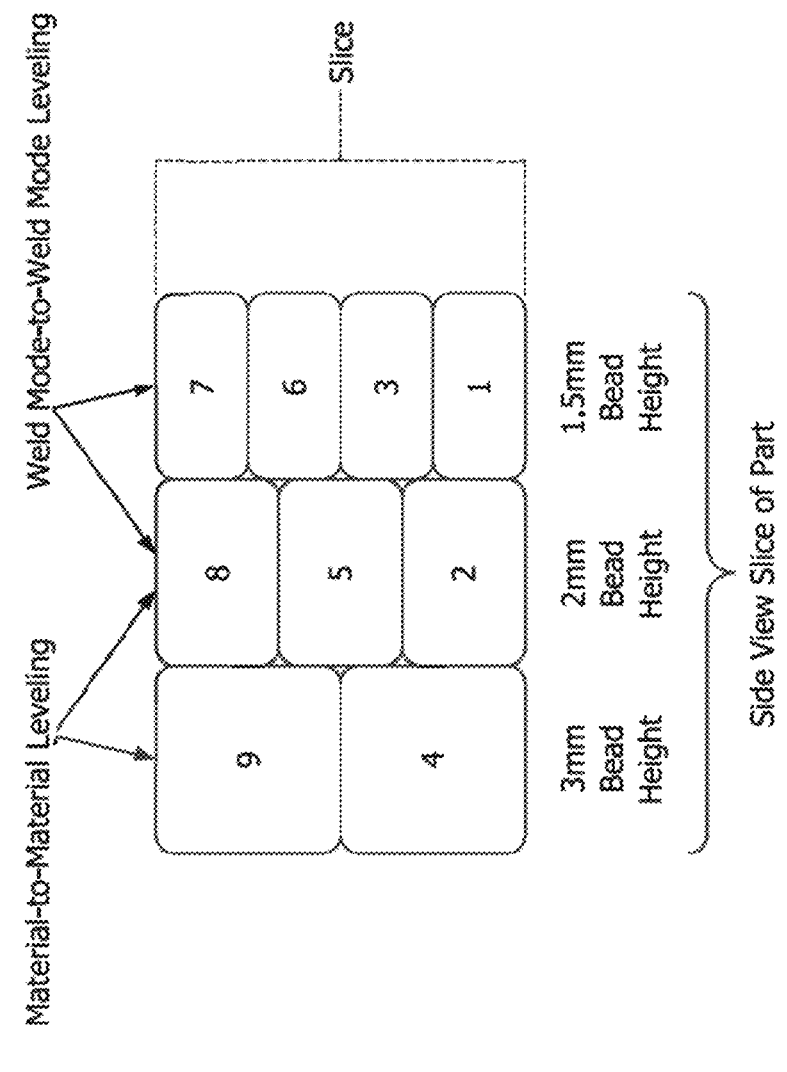
FIG. 25 provides an illustration showing an illustrative bead ordering for printing beads in accordance with the method of FIG. 23 when considering top Z value.

FIG. 25 shows an illustration of a bead ordering in the scenario in which (i) the beads are ordered based on their top Z values, (ii) there is no pre-specified material printer order or user preference, and (iii) there is only one height for each material. The order of beads 3 and 4 may be swapped in accordance with a pre-specified material printer order or user preference. The order of beads 7, 8 and 9 may be changed in accordance with a pre-specified material printer order or user preference.

Figure 26:
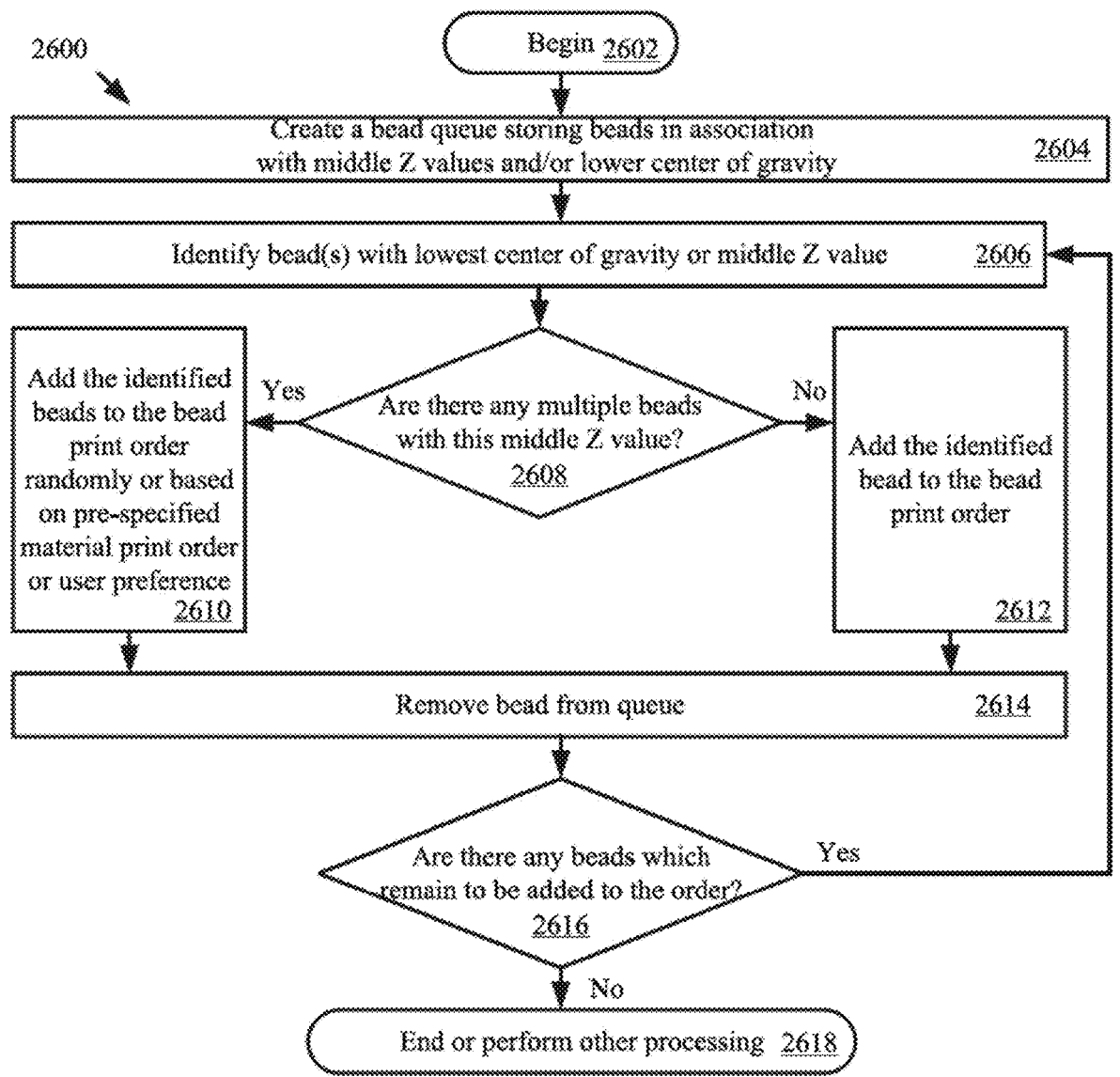
FIG. 26 provides a flow diagram of another illustrative method for ordering beads.

FIG. 26 provides a flow diagram of an illustrative method 2600 for ordering beads based on center of gravity or middle Z values thereof. The operation(s) of method 2600 may be performed in block 1816 of FIG. 18.

Method 2600 begins at block 2602 and continues to block 2604 where the processor creates a bead queue storing beads in association with their middle Z values. A middle Z value refers to a Z value of a center or middle point (e.g., a center or middle vertical height dimension) of the bead and/or a point at which the center of gravity of the beads exists. In block 2606, the processor identifies bead(s) with the lowest center of gravity or middle Z values. If there are multiple beads with this center of gravity or middle Z value [2608: YES], then method 2600 continues to block 2610 where the processor performs operations to add the identified beads to the bead print order. The identified beads may be added to print order in any manner. For example, the beads may be added to the print order in a manner such that the materials are printed in a random manner, or the beads are added to the print order in accordance with the pre-specified material print order. If there is a single bead with this center of gravity or middle Z value [2608: NO], then method 2600 continues to block 2612 where the processor performs operations to add the identified beads to the bead print order. Upon completing the operations of block 2610 or 2612, method 2600 continues to block 2614 where the bead(s) (which were added to the bead print order) is(are) removed from the queue. If there are any remaining beads to be added to the list [2616: YES], method 2600 returns to block 2606 to perform another iteration of the process. Otherwise [2616: NO], method 2600 ends or the processor performs other operations as shown by block 2618. The other operations can include, but are not limited to, returning to block 2602.

Figure 27:
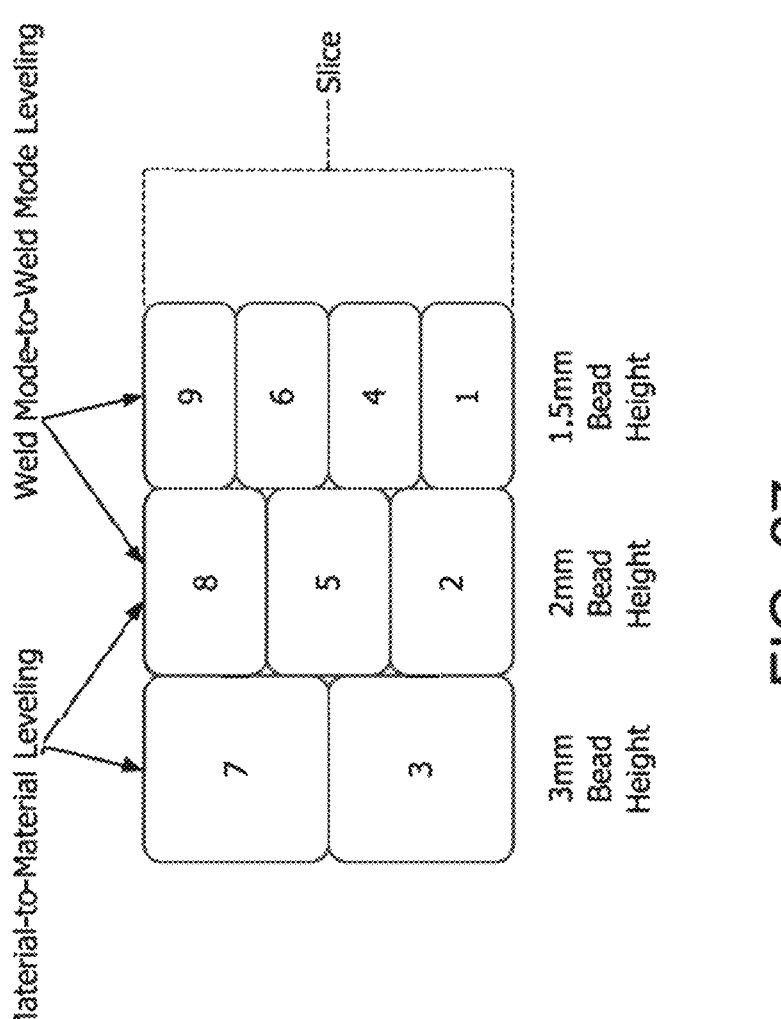
FIG. 27 provides an illustration showing an illustrative bead ordering for printing beads in accordance with the method of FIG. 26.

FIG. 27 shows an illustration of a bead ordering in the scenario in which (i) the beads are ordered based on their center of gravities or middle Z values, and (ii) there is only one height for each material. The ordering shown in FIG. 227 may result from performing method 2600 of FIG. 26.

Figure 28:
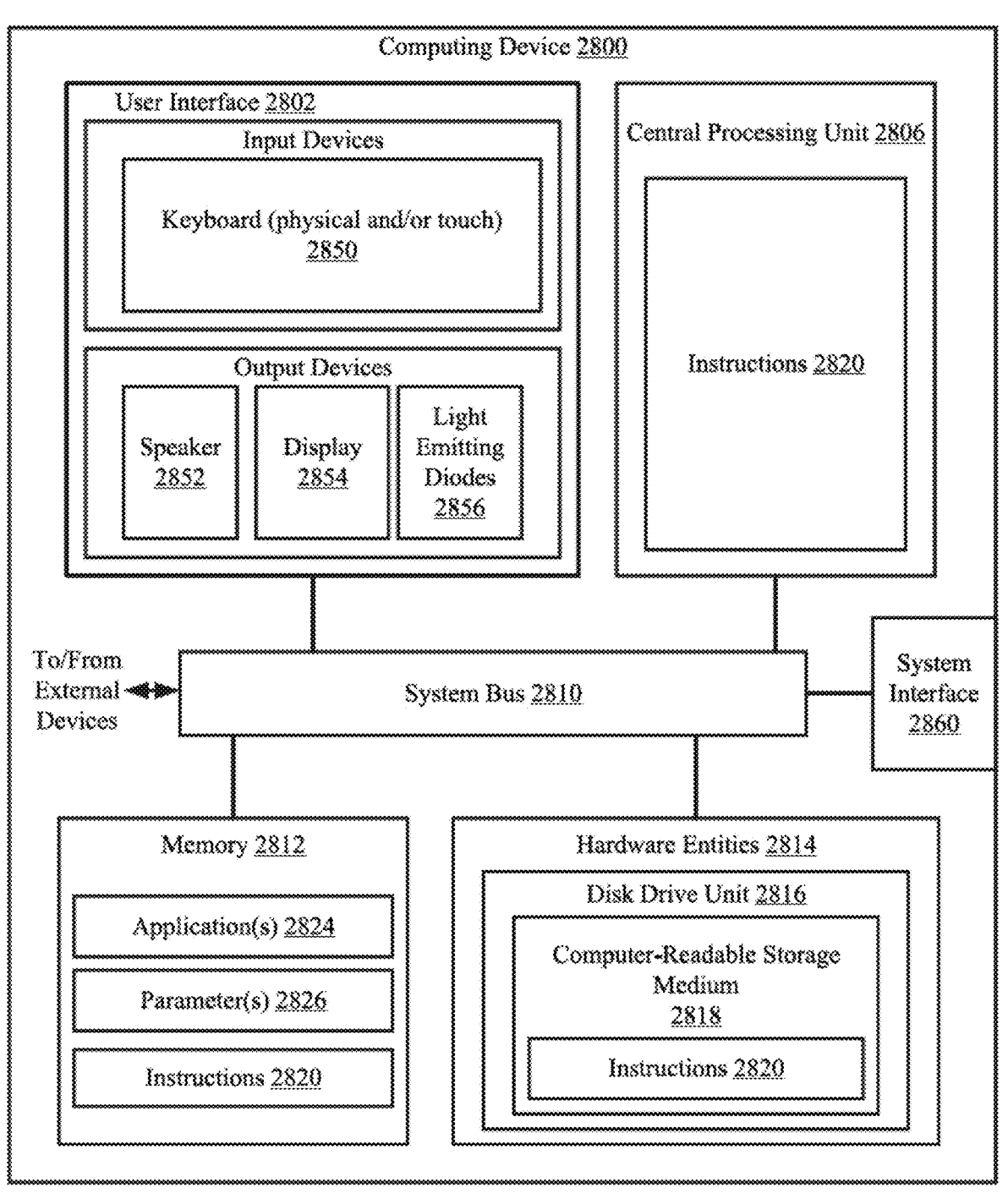
FIG. 28 provides a block diagram of an illustrative architecture for a computing device.

Referring now to FIG. 28, there is shown an illustrative architecture for a computing device 2800. The controller(s) 410, 414, 416, 418, 450 of FIG. 4 and/or computing device 486 of FIG. 4 is/are the same as or similar to computing device 2800. As such, the discussion of computing device 2800 is sufficient for understanding the components 410, 414, 416, 418, 450, 486 of FIG. 4.

Computing device 2800 may include more or less components than those shown in FIG. 28. However, the components shown are sufficient to disclose an illustrative solution implementing the present solution. The hardware architecture of FIG. 28 represents one implementation of a representative computing device configured to receive information, process the receive information, transmit information and/or control operations of one or more robots, as described herein. As such, the computing device 2800 of FIG. 28 implements at least a portion of the method(s) described herein.

Some or all components of the computing device 2800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or controllers (e.g., controllers comprising microprocessors). The passive and/or active components can be adapted to, arranged to and/or programmed to perform one or more of the methodologies, procedures, or functions described herein.

As shown in FIG. 28, the computing device 2800 comprises a user interface 2802, a Central Processing Unit (CPU) 2806, a system bus 2810, a memory 2812 connected to and accessible by other portions of computing device 2800 through system bus 2810, a system interface 2860, and hardware entities 2814 connected to system bus 2810. The user interface can include input devices and output devices, which facilitate user-software interactions for controlling operations of the computing device 2800. The input devices include, but are not limited to, a physical and/or touch keyboard 2850. The input devices can be connected to the computing device 2800 via a wired or wireless connection (e.g., a Bluetooth® connection). The output devices include, but are not limited to, a speaker 2852, a display 2854, and/or light emitting diodes 2856. System interface 2860 is configured to facilitate wired or wireless communications to and from external devices (e.g., network nodes such as access points, etc.).

At least some of the hardware entities 2814 perform actions involving access to and use of memory 2812, which can be a Random Access Memory (RAM), a disk drive, flash memory, a universal serial bus (USB) drive and/or another hardware device that is capable of storing instructions and data. Hardware entities 2814 can include a disk drive unit 2816 comprising a computer-readable storage medium 2818 on which is stored one or more sets of instructions 2820 (e.g., software code) configured to implement one or more of the methodologies, procedures, or functions described herein. The instructions 2820 can also reside, completely or at least partially, within the memory 2812 and/or within the CPU 2806 during execution thereof by the computing device 2800. The memory 2812 and the CPU 2806 also can constitute machine-readable media. The term "machine-readable media", as used here, refers to a single medium or multiple media (e.g., a centralized or distributed database, and/or associated caches and servers) that store the one or more sets of instructions 2820. The term "machine-readable media", as used here, also refers to any medium that is capable of storing, encoding or carrying a set of instructions 2820 for execution by the computing device 2800 and that cause the computing device 2800 to perform any one or more of the methodologies of the present disclosure.

As evident from the above discussion, the present solution concerns an additive manufacturing system (e.g., system 400 of FIG. 4) comprising: a wire-arc welding system (e.g., robot(s) 402, 404 and/or 406 of FIG. 4) configured to deposit at least a first weld bead comprising a first process parameter and a second weld bead comprising a second process parameter; and a controller (e.g., main controller 410 of FIG. 4). The wire-arc welding system can include one or more robots. An illustrative wire-arc welding system with three robots 402, 404 and/or 406 is shown in FIG. 4. The present solution can be used with a wire-arc welding system having more or less robots. The controller comprises logic to: receive input data to print a three-dimensional part comprising at least the first weld bead and the second weld bead (wherein the input data comprises the first process parameter and the second process parameter); and determine a sequence defining an order of depositing the first weld bead and the second weld bead based on the first process parameter and the second process parameter.

The first process parameter can include, but is not limited to, a first bead dimension (e.g., an absolute Z height, a lowest bottom or top Z value, a middle Z value, etc.), a first material type, and/or a first weld setting. The second process parameter can include, but is not limited to, a second bead dimension (e.g., an absolute Z height, a lowest bottom or top Z value, a middle Z value, etc.), a second material type, and/or a second weld setting. The first weld setting and/or the second weld setting may comprise a welding current, wire feed speed, and/or arc voltage. In some embodiments, the first and second process parameters may comprise the same or different values, for example, the first and second material types may embody the same type of material, or may embody different types of material. Although it should be understood that concept is not limited to the type of material. For instance, the first and second weld settings may embody the same weld settings (e.g., a same welding current) or different weld settings (e.g., different wire feed speeds).

The order may be based on a minimum contact tip to work distance (e.g., between a distal end of the contact tip through which the weld wire is deposited to create the bead and a top Z value of the bead). The three-dimensional part can include, but is not limited to, a third weld bead. The controller further comprises logic to determine a location to deposit the third weld bead based on a region of the three-dimensional part with the smallest height dimension as measured in a vertical direction. The system may further comprise a first robot with a welding torch configured to deposit the first weld bead, and a second robot with a welding torch configured to deposit the second weld bead.

The present solution also concerns implementing systems and methods for additive manufacturing of a three-dimensional part. The methods comprise: obtaining, by the processor (e.g., controller 410 of FIG. 1), different bead heights that are to be used during the additive manufacturing; determining, by the processor, an order in which beads are to be printed based on (i) a list of ordered absolute Z heights, (ii) bead bottom Z values, (iii) bead top Z values, (iv) bead centers of gravity, or any combination of (i)-(iv); and printing the beads in the determined order to additively manufacture the three-dimensional part. The order may be determined further based on a pre-specified order in which materials are to be printed.

The determination as to the order in which beads are to be printed comprises performing bead ordering operations including: obtaining an absolute Z height in the list of ordered absolute Z heights; identifying a lowest bead of the beads with the absolute Z height (e.g., a lowest bead is a bead with the lowest bottom Z value); adding the identified lowest bead as a next bead to be printed in the order; obtaining a next absolute Z height in the list of ordered absolute Z heights; identifying a next lowest bead of the beads with the next absolute Z height; adding the identified next lowest bead to the order after the identified lowest bead; and/or repeating the bead ordering operations until all beads have been added to the order.

Additionally or alternatively, the determination as to the order in which beads are to be printed may be made by: identifying two or more beads with a same absolute Z height and a same bottom, middle or top Z value; and adding the identified two or more beads to the order in a random manner or in accordance with a pre-specified order in which materials are to be printed.

Additionally or alternatively, the determination as to the order in which beads are to be printed is made by: identifying a bead with a lowest bottom or top Z value; adding the identified bead as a next bead to be printed in the order; identifying another bead with a next lowest bottom or top Z value; and adding the identified another bead to the order after the identified bead with the lowest bottom Z value.

Additionally or alternatively, the determination as to the order in which beads are to be printed is made by: identifying two or more beads with a same bottom or top Z value; and adding the two or more beads to the order in a random manner or in accordance with a pre-specified order in which materials are to be printed.

Additionally or alternatively, the determination as to the order in which beads are to be printed is made by: identifying a bead with a lowest center of gravity; adding the identified bead as a next bead to be printed in the order; identifying another bead with a next lowest center of gravity; and adding the identified another bead to the order after the identified bead with the lowest center of gravity.

Additionally or alternatively, the determination as to the order in which beads are to be printed is made by: identifying two or more beads with a same center of gravity; and adding the two or more beads to the order in a random manner or in accordance with a pre-specified order in which materials are to be printed.

The present solution also concerns a system, comprising: a processor; and a non-transitory computer readable medium comprising one or more programming instructions that when executed by the processor, cause the processor to: obtain different bead heights that are to be used during the additive manufacturing; determine an order in which beads are to be printed based on (i) a list of ordered absolute Z heights, (ii) bead bottom Z values, (iii) bead top Z values, (iv) bead centers of gravity, or any combination of (i)-(iv); and print the beads in the determined order to additively manufacture the three-dimensional part. The order may be determined further based on a pre-specified order in which materials are to be printed.

The order in which beads are to be printed may be determined by: obtaining an absolute Z height in the list of ordered absolute Z heights; identifying a lowest bead of the beads with the absolute Z height; adding the identified lowest bead as a next bead to be printed in the order;

obtaining a next absolute Z height in the list of ordered absolute Z heights; identifying a next lowest bead of the beads with the next absolute Z height; adding the identified next lowest bead to the order after the identified lowest bead; and/or repeating the bead ordering operations until all beads have been added to the order.

Additionally or alternatively, the determination as to the order in which beads are to be printed may be made by: identifying two or more beads with a same absolute Z height and a same bottom, middle or top Z value; and adding the identified two or more beads to the order in a random manner or in accordance with a pre-specified order in which materials are to be printed.

Additionally or alternatively, the determination as to the order in which beads are to be printed may be made by: identifying a bead with a lowest bottom or top Z value; adding the identified bead as a next bead to be printed in the order; identifying another bead with a next lowest bottom or top Z value; and adding the identified another bead to the order after the identified bead with the lowest bottom Z value.

Additionally or alternatively, the determination as to the order in which beads are to be printed may be made by: identifying two or more beads with a same bottom or top Z value; and adding the two or more beads to the order in a random manner or in accordance with a pre-specified order in which materials are to be printed.

Additionally or alternatively, the determination as to the order in which beads are to be printed may be made by: identifying a bead with a lowest center of gravity; adding the identified bead as a next bead to be printed in the order; identifying another bead with a next lowest center of gravity; and adding the identified another bead to the order after the identified bead with the lowest center of gravity.

Additionally or alternatively, the determination as to the order in which beads are to be printed may be made by: identifying two or more beads with a same center of gravity; and adding the two or more beads to the order in a random manner or in accordance with a pre-specified order in which materials are to be printed.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

What is claimed is:

1. A method for additive manufacturing of a three-dimensional part, comprising:

obtaining, by a processor, different bead heights that are to be used during the additive manufacturing;

determining, by the processor, an order in which beads are to be printed based on at least one of (i) a list of ordered absolute Z heights, (ii) bead bottom Z values, (iii) bead top Z values, and (iv) bead centers of gravity; and printing the beads in the determined order to additively manufacture the three-dimensional part;

wherein said determining the order in which beads are to be printed comprises performing bead ordering operations including:

obtaining an absolute Z height in the list of ordered absolute Z heights;

identifying a lowest bead of the beads with the absolute Z height, the lowest bead having a lowest bottom Z value among the bottom Z values of the beads with the absolute Z height;

adding the identified lowest bead as a next bead to be printed in the order;

obtaining a next absolute Z height in the list of ordered absolute Z heights;

identifying a next lowest bead of the beads with the next absolute Z height; and adding the identified next lowest bead to the order after the identified lowest bead.

2. The method according to claim 1, wherein the order is determined further based on a pre-specified order in which materials are to be printed.

3. The method according to claim 1, wherein said determining the order in which beads are to be printed further comprises repeating the bead ordering operations until all beads have been added to the order.

4. A method for additive manufacturing of a three-dimensional part, comprising:

obtaining, by a processor, different bead heights that are to be used during the additive manufacturing:

determining, by the processor, an order in which beads are to be printed based on at least one of (i) a list of ordered absolute Z heights, (ii) bead bottom Z values, (iii) bead top Z values, and (iv) bead centers of gravity; and printing the beads in the determined order to additively manufacture the three-dimensional part;

wherein a determination as to the order in which beads are to be printed is made by:

identifying two or more beads with a same absolute Z height and a same bottom, middle or top Z value; and adding the identified two or more beads to the order in a random manner or in accordance with a pre-specified order in which materials are to be printed.

5. A method for additive manufacturing of a three-dimensional part, comprising:

obtaining, by a processor, different bead heights that are to be used during the additive manufacturing;

determining, by the processor, an order in which beads are to be printed based on at least one of (i) a list of ordered absolute Z heights, (ii) bead bottom Z values, (iii) bead top Z values, and (iv) bead centers of gravity; and printing the beads in the determined order to additively manufacture the three-dimensional part;

wherein a determination as to the order in which beads are to be printed is made by:

identifying a bead with a lowest bottom Z value;

adding the identified bead as a next bead to be printed in the order;

identifying another bead with a next lowest bottom Z value; and adding the identified another bead to the order after the identified bead with the lowest bottom Z value.

6. A method for additive manufacturing of a three-dimensional part, comprising:

obtaining, by a processor, different bead heights that are to be used during the additive manufacturing:

determining, by the processor, an order in which beads are to be printed based on at least one of (i) a list of ordered absolute Z heights, (ii) bead bottom Z values, (iii) bead top Z values, and (iv) bead centers of gravity; and printing the beads in the determined order to additively manufacture the three-dimensional part;

wherein a determination as to the order in which beads are to be printed is made by:

identifying a bead with a lowest top Z value;

adding the identified bead as a next bead to be printed in the order;

identifying another bead with a next lowest top Z value; and adding the identified another bead to the order after the identified bead with the lowest top Z value.

7. A method for additive manufacturing of a three-dimensional part, comprising:

obtaining, by a processor, different bead heights that are to be used during the additive manufacturing:

determining, by the processor, an order in which beads are to be printed based on at least one of (i) a list of ordered absolute Z heights, (ii) bead bottom Z values, (iii) bead top Z values, and (iv) bead centers of gravity; and printing the beads in the determined order to additively manufacture the three-dimensional part;

wherein said determination as to the order in which beads are to be printed is made by:

identifying two or more beads with a same bottom Z value; and adding the two or more beads to the order in a random manner or in accordance with a pre-specified order in which materials are to be printed.

8. A method for additive manufacturing of a three-dimensional part, comprising:

obtaining, by a processor, different bead heights that are to be used during the additive manufacturing;

determining, by the processor, an order in which beads are to be printed based on at least one of (i) a list of ordered absolute Z heights, (ii) bead bottom Z values, (iii) bead top Z values, and (iv) bead centers of gravity; and printing the beads in the determined order to additively manufacture the three-dimensional part;

wherein said determination as to the order in which beads are to be printed is made by:

identifying two or more beads with a same top Z value; and adding the two or more beads to the order in a random manner or in accordance with a pre-specified order in which materials are to be printed.

9. A method for additive manufacturing of a three-dimensional part, comprising:

obtaining, by a processor, different bead heights that are to be used during the additive manufacturing;

determining, by the processor, an order in which beads are to be printed based on at least one of (i) a list of ordered absolute Z heights, (ii) bead bottom Z values, (iii) bead top Z values, and (iv) bead centers of gravity; and printing the beads in the determined order to additively manufacture the three-dimensional part;

wherein a determination as to the order in which beads are to be printed is made by:

identifying a bead with a lowest center of gravity;

adding the identified bead as a next bead to be printed in the order;

identifying another bead with a next lowest center of gravity; and adding the identified another bead to the order after the identified bead with the lowest center of gravity.

10. A method for additive manufacturing of a three-dimensional part, comprising:

obtaining, by a processor, different bead heights that are to be used during the additive manufacturing;

determining, by the processor, an order in which beads are to be printed based on at least one of (i) a list of ordered absolute Z heights, (ii) bead bottom Z values, (iii) bead top Z values, and (iv) bead centers of gravity; and printing the beads in the determined order to additively manufacture the three-dimensional part;

wherein said determination as to the order in which beads are to be printed is made by:

identifying two or more beads with a same center of gravity; and adding the two or more beads to the order in a random manner or in accordance with a pre-specified order in which materials are to be printed.

11. A system, comprising:

a processor; and a non-transitory computer readable medium comprising one or more programming instructions that when executed by the processor, cause the processor to:

obtain different bead heights that are to be used during the additive manufacturing;

determine an order in which beads are to be printed based on at least one of (i) a list of ordered absolute Z heights, (ii) bead bottom Z values, (iii) bead top Z values, and (iv) bead centers of gravity; and print the beads in the determined order to additively manufacture the three-dimensional part;

wherein the order in which beads are to be printed is determined by:

obtaining an absolute Z height in the list of ordered absolute Z heights;

identifying a lowest bead of the beads with the absolute Z height, the lowest bead having a lowest bottom Z value among the bottom Z values of the beads with the absolute Z height;

adding the identified lowest bead as a next bead to be printed in the order;

obtaining a next absolute Z height in the list of ordered absolute Z heights;

identifying a next lowest bead of the beads with the next absolute Z height; and adding the identified next lowest bead to the order after the identified lowest bead.

12. The system according to claim 11, wherein the order is determined further based on a pre-specified order in which materials are to be printed.

13. The system according to claim 11, wherein the order in which beads are to be printed are determined by repeating the bead ordering operations until all beads have been added to the order.

14. A system, comprising:

a processor; and a non-transitory computer readable medium comprising one or more programming instructions that when executed by the processor, cause the processor to:

obtain different bead heights that are to be used during the additive manufacturing;

determine an order in which beads are to be printed based on at least one of (i) a list of ordered absolute Z heights, (ii) bead bottom Z values, (iii) bead top Z values, and (iv) bead centers of gravity; and print the beads in the determined order to additively manufacture the three-dimensional part;

wherein a determination as to the order in which beads are to be printed is made by:

identifying two or more beads with a same absolute Z height and a same bottom, middle or top Z value; and adding the identified two or more beads to the order in a random manner or in accordance with a pre-specified order in which materials are to be printed.

15. A system, comprising:

a processor; and a non-transitory computer readable medium comprising one or more programming instructions that when executed by the processor, cause the processor to:

obtain different bead heights that are to be used during the additive manufacturing;

determine an order in which beads are to be printed based on at least one of (i) a list of ordered absolute Z heights, (ii) bead bottom Z values, (iii) bead top Z values, and (iv) bead centers of gravity; and print the beads in the determined order to additively manufacture the three-dimensional part;

wherein a determination as to the order in which beads are to be printed is made by:

identifying a bead with a lowest bottom Z value;

adding the identified bead as a next bead to be printed in the order;

identifying another bead with a next lowest bottom Z value; and adding the identified another bead to the order after the identified bead with the lowest bottom Z value.

16. A system, comprising:

a processor; and a non-transitory computer readable medium comprising one or more programming instructions that when executed by the processor, cause the processor to:

obtain different bead heights that are to be used during the additive manufacturing;

determine an order in which beads are to be printed based on at least one of (i) a list of ordered absolute Z heights, (ii) bead bottom Z values, (iii) bead top Z values, and (iv) bead centers of gravity; and print the beads in the determined order to additively manufacture the three-dimensional part;

wherein a determination as to the order in which beads are to be printed is made by:

identifying a bead with a lowest top Z value;

adding the identified bead as a next bead to be printed in the order;

identifying another bead with a next lowest top Z value; and adding the identified another bead to the order after the identified bead with the lowest top Z value.

17. A system, comprising:

a processor; and a non-transitory computer readable medium comprising one or more programming instructions that when executed by the processor, cause the processor to:

obtain different bead heights that are to be used during the additive manufacturing;

determine an order in which beads are to be printed based on at least one of (i) a list of ordered absolute Z heights, (ii) bead bottom Z values, (iii) bead top Z values, and (iv) bead centers of gravity; and print the beads in the determined order to additively manufacture the three-dimensional part;

wherein a determination as to the order in which beads are to be printed is made by:

identifying two or more beads with a same bottom Z value; and adding the two or more beads to the order in a random manner or in accordance with a pre-specified order in which materials are to be printed.

18. A system, comprising:

a processor; and a non-transitory computer readable medium comprising one or more programming instructions that when executed by the processor, cause the processor to:

obtain different bead heights that are to be used during the additive manufacturing;

determine an order in which beads are to be printed based on at least one of (i) a list of ordered absolute Z heights, (ii) bead bottom Z values, (iii) bead top Z values, and (iv) bead centers of gravity; and print the beads in the determined order to additively manufacture the three-dimensional part;

wherein a determination as to the order in which beads are to be printed is made by:

identifying two or more beads with a same top Z value; and adding the two or more beads to the order in a random manner or in accordance with a pre-specified order in which materials are to be printed.

19. A system, comprising:

a processor; and a non-transitory computer readable medium comprising one or more programming instructions that when executed by the processor, cause the processor to:

obtain different bead heights that are to be used during the additive manufacturing;

determine an order in which beads are to be printed based on at least one of (i) a list of ordered absolute Z heights, (ii) bead bottom Z values, (iii) bead top Z values, and (iv) bead centers of gravity; and print the beads in the determined order to additively manufacture the three-dimensional part;

wherein a determination as to the order in which beads are to be printed is made by:

identifying a bead with a lowest center of gravity;

adding the identified bead as a next bead to be printed in the order;

identifying another bead with a next lowest center of gravity; and adding the identified another bead to the order after the identified bead with the lowest center of gravity.

20. A system, comprising:

a processor; and a non-transitory computer readable medium comprising one or more programming instructions that when executed by the processor, cause the processor to:

obtain different bead heights that are to be used during the additive manufacturing;

determine an order in which beads are to be printed based on at least one of (i) a list of ordered absolute Z heights, (ii) bead bottom Z values, (iii) bead top Z values, and (iv) bead centers of gravity; and print the beads in the determined order to additively manufacture the three-dimensional part:

wherein a determination as to the order in which beads are to be printed is made by:

identifying two or more beads with a same center of gravity; and adding the two or more beads to the order in a random manner or in accordance with a pre-specified order in which materials are to be printed.

* * * * *